(12) United States Patent
Boule et al.

(10) Patent No.: US 11,816,194 B2
(45) Date of Patent: Nov. 14, 2023

(54) USER INTERFACES FOR MANAGING SECURE OPERATIONS

(71) Applicant: Apple Inc., Cupertino, CA (US)

(72) Inventors: Andre M. Boule, San Jose, CA (US); Stephen Chick, Palo Alto, CA (US); Richard R. Dellinger, San Jose, CA (US); Edward H. Langstroth, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/076,694

(22) Filed: Oct. 21, 2020

(65) Prior Publication Data

US 2021/0397681 A1 Dec. 23, 2021

Related U.S. Application Data

(60) Provisional application No. 63/041,969, filed on Jun. 21, 2020.

(51) Int. Cl.
*G06F 3/0482* (2013.01)
*G06F 21/31* (2013.01)
*G06F 21/83* (2013.01)
*G06F 21/60* (2013.01)
*G06F 3/04883* (2022.01)
*G06F 9/54* (2006.01)

(52) U.S. Cl.
CPC ............ *G06F 21/31* (2013.01); *G06F 3/0482* (2013.01); *G06F 3/04883* (2013.01); *G06F 9/54* (2013.01); *G06F 21/606* (2013.01); *G06F 21/83* (2013.01); *G06F 2221/2149* (2013.01)

(58) Field of Classification Search
CPC .... G06F 21/31; G06F 3/0482; G06F 3/04883; G06F 9/54; G06F 21/606; G06F 21/83
See application file for complete search history.

(56) References Cited

U.S. PATENT DOCUMENTS

| 5,237,159 A | 8/1993 | Stephens et al. |
| 5,265,007 A | 11/1993 | Barnhard, Jr. et al. |
| 5,484,988 A | 1/1996 | Hills et al. |
| 5,659,165 A | 8/1997 | Jennings et al. |
| 5,691,524 A | 11/1997 | Josephson |
| 5,717,868 A | 2/1998 | James |
| 5,783,808 A | 7/1998 | Josephson |
| 5,910,989 A | 6/1999 | Naccache |
| 5,983,197 A | 11/1999 | Enta |

(Continued)

FOREIGN PATENT DOCUMENTS

| AR | 060465 A1 | 6/2008 |
| AU | 2015100708 A4 | 7/2015 |

(Continued)

OTHER PUBLICATIONS

Non-Final Office Action received for U.S. Appl. No. 16/369,355, dated Apr. 29, 2021, 16 pages.

(Continued)

*Primary Examiner* — Anil K Bhargava
(74) *Attorney, Agent, or Firm* — DLA Piper LLP (US)

(57) ABSTRACT

The present disclosure generally relates to methods for providing an option (e.g., a selectable option) to initiate a secure operation (e.g., a secure operation), such methods using a computer system and an external device.

51 Claims, 26 Drawing Sheets

(56) References Cited

U.S. PATENT DOCUMENTS

| | | |
|---|---|---|
| 6,016,484 A | 1/2000 | Williams et al. |
| 6,164,528 A | 12/2000 | Hills et al. |
| 6,189,785 B1 | 2/2001 | Lowery |
| 6,193,152 B1 | 2/2001 | Fernando et al. |
| 6,230,148 B1 | 5/2001 | Pare, Jr. et al. |
| 6,260,027 B1 | 7/2001 | Takahashi et al. |
| 6,323,846 B1 | 11/2001 | Westerman et al. |
| 6,328,207 B1 | 12/2001 | Gregoire et al. |
| 6,398,646 B1 | 6/2002 | Wei et al. |
| 6,408,087 B1 | 6/2002 | Kramer |
| 6,570,557 B1 | 5/2003 | Westerman et al. |
| 6,581,042 B2 | 6/2003 | Pare, Jr. et al. |
| 6,644,546 B2 | 11/2003 | George et al. |
| 6,662,166 B2 | 12/2003 | Pare, Jr. et al. |
| 6,677,932 B1 | 1/2004 | Westerman |
| 6,950,810 B2 | 9/2005 | Lapsley et al. |
| 6,970,855 B2 | 11/2005 | Das et al. |
| 7,079,652 B1 | 7/2006 | Harris |
| 7,099,845 B2 | 8/2006 | Higgins et al. |
| 7,099,850 B1 | 8/2006 | Mann et al. |
| 7,356,516 B2 | 4/2008 | Richey et al. |
| 7,359,880 B2 | 4/2008 | Abel et al. |
| 7,370,244 B2 | 5/2008 | Breitling et al. |
| 7,415,720 B2 | 8/2008 | Jung |
| 7,430,537 B2 | 9/2008 | Templeton et al. |
| 7,454,192 B1 | 11/2008 | Zhu |
| 7,496,527 B2 | 2/2009 | Silverstein et al. |
| 7,529,563 B1 | 5/2009 | Pitroda |
| 7,535,344 B2 | 5/2009 | Obradovich |
| 7,546,470 B2 | 6/2009 | Schultz |
| 7,644,019 B2 | 1/2010 | Woda et al. |
| 7,657,441 B2 | 2/2010 | Richey et al. |
| 7,689,508 B2 | 3/2010 | Davis et al. |
| 7,818,399 B1 | 10/2010 | Ross, Jr. et al. |
| 7,860,936 B1 | 12/2010 | Newstadt et al. |
| RE42,574 E | 7/2011 | Cockayne |
| 8,042,157 B2 | 10/2011 | Bennett et al. |
| 8,050,997 B1 | 11/2011 | Nosek et al. |
| 8,060,571 B2 | 11/2011 | Rao |
| 8,112,787 B2 | 2/2012 | Buer |
| 8,157,164 B1 | 4/2012 | Billman |
| 8,195,507 B2 | 6/2012 | Postrel |
| 8,195,576 B1 | 6/2012 | Grigg et al. |
| 8,254,647 B1 | 8/2012 | Nechyba et al. |
| 8,392,259 B2 | 3/2013 | Macgillivray et al. |
| 8,396,265 B1 | 3/2013 | Ross et al. |
| 8,452,654 B1 | 5/2013 | Wooters et al. |
| 8,452,978 B2 | 5/2013 | Alward et al. |
| 8,467,766 B2 | 6/2013 | Rackley, III et al. |
| 8,560,004 B1 | 10/2013 | Tsvetkov et al. |
| 8,571,937 B2 | 10/2013 | Rose et al. |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,827,153 B1 | 9/2014 | Rhoades et al. |
| 8,831,677 B2 | 9/2014 | Villa-Real |
| 8,880,055 B1 | 11/2014 | Clement et al. |
| 8,892,474 B1 | 11/2014 | Inskeep et al. |
| 8,924,259 B2 | 12/2014 | Neighman et al. |
| 8,942,420 B2 | 1/2015 | Kim et al. |
| 8,949,902 B1 | 2/2015 | Fabian-Isaacs et al. |
| 8,963,806 B1 | 2/2015 | Starner et al. |
| 9,002,322 B2 | 4/2015 | Cotterill |
| 9,053,293 B2 | 6/2015 | Latzina |
| 9,177,130 B2 | 11/2015 | Nechyba et al. |
| 9,253,375 B2 | 2/2016 | Milanfar et al. |
| 9,269,083 B1 | 2/2016 | Jarajapu et al. |
| 9,294,476 B1 | 3/2016 | Lurey et al. |
| 9,305,310 B2 | 4/2016 | Radhakrishnan et al. |
| 9,324,067 B2 | 4/2016 | Van Os et al. |
| 9,349,035 B1 | 5/2016 | Gerber et al. |
| 9,355,393 B2 | 5/2016 | Purves et al. |
| 9,411,460 B2 | 8/2016 | Dumont et al. |
| 9,477,872 B2 * | 10/2016 | Sarve ................ G06V 40/1335 |
| 9,483,763 B2 | 11/2016 | Van Os et al. |
| 9,519,413 B2 | 12/2016 | Bates |
| 9,519,901 B1 | 12/2016 | Dorogusker |
| 9,526,127 B1 | 12/2016 | Taubman et al. |
| 9,558,636 B1 | 1/2017 | Burdick |
| 9,569,605 B1 | 2/2017 | Schneider et al. |
| 9,584,463 B2 | 2/2017 | Ji et al. |
| 9,716,825 B1 | 7/2017 | Manzari et al. |
| 9,779,585 B2 | 10/2017 | Dupuis et al. |
| 9,817,549 B2 | 11/2017 | Chandrasekaran |
| 9,842,330 B1 | 12/2017 | Van Os et al. |
| 9,847,999 B2 | 12/2017 | Van Os et al. |
| 9,851,214 B1 | 12/2017 | Chintakindi |
| 9,922,327 B2 | 3/2018 | Johnson et al. |
| 9,953,149 B2 | 4/2018 | Tussy |
| 10,003,738 B2 | 6/2018 | Lautenbach et al. |
| 10,019,904 B1 | 7/2018 | Chan et al. |
| 10,032,100 B2 | 7/2018 | Mullen et al. |
| 10,073,541 B1 | 9/2018 | Baldwin |
| 10,089,607 B2 | 10/2018 | Ziat et al. |
| 10,223,631 B2 | 3/2019 | Mullen et al. |
| 10,248,779 B2 | 4/2019 | Song et al. |
| 10,255,545 B2 | 4/2019 | Mullen et al. |
| 10,319,203 B1 | 6/2019 | Testanero et al. |
| 10,334,054 B2 | 6/2019 | Van Os et al. |
| 10,482,461 B2 | 11/2019 | Van Os et al. |
| 10,749,967 B2 | 8/2020 | Van Os et al. |
| 10,977,651 B2 * | 4/2021 | Van Os ................ G06Q 20/227 |
| 11,119,626 B1 | 9/2021 | Duneja et al. |
| 11,206,309 B2 * | 12/2021 | Van Os ................ G06F 21/10 |
| 11,290,278 B2 * | 3/2022 | Sumien ............... H04W 12/069 |
| 11,533,614 B1 * | 12/2022 | Russell ................ H04W 4/027 |
| 11,593,773 B1 | 2/2023 | Yip et al. |
| 2001/0039497 A1 | 11/2001 | Hubbard |
| 2001/0049627 A1 | 12/2001 | Simpson |
| 2002/0004760 A1 | 1/2002 | Yoshida et al. |
| 2002/0015024 A1 | 2/2002 | Westerman et al. |
| 2002/0046064 A1 | 4/2002 | Maury et al. |
| 2002/0059295 A1 | 5/2002 | Ludtke et al. |
| 2002/0065774 A1 | 5/2002 | Young et al. |
| 2002/0116276 A1 | 8/2002 | Ottley |
| 2003/0006280 A1 | 1/2003 | Seita et al. |
| 2003/0028639 A1 | 2/2003 | Yamamoto et al. |
| 2003/0097413 A1 | 5/2003 | Vishik et al. |
| 2003/0142227 A1 | 7/2003 | Van Zee |
| 2003/0181201 A1 | 9/2003 | Bomze et al. |
| 2003/0188183 A1 | 10/2003 | Lee et al. |
| 2003/0200184 A1 | 10/2003 | Dominguez et al. |
| 2003/0236746 A1 | 12/2003 | Turner et al. |
| 2004/0073432 A1 | 4/2004 | Stone |
| 2004/0122685 A1 | 6/2004 | Bunce |
| 2004/0143553 A1 | 7/2004 | Torget et al. |
| 2004/0169722 A1 | 9/2004 | Pena |
| 2004/0181695 A1 | 9/2004 | Walker et al. |
| 2004/0215572 A1 | 10/2004 | Uehara et al. |
| 2004/0242200 A1 | 12/2004 | Maeoka et al. |
| 2004/0254891 A1 | 12/2004 | Blinn et al. |
| 2005/0071188 A1 | 3/2005 | Thuerk |
| 2005/0093868 A1 | 5/2005 | Hinckley |
| 2005/0096009 A1 * | 5/2005 | Ackley ................ H04M 1/663 455/414.1 |
| 2005/0144452 A1 | 6/2005 | Lynch et al. |
| 2005/0187873 A1 | 8/2005 | Labrou et al. |
| 2005/0220304 A1 * | 10/2005 | Lenoir ............... G11B 20/0021 380/255 |
| 2005/0250538 A1 | 11/2005 | Narasimhan et al. |
| 2005/0253814 A1 | 11/2005 | Ghassabian |
| 2005/0278587 A1 * | 12/2005 | Breitling ................ G06Q 10/00 714/48 |
| 2006/0021003 A1 | 1/2006 | Fisher et al. |
| 2006/0056664 A1 | 3/2006 | Iwasaki |
| 2006/0064313 A1 | 3/2006 | Steinbarth et al. |
| 2006/0120707 A1 | 6/2006 | Kusakari et al. |
| 2006/0165060 A1 | 7/2006 | Dua et al. |
| 2006/0179404 A1 | 8/2006 | Yolleck et al. |
| 2006/0192868 A1 | 8/2006 | Wakamori |
| 2006/0206709 A1 | 9/2006 | Labrou et al. |

(56) References Cited

U.S. PATENT DOCUMENTS

| | | |
|---|---|---|
| 2006/0208065 A1 | 9/2006 | Mendelovich et al. |
| 2006/0234764 A1 | 10/2006 | Gamo et al. |
| 2006/0235796 A1* | 10/2006 | Johnson ............ G06Q 20/4014 |
| | | 705/26.1 |
| 2006/0288226 A1 | 12/2006 | Kowal |
| 2006/0294007 A1 | 12/2006 | Barthelemy |
| 2006/0294025 A1 | 12/2006 | Mengerink |
| 2007/0013662 A1 | 1/2007 | Fauth |
| 2007/0073649 A1 | 3/2007 | Kikkoji et al. |
| 2007/0131759 A1 | 6/2007 | Cox et al. |
| 2007/0150842 A1 | 6/2007 | Chaudhri et al. |
| 2007/0157089 A1 | 7/2007 | Van Os et al. |
| 2007/0180492 A1 | 8/2007 | Hassan et al. |
| 2007/0186106 A1 | 8/2007 | Ting et al. |
| 2007/0192168 A1 | 8/2007 | Van |
| 2007/0194113 A1 | 8/2007 | Esplin et al. |
| 2007/0219901 A1 | 9/2007 | Garbow et al. |
| 2007/0245148 A1 | 10/2007 | Buer |
| 2007/0255564 A1 | 11/2007 | Yee et al. |
| 2007/0260547 A1 | 11/2007 | Little |
| 2007/0260558 A1 | 11/2007 | Look |
| 2007/0294182 A1* | 12/2007 | Hammad ............ G06Q 20/085 |
| | | 705/64 |
| 2008/0041936 A1 | 2/2008 | Vawter |
| 2008/0042866 A1* | 2/2008 | Morse .................. G08B 21/02 |
| | | 340/539.1 |
| 2008/0052181 A1 | 2/2008 | Devitt-Carolan et al. |
| 2008/0054081 A1 | 3/2008 | Mullen |
| 2008/0059351 A1 | 3/2008 | Richey et al. |
| 2008/0114678 A1 | 5/2008 | Bennett et al. |
| 2008/0114980 A1 | 5/2008 | Sridhar |
| 2008/0120707 A1 | 5/2008 | Ramia et al. |
| 2008/0122796 A1 | 5/2008 | Jobs et al. |
| 2008/0208681 A1 | 8/2008 | Hammad et al. |
| 2008/0208762 A1 | 8/2008 | Arthur et al. |
| 2008/0229409 A1 | 9/2008 | Miller et al. |
| 2008/0275779 A1 | 11/2008 | Lakshminarayanan |
| 2008/0319875 A1 | 12/2008 | Levchin et al. |
| 2009/0031375 A1 | 1/2009 | Sullivan et al. |
| 2009/0036165 A1 | 2/2009 | Brede |
| 2009/0054044 A1 | 2/2009 | Ikemori et al. |
| 2009/0063851 A1 | 3/2009 | Nijdam |
| 2009/0067689 A1 | 3/2009 | Porter et al. |
| 2009/0083850 A1 | 3/2009 | Fadell et al. |
| 2009/0094134 A1 | 4/2009 | Toomer et al. |
| 2009/0094681 A1 | 4/2009 | Sadler et al. |
| 2009/0119754 A1 | 5/2009 | Schubert |
| 2009/0122149 A1 | 5/2009 | Ishii |
| 2009/0135678 A1 | 5/2009 | Godat |
| 2009/0158390 A1 | 6/2009 | Guan |
| 2009/0159696 A1 | 6/2009 | Mullen |
| 2009/0160609 A1 | 6/2009 | Lin et al. |
| 2009/0165107 A1 | 6/2009 | Tojo et al. |
| 2009/0173784 A1 | 7/2009 | Yang et al. |
| 2009/0187423 A1 | 7/2009 | Kim |
| 2009/0187759 A1 | 7/2009 | Marsico |
| 2009/0193514 A1 | 7/2009 | Adams et al. |
| 2009/0199188 A1 | 8/2009 | Fujimaki |
| 2009/0210308 A1 | 8/2009 | Toomer et al. |
| 2009/0228938 A1 | 9/2009 | White et al. |
| 2009/0241169 A1 | 9/2009 | Dhand et al. |
| 2009/0307139 A1 | 12/2009 | Mardikar et al. |
| 2010/0008535 A1 | 1/2010 | Abulafia et al. |
| 2010/0023449 A1 | 1/2010 | Skowronek et al. |
| 2010/0026453 A1 | 2/2010 | Yamamoto et al. |
| 2010/0027854 A1 | 2/2010 | Chatterjee et al. |
| 2010/0042835 A1 | 2/2010 | Lee et al. |
| 2010/0078471 A1 | 4/2010 | Lin et al. |
| 2010/0078472 A1 | 4/2010 | Lin et al. |
| 2010/0082462 A1 | 4/2010 | Yuan et al. |
| 2010/0082481 A1 | 4/2010 | Lin et al. |
| 2010/0082485 A1 | 4/2010 | Lin et al. |
| 2010/0107229 A1 | 4/2010 | Najafi et al. |
| 2010/0114731 A1 | 5/2010 | Kingston et al. |
| 2010/0131303 A1 | 5/2010 | Collopy et al. |
| 2010/0153265 A1 | 6/2010 | Hershfield et al. |
| 2010/0164864 A1 | 7/2010 | Chou et al. |
| 2010/0174644 A1 | 7/2010 | Rosano et al. |
| 2010/0191570 A1 | 7/2010 | Michaud et al. |
| 2010/0205065 A1 | 8/2010 | Kumar et al. |
| 2010/0205091 A1 | 8/2010 | Graziano et al. |
| 2010/0216425 A1 | 8/2010 | Smith |
| 2010/0223145 A1 | 9/2010 | Dragt |
| 2010/0225607 A1 | 9/2010 | Kim |
| 2010/0243741 A1 | 9/2010 | Eng |
| 2010/0248823 A1 | 9/2010 | Smith |
| 2010/0250376 A1 | 9/2010 | Nandiraju |
| 2010/0251243 A1 | 9/2010 | Gill et al. |
| 2010/0267362 A1 | 10/2010 | Smith et al. |
| 2010/0269156 A1 | 10/2010 | Hohlfeld et al. |
| 2010/0275259 A1 | 10/2010 | Adams et al. |
| 2010/0298013 A1 | 11/2010 | Cao |
| 2010/0306107 A1 | 12/2010 | Nahari et al. |
| 2010/0311397 A1 | 12/2010 | Li |
| 2011/0035799 A1 | 2/2011 | Handler |
| 2011/0054268 A1 | 3/2011 | Fidacaro et al. |
| 2011/0055763 A1 | 3/2011 | Utsuki et al. |
| 2011/0099079 A1 | 4/2011 | White et al. |
| 2011/0106671 A1 | 5/2011 | Minnis et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1* | 6/2011 | Rogers ................. G07F 7/1075 |
| | | 380/247 |
| 2011/0145049 A1 | 6/2011 | Hertel et al. |
| 2011/0149874 A1 | 6/2011 | Reif |
| 2011/0161116 A1 | 6/2011 | Peak et al. |
| 2011/0164269 A1 | 7/2011 | Kamishiro |
| 2011/0187497 A1 | 8/2011 | Chin |
| 2011/0201306 A1 | 8/2011 | Ali Al-Harbi |
| 2011/0214158 A1 | 9/2011 | Pasquero et al. |
| 2011/0225057 A1 | 9/2011 | Webb et al. |
| 2011/0230769 A1 | 9/2011 | Yamazaki |
| 2011/0231914 A1 | 9/2011 | Hung |
| 2011/0251892 A1 | 10/2011 | Laracey |
| 2011/0254683 A1* | 10/2011 | Soldan ............. H04N 21/41265 |
| | | 340/539.13 |
| 2012/0023185 A1 | 1/2012 | Holden et al. |
| 2012/0024947 A1 | 2/2012 | Naelon et al. |
| 2012/0028609 A1 | 2/2012 | Hruska et al. |
| 2012/0066731 A1 | 3/2012 | Vasquez et al. |
| 2012/0078751 A1 | 3/2012 | Macphail et al. |
| 2012/0089507 A1 | 4/2012 | Zhang et al. |
| 2012/0123806 A1 | 5/2012 | Schumann et al. |
| 2012/0123937 A1 | 5/2012 | Spodak et al. |
| 2012/0178431 A1 | 7/2012 | Gold |
| 2012/0185397 A1 | 7/2012 | Levovitz |
| 2012/0197740 A1 | 8/2012 | Grigg et al. |
| 2012/0209748 A1 | 8/2012 | Small |
| 2012/0215553 A1 | 8/2012 | Leston |
| 2012/0221464 A1 | 8/2012 | Pasquero et al. |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0284185 A1 | 11/2012 | Mettler et al. |
| 2012/0290376 A1 | 11/2012 | Dryer et al. |
| 2012/0290449 A1 | 11/2012 | Mullen et al. |
| 2012/0290472 A1 | 11/2012 | Mullen et al. |
| 2012/0310760 A1 | 12/2012 | Phillips et al. |
| 2012/0316933 A1 | 12/2012 | Pentland et al. |
| 2012/0322370 A1 | 12/2012 | Lee |
| 2012/0322371 A1 | 12/2012 | Lee |
| 2013/0013499 A1 | 1/2013 | Kalgi |
| 2013/0030934 A1 | 1/2013 | Bakshi et al. |
| 2013/0031217 A1 | 1/2013 | Rajapakse |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0073321 A1 | 3/2013 | Hofmann et al. |

(56) References Cited

U.S. PATENT DOCUMENTS

| | | |
|---|---|---|
| 2013/0074194 A1 | 3/2013 | White et al. |
| 2013/0080272 A1 | 3/2013 | Ronca et al. |
| 2013/0080275 A1 | 3/2013 | Ronca et al. |
| 2013/0082819 A1* | 4/2013 | Cotterill ............... H04W 12/068 340/5.2 |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0103519 A1 | 4/2013 | Kountotsis et al. |
| 2013/0110719 A1 | 5/2013 | Carter et al. |
| 2013/0122866 A1 | 5/2013 | Huang |
| 2013/0124423 A1 | 5/2013 | Fisher |
| 2013/0144706 A1 | 6/2013 | Qawami et al. |
| 2013/0151360 A1 | 6/2013 | Scipioni et al. |
| 2013/0151414 A1 | 6/2013 | Zhu et al. |
| 2013/0159178 A1 | 6/2013 | Colon et al. |
| 2013/0166325 A1 | 6/2013 | Ganapathy et al. |
| 2013/0166332 A1 | 6/2013 | Hammad |
| 2013/0189953 A1 | 7/2013 | Mathews |
| 2013/0198112 A1 | 8/2013 | Bhat et al. |
| 2013/0200146 A1 | 8/2013 | Moghadam et al. |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0232073 A1 | 9/2013 | Sheets et al. |
| 2013/0239202 A1 | 9/2013 | Adams et al. |
| 2013/0243264 A1 | 9/2013 | Aoki |
| 2013/0262857 A1 | 10/2013 | Neuman et al. |
| 2013/0275300 A1 | 10/2013 | Killian et al. |
| 2013/0282577 A1 | 10/2013 | Milne |
| 2013/0297414 A1 | 11/2013 | Goldfarb et al. |
| 2013/0304514 A1 | 11/2013 | Hyde et al. |
| 2013/0304651 A1 | 11/2013 | Smith et al. |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006285 A1 | 1/2014 | Chi et al. |
| 2014/0019352 A1 | 1/2014 | Shrivastava |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0052553 A1 | 2/2014 | Uzo |
| 2014/0058805 A1* | 2/2014 | Paesler ............... G06Q 20/3224 705/13 |
| 2014/0058935 A1 | 2/2014 | Mijares |
| 2014/0058939 A1 | 2/2014 | Savla |
| 2014/0058941 A1 | 2/2014 | Moon et al. |
| 2014/0068740 A1 | 3/2014 | Lecun et al. |
| 2014/0070957 A1 | 3/2014 | Longinotti-Buitoni et al. |
| 2014/0074635 A1 | 3/2014 | Reese et al. |
| 2014/0074716 A1 | 3/2014 | Ni |
| 2014/0089196 A1 | 3/2014 | Paya et al. |
| 2014/0094143 A1 | 4/2014 | Ayotte |
| 2014/0095225 A1 | 4/2014 | Williams et al. |
| 2014/0095380 A1 | 4/2014 | Pinski |
| 2014/0099886 A1 | 4/2014 | Monroe et al. |
| 2014/0101056 A1 | 4/2014 | Wendling |
| 2014/0109018 A1 | 4/2014 | Casey et al. |
| 2014/0118519 A1 | 5/2014 | Sahin |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Bianco et al. |
| 2014/0138435 A1 | 5/2014 | Khalid |
| 2014/0140587 A1 | 5/2014 | Ballard et al. |
| 2014/0143145 A1 | 5/2014 | Kortina et al. |
| 2014/0156531 A1 | 6/2014 | Poon et al. |
| 2014/0164082 A1 | 6/2014 | Sun et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0195815 A1 | 7/2014 | Taveau et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0214640 A1* | 7/2014 | Mallikarjunan ..... G06Q 20/322 705/35 |
| 2014/0222664 A1 | 8/2014 | Milne |
| 2014/0236840 A1 | 8/2014 | Islam |
| 2014/0244365 A1 | 8/2014 | Price et al. |
| 2014/0244493 A1 | 8/2014 | Kenyon et al. |
| 2014/0244495 A1 | 8/2014 | Davis et al. |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0279442 A1 | 9/2014 | Luoma et al. |
| 2014/0279497 A1 | 9/2014 | Qaim-Maqami et al. |
| 2014/0279556 A1 | 9/2014 | Priebatsch et al. |
| 2014/0281561 A1 | 9/2014 | Etchegoyen et al. |
| 2014/0282987 A1 | 9/2014 | Narendra et al. |
| 2014/0292396 A1 | 10/2014 | Bruwer et al. |
| 2014/0293079 A1* | 10/2014 | Milanfar ............... H04N 23/811 348/222.1 |
| 2014/0298432 A1 | 10/2014 | Brown |
| 2014/0298478 A1 | 10/2014 | Kim et al. |
| 2014/0337931 A1 | 11/2014 | Cotterill |
| 2014/0344082 A1 | 11/2014 | Soundararajan |
| 2014/0344896 A1 | 11/2014 | Pak et al. |
| 2014/0344904 A1 | 11/2014 | Venkataramani et al. |
| 2014/0359140 A1 | 12/2014 | Shankarraman |
| 2014/0372309 A1 | 12/2014 | Bullard et al. |
| 2014/0375835 A1 | 12/2014 | Bos |
| 2015/0002696 A1 | 1/2015 | He et al. |
| 2015/0006207 A1 | 1/2015 | Jarvis et al. |
| 2015/0012417 A1 | 1/2015 | Joao et al. |
| 2015/0012435 A1 | 1/2015 | Wright et al. |
| 2015/0014141 A1 | 1/2015 | Myers et al. |
| 2015/0019944 A1 | 1/2015 | Kalgi |
| 2015/0039494 A1 | 2/2015 | Sinton et al. |
| 2015/0043790 A1 | 2/2015 | Ono et al. |
| 2015/0044965 A1 | 2/2015 | Kurimoto et al. |
| 2015/0046336 A1 | 2/2015 | Cummins |
| 2015/0051846 A1 | 2/2015 | Masuya |
| 2015/0054764 A1 | 2/2015 | Kim et al. |
| 2015/0056957 A1 | 2/2015 | Mardikar et al. |
| 2015/0058146 A1 | 2/2015 | Aissi et al. |
| 2015/0058191 A1 | 2/2015 | Khan et al. |
| 2015/0067496 A1 | 3/2015 | Missig et al. |
| 2015/0067602 A1 | 3/2015 | Bernstein et al. |
| 2015/0074418 A1 | 3/2015 | Lee et al. |
| 2015/0074615 A1 | 3/2015 | Han et al. |
| 2015/0077362 A1 | 3/2015 | Seo |
| 2015/0089636 A1 | 3/2015 | Martynov et al. |
| 2015/0095174 A1 | 4/2015 | Dua |
| 2015/0095175 A1 | 4/2015 | Dua |
| 2015/0098309 A1 | 4/2015 | Adams et al. |
| 2015/0115028 A1 | 4/2015 | Montealegre |
| 2015/0120545 A1 | 4/2015 | Fiore et al. |
| 2015/0124053 A1 | 5/2015 | Tamura et al. |
| 2015/0127539 A1 | 5/2015 | Ye et al. |
| 2015/0127550 A1 | 5/2015 | Khan |
| 2015/0135282 A1 | 5/2015 | Kong et al. |
| 2015/0149899 A1 | 5/2015 | Bernstein et al. |
| 2015/0154589 A1 | 6/2015 | Li |
| 2015/0154676 A1 | 6/2015 | Matousek et al. |
| 2015/0170146 A1 | 6/2015 | Ji et al. |
| 2015/0178878 A1 | 6/2015 | Huang |
| 2015/0186152 A1 | 7/2015 | Jothiswaran et al. |
| 2015/0186636 A1 | 7/2015 | Tharappel et al. |
| 2015/0186892 A1 | 7/2015 | Zhang et al. |
| 2015/0187019 A1 | 7/2015 | Fernandes et al. |
| 2015/0195133 A1 | 7/2015 | Sheets et al. |
| 2015/0208244 A1 | 7/2015 | Nakao |
| 2015/0213244 A1 | 7/2015 | Lymberopoulos et al. |

(56) References Cited

U.S. PATENT DOCUMENTS

| | | |
|---|---|---|
| 2015/0213542 A1 | 7/2015 | Wallaja |
| 2015/0213560 A1 | 7/2015 | Aabye et al. |
| 2015/0215128 A1 | 7/2015 | Pal |
| 2015/0220924 A1 | 8/2015 | Bakker |
| 2015/0227922 A1 | 8/2015 | Filler |
| 2015/0229750 A1 | 8/2015 | Zhou et al. |
| 2015/0230277 A1* | 8/2015 | O'Meara ............... H04W 12/08 455/411 |
| 2015/0235018 A1 | 8/2015 | Gupta et al. |
| 2015/0235055 A1 | 8/2015 | An et al. |
| 2015/0242611 A1 | 8/2015 | Cotterill |
| 2015/0242837 A1 | 8/2015 | Yarbrough et al. |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0262183 A1* | 9/2015 | Gervais ............... G06Q 20/405 705/44 |
| 2015/0278799 A1 | 10/2015 | Palanisamy |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0324113 A1 | 11/2015 | Kapp et al. |
| 2015/0324615 A1 | 11/2015 | Matsumoto et al. |
| 2015/0334567 A1 | 11/2015 | Chen et al. |
| 2015/0339652 A1 | 11/2015 | Park et al. |
| 2015/0346845 A1 | 12/2015 | Di Censo et al. |
| 2015/0348001 A1 | 12/2015 | Van Os et al. |
| 2015/0348002 A1 | 12/2015 | Van Os et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0349959 A1 | 12/2015 | Marciniak |
| 2015/0363632 A1 | 12/2015 | Ahn et al. |
| 2015/0365400 A1 | 12/2015 | Cox |
| 2016/0005024 A1 | 1/2016 | Harrell |
| 2016/0005028 A1 | 1/2016 | Mayblum et al. |
| 2016/0012417 A1 | 1/2016 | Mizon |
| 2016/0012465 A1 | 1/2016 | Sharp |
| 2016/0019536 A1 | 1/2016 | Ortiz et al. |
| 2016/0026779 A1 | 1/2016 | Grigg et al. |
| 2016/0034887 A1 | 2/2016 | Lee |
| 2016/0047666 A1 | 2/2016 | Fuchs |
| 2016/0050199 A1 | 2/2016 | Ganesan |
| 2016/0062487 A1 | 3/2016 | Foss et al. |
| 2016/0063235 A1 | 3/2016 | Tussy |
| 2016/0063298 A1* | 3/2016 | Tuneld ............... G06V 40/1335 348/77 |
| 2016/0078281 A1* | 3/2016 | Gongaware ......... G06V 40/166 382/118 |
| 2016/0078434 A1 | 3/2016 | Huxham et al. |
| 2016/0086176 A1 | 3/2016 | Henrique et al. |
| 2016/0092665 A1* | 3/2016 | Cowan ............... H04W 12/06 726/9 |
| 2016/0092877 A1 | 3/2016 | Chew |
| 2016/0100156 A1 | 4/2016 | Zhou et al. |
| 2016/0104228 A1 | 4/2016 | Sundaresan |
| 2016/0132864 A1 | 5/2016 | Shah et al. |
| 2016/0134488 A1 | 5/2016 | Straub et al. |
| 2016/0147987 A1 | 5/2016 | Jang et al. |
| 2016/0148384 A1 | 5/2016 | Bud et al. |
| 2016/0165205 A1 | 6/2016 | Liu et al. |
| 2016/0171192 A1 | 6/2016 | Holz et al. |
| 2016/0171482 A1 | 6/2016 | Muncey et al. |
| 2016/0180305 A1 | 6/2016 | Dresser et al. |
| 2016/0188860 A1 | 6/2016 | Lee et al. |
| 2016/0210623 A1 | 7/2016 | Voege |
| 2016/0217310 A1 | 7/2016 | Shah et al. |
| 2016/0224966 A1 | 8/2016 | Van Os et al. |
| 2016/0224973 A1 | 8/2016 | Van Os et al. |
| 2016/0232513 A1 | 8/2016 | Purves et al. |
| 2016/0232516 A1 | 8/2016 | Dayan et al. |
| 2016/0234023 A1 | 8/2016 | Mozer et al. |
| 2016/0239701 A1 | 8/2016 | Lee et al. |
| 2016/0241543 A1 | 8/2016 | Jung et al. |
| 2016/0241555 A1 | 8/2016 | Vo et al. |
| 2016/0253665 A1 | 9/2016 | Van Os et al. |
| 2016/0267447 A1 | 9/2016 | Davis et al. |
| 2016/0267779 A1 | 9/2016 | Kuang |
| 2016/0270144 A1* | 9/2016 | Thanayankizil ..... H04B 1/3822 |
| 2016/0275281 A1 | 9/2016 | Ranjit et al. |
| 2016/0277396 A1 | 9/2016 | Gardiner et al. |
| 2016/0292525 A1 | 10/2016 | Aoki |
| 2016/0294557 A1 | 10/2016 | Baldwin et al. |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0314451 A1 | 10/2016 | Martin |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0350522 A1 | 12/2016 | Chi et al. |
| 2016/0358180 A1 | 12/2016 | Van Os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0378961 A1 | 12/2016 | Park |
| 2016/0378966 A1 | 12/2016 | Alten |
| 2017/0017834 A1 | 1/2017 | Sabitov et al. |
| 2017/0032375 A1 | 2/2017 | Van Os et al. |
| 2017/0046508 A1 | 2/2017 | Shin et al. |
| 2017/0046704 A1 | 2/2017 | Buchner et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0147186 A1 | 5/2017 | Velusamy et al. |
| 2017/0169202 A1 | 6/2017 | Duggan et al. |
| 2017/0169287 A1 | 6/2017 | Tokunaga et al. |
| 2017/0180637 A1 | 6/2017 | Lautenbach et al. |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0244703 A1 | 8/2017 | Lee et al. |
| 2017/0289071 A1 | 10/2017 | Roberts et al. |
| 2017/0300897 A1 | 10/2017 | Ferenczi et al. |
| 2017/0329949 A1 | 11/2017 | Civelli |
| 2017/0337542 A1 | 11/2017 | Kim et al. |
| 2017/0339151 A1 | 11/2017 | Van Os et al. |
| 2017/0344251 A1 | 11/2017 | Hajimusa et al. |
| 2017/0357972 A1 | 12/2017 | Van Os et al. |
| 2017/0357973 A1 | 12/2017 | Van Os et al. |
| 2018/0004924 A1 | 1/2018 | Tieu |
| 2018/0021954 A1 | 1/2018 | Fischer et al. |
| 2018/0053157 A1 | 2/2018 | Roffey |
| 2018/0053180 A1* | 2/2018 | Cho ..................... G06Q 20/353 |
| 2018/0068313 A1 | 3/2018 | Van Os et al. |
| 2018/0082282 A1 | 3/2018 | Van Os et al. |
| 2018/0109629 A1* | 4/2018 | Van Os .................. G06F 21/35 |
| 2018/0114010 A1 | 4/2018 | Van Os et al. |
| 2018/0117944 A1 | 5/2018 | Lee |
| 2018/0150627 A1 | 5/2018 | Rodefer |
| 2018/0158066 A1 | 6/2018 | Van Os et al. |
| 2018/0181737 A1 | 6/2018 | Tussy |
| 2018/0276673 A1 | 9/2018 | Van Os et al. |
| 2018/0302790 A1 | 10/2018 | Cotterill |
| 2019/0050867 A1 | 2/2019 | Van Os et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0124510 A1 | 4/2019 | Cotterill |
| 2019/0156607 A1 | 5/2019 | Tao et al. |
| 2019/0289079 A1 | 9/2019 | Van Os et al. |
| 2019/0347391 A1 | 11/2019 | Kim et al. |
| 2019/0370448 A1 | 12/2019 | Devine et al. |
| 2019/0370583 A1 | 12/2019 | Van Os et al. |
| 2020/0042685 A1 | 2/2020 | Tussy et al. |
| 2020/0065470 A1 | 2/2020 | Van Os et al. |
| 2020/0065821 A1 | 2/2020 | Van Os et al. |
| 2020/0120503 A1 | 4/2020 | Cotterill |

(56) References Cited

U.S. PATENT DOCUMENTS

| | | | |
|---|---|---|---|
| 2020/0184472 | A1 | 6/2020 | Van Os et al. |
| 2020/0311509 | A1 | 10/2020 | Benkley et al. |
| 2020/0366742 | A1* | 11/2020 | Van Os .................. G06F 21/10 |
| 2020/0372514 | A1* | 11/2020 | Van Os ................ G06Q 20/405 |
| 2021/0042549 | A1 | 2/2021 | Van Os et al. |
| 2021/0073823 | A1 | 3/2021 | Van Os |
| 2021/0192530 | A1 | 6/2021 | Van Os et al. |
| 2021/0201288 | A1 | 7/2021 | Van Os et al. |
| 2021/0224785 | A1 | 7/2021 | Van Os et al. |
| 2021/0272118 | A1 | 9/2021 | Van Os et al. |
| 2021/0312417 | A1 | 10/2021 | Omojola |
| 2022/0058257 | A1* | 2/2022 | Cotterill ............. H04W 12/068 |
| 2022/0374863 | A1 | 11/2022 | Lipshultz |
| 2023/0088405 | A1 | 3/2023 | Pons Bordes et al. |

FOREIGN PATENT DOCUMENTS

| | | |
|---|---|---|
| AU | 2015100709 A4 | 7/2015 |
| AU | 2017100556 A4 | 6/2017 |
| CN | 1452739 A | 10/2003 |
| CN | 1663174 A | 8/2005 |
| CN | 1741104 A | 3/2006 |
| CN | 1846221 A | 10/2006 |
| CN | 1908981 A | 2/2007 |
| CN | 101171604 A | 4/2008 |
| CN | 101268470 A | 9/2008 |
| CN | 101299694 A | 11/2008 |
| CN | 101341718 A | 1/2009 |
| CN | 101341727 A | 1/2009 |
| CN | 101485128 A | 7/2009 |
| CN | 101610155 A | 12/2009 |
| CN | 101730907 A | 6/2010 |
| CN | 101796764 A | 8/2010 |
| CN | 101809581 A | 8/2010 |
| CN | 102004908 A | 4/2011 |
| CN | 102065148 A | 5/2011 |
| CN | 102096546 A | 6/2011 |
| CN | 102164213 A | 8/2011 |
| CN | 102202192 A | 9/2011 |
| CN | 102209321 A | 10/2011 |
| CN | 102282578 A | 12/2011 |
| CN | 102394838 A | 3/2012 |
| CN | 102396205 A | 3/2012 |
| CN | 102663303 A | 9/2012 |
| CN | 102737313 A | 10/2012 |
| CN | 102982144 A | 3/2013 |
| CN | 103001856 A | 3/2013 |
| CN | 103067248 A | 4/2013 |
| CN | 103188280 A | 7/2013 |
| CN | 103413218 A | 11/2013 |
| CN | 103701605 A | 4/2014 |
| CN | 103778533 A | 5/2014 |
| CN | 104038256 A | 9/2014 |
| CN | 104077534 A | 10/2014 |
| CN | 104252675 A | 12/2014 |
| CN | 104361302 A | 2/2015 |
| CN | 104487927 A | 4/2015 |
| CN | 104508618 A | 4/2015 |
| CN | 104539924 A | 4/2015 |
| CN | 104813354 A | 7/2015 |
| CN | 104903835 A | 9/2015 |
| CN | 105320864 A | 2/2016 |
| CN | 105389491 A | 3/2016 |
| CN | 105474224 A | 4/2016 |
| CN | 105787718 A | 7/2016 |
| CN | 105794244 A | 7/2016 |
| CN | 105844468 A | 8/2016 |
| CN | 105868613 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106503514 A | 3/2017 |
| CN | 106778222 A | 5/2017 |
| CN | 109769397 A | 5/2019 |
| EP | 1950678 A1 | 7/2008 |
| EP | 2180665 A1 | 4/2010 |
| EP | 2309410 A1 | 4/2011 |
| EP | 2654275 A1 | 10/2013 |
| EP | 2674889 A2 | 12/2013 |
| EP | 2701107 A1 | 2/2014 |
| EP | 2713298 A1 | 4/2014 |
| EP | 2725537 A1 | 4/2014 |
| EP | 2993619 A1 | 3/2016 |
| EP | 3057024 A1 | 8/2016 |
| EP | 3076334 A1 | 10/2016 |
| GB | 2466038 A | 6/2010 |
| GB | 2500321 A | 9/2013 |
| JP | 6-284182 A | 10/1994 |
| JP | 11-39385 A | 2/1999 |
| JP | 11-73530 A | 3/1999 |
| JP | 2000-259477 A | 9/2000 |
| JP | 2001-331758 A | 11/2001 |
| JP | 2002-99854 A | 4/2002 |
| JP | 2002-159052 A | 5/2002 |
| JP | 2003-16398 A | 1/2003 |
| JP | 2003-141541 A | 5/2003 |
| JP | 2003-178244 A | 6/2003 |
| JP | 2003-346059 A | 12/2003 |
| JP | 2004-252736 A | 9/2004 |
| JP | 2004-287592 A | 10/2004 |
| JP | 2004-356816 A | 12/2004 |
| JP | 2005-521961 A | 7/2005 |
| JP | 2005-523505 A | 8/2005 |
| JP | 2005-317049 A | 11/2005 |
| JP | 2006-18613 A | 1/2006 |
| JP | 2006-31182 A | 2/2006 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-277670 A | 10/2006 |
| JP | 2007-34637 A | 2/2007 |
| JP | 2007-507011 A | 3/2007 |
| JP | 2007-226794 A | 9/2007 |
| JP | 2007-334637 A | 12/2007 |
| JP | 2008-70926 A | 3/2008 |
| JP | 2009-9434 A | 1/2009 |
| JP | 2009-49878 A | 3/2009 |
| JP | 2009-99076 A | 5/2009 |
| JP | 2009-258991 A | 11/2009 |
| JP | 2010-102718 A | 5/2010 |
| JP | 2010-517390 A | 5/2010 |
| JP | 2010-152506 A | 7/2010 |
| JP | 2010-524051 A | 7/2010 |
| JP | 2010-211577 A | 9/2010 |
| JP | 2010-211579 A | 9/2010 |
| JP | 2010-271779 A | 12/2010 |
| JP | 2011-97287 A | 5/2011 |
| JP | 2011-519439 A | 7/2011 |
| JP | 2012-8985 A | 1/2012 |
| JP | 2012-504273 A | 2/2012 |
| JP | 2012-073724 A | 4/2012 |
| JP | 2012-508930 A | 4/2012 |
| JP | 2012-99025 A | 5/2012 |
| JP | 2012-215981 A | 11/2012 |
| JP | 2012-529699 A | 11/2012 |
| JP | 2013-20496 A | 1/2013 |
| JP | 2013-34322 A | 2/2013 |
| JP | 2013-58828 A | 3/2013 |
| JP | 2013-114317 A | 6/2013 |
| JP | 2013-530445 A | 7/2013 |
| JP | 2013-149206 A | 8/2013 |
| JP | 2013-533532 A | 8/2013 |
| JP | 5267966 B2 | 8/2013 |
| JP | 2013-222410 A | 10/2013 |
| JP | 2014-44719 A | 3/2014 |
| JP | 2014-44724 A | 3/2014 |
| JP | 2014-75155 A | 4/2014 |
| JP | 2014-102845 A | 6/2014 |

(56) References Cited

FOREIGN PATENT DOCUMENTS

| | | |
|---|---|---|
| JP | 2014-191653 A | 10/2014 |
| JP | 2015-14923 A | 1/2015 |
| JP | 2015-75877 A | 4/2015 |
| JP | 2015-187783 A | 10/2015 |
| JP | 2016-53766 A | 4/2016 |
| JP | 2016-71655 A | 5/2016 |
| JP | 2016-521403 A | 7/2016 |
| JP | 6-23162 B2 | 11/2016 |
| JP | 2016-224960 A | 12/2016 |
| JP | 2017-16170 A | 1/2017 |
| JP | 2017-500656 A | 1/2017 |
| JP | 2017091129 A | 5/2017 |
| JP | 2017-102952 A | 6/2017 |
| JP | 2017-138846 A | 8/2017 |
| KR | 10-0403196 B1 | 10/2003 |
| KR | 10-2004-0049502 A | 6/2004 |
| KR | 10-2007-0120125 A | 12/2007 |
| KR | 10-0805341 B1 | 2/2008 |
| KR | 10-2008-0064395 A | 7/2008 |
| KR | 10-2009-0089472 A | 8/2009 |
| KR | 10-2011-0056561 A | 5/2011 |
| KR | 10-2012-0040693 A | 4/2012 |
| KR | 10-2013-0027326 A | 3/2013 |
| KR | 10-1253392 B1 | 4/2013 |
| KR | 10-2013-0116905 A | 10/2013 |
| KR | 10-1330962 B1 | 11/2013 |
| KR | 10-2013-0138659 A | 12/2013 |
| KR | 10-1342208 B1 | 12/2013 |
| KR | 10-2014-0001515 A | 1/2014 |
| KR | 10-2014-0018019 A | 2/2014 |
| KR | 10-2014-0026263 A | 3/2014 |
| KR | 10-2014-0055429 A | 5/2014 |
| KR | 10-2014-0121764 A | 10/2014 |
| KR | 10-2014-0137400 A | 12/2014 |
| KR | 10-2015-0013264 A | 2/2015 |
| KR | 10-2016-0012636 A | 2/2016 |
| KR | 10-2016-0026791 A | 3/2016 |
| KR | 10-2016-0045633 A | 4/2016 |
| KR | 10-2016-0048215 A | 5/2016 |
| KR | 10-2016-0054573 A | 5/2016 |
| KR | 10-2016-0099397 A | 8/2016 |
| KR | 10-2016-0105296 A | 9/2016 |
| KR | 10-1820573 B1 | 1/2018 |
| WO | 1999/044114 A1 | 9/1999 |
| WO | 2002/001864 A1 | 1/2002 |
| WO | 2003/038698 A1 | 5/2003 |
| WO | 2003/083793 A2 | 10/2003 |
| WO | 2006/113834 A2 | 10/2006 |
| WO | 2007/041834 A1 | 4/2007 |
| WO | 2007/073422 A1 | 6/2007 |
| WO | 2007/116521 A1 | 10/2007 |
| WO | 2008/147457 A1 | 12/2008 |
| WO | 2008/151229 A1 | 12/2008 |
| WO | 2009/042392 A2 | 4/2009 |
| WO | 2010/039337 A2 | 4/2010 |
| WO | 2010/056484 A2 | 5/2010 |
| WO | 2010/077960 A2 | 7/2010 |
| WO | 2010/120972 A1 | 10/2010 |
| WO | 2010/128442 A2 | 11/2010 |
| WO | 2012/083113 A2 | 6/2012 |
| WO | 2013/000150 A1 | 1/2013 |
| WO | 2013/023224 A2 | 2/2013 |
| WO | 2013/066659 A1 | 5/2013 |
| WO | 2013/103912 A1 | 7/2013 |
| WO | 2013/169877 A2 | 11/2013 |
| WO | 2013/177548 A1 | 11/2013 |
| WO | 2014/033939 A1 | 3/2014 |
| WO | 2014/147297 A1 | 9/2014 |
| WO | 2015/057320 A1 | 4/2015 |
| WO | 2015/062382 A1 | 5/2015 |
| WO | 2015/062410 A1 | 5/2015 |
| WO | 2015/112868 A1 | 7/2015 |
| WO | 2015/120019 A1 | 8/2015 |
| WO | 2015/187608 A1 | 12/2015 |
| WO | 2016/036472 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/126775 A1 | 8/2016 |
| WO | 2016/129938 A1 | 8/2016 |
| WO | 2016/201037 A1 | 12/2016 |
| WO | 2017/030223 A1 | 2/2017 |
| WO | 2017/218094 A1 | 12/2017 |
| WO | 2018/226265 A1 | 12/2018 |

OTHER PUBLICATIONS

Notice of Allowance received for U.S. Appl. No. 16/990,974, dated Apr. 28, 2021, 5 pages.
Office Action received for Chinese Patent Application No. 201911199010.1, dated Mar. 29, 2021, 14 pages (8 pages of English Translation and 6 pages of Official Copy).
Office Action received for European Patent Application No. 17813737.8, dated Apr. 16, 2021, 7 pages.
Summons to Attend Oral Proceedings received for European Patent Application No. 18713408.5, mailed on Apr. 30, 2021, 5 pages.
Punchkick Interactive, "Punch kick hands-on review: Fitbit Surge", URL: https://www.youtube.com/watch?v=K2G7aebUYcA, Mar. 25, 2015, 3 pages.
13 questions and answers about using Apple Pay online, Online available at: http://www.it528.com/apple/1356.html, Feb. 18, 2016, 5 pages (Official Copy Only) (See Communication under 37 CFR § 1.98(a) (3)).
Brief Communication Regarding Oral Proceedings received for European Patent Application No. 18713408.5, mailed on Sep. 28, 2021, 2 pages.
Decision to Refuse received for European Patent Application No. 16201159.7, dated Sep. 27, 2021, 22 pages.
Invitation to Pay Additional Fees and Partial International Search Report received for PCT Patent Application No. PCT/US2021/037949, dated Sep. 22, 2021, 13 pages.
Minutes of the Oral Proceedings received for European Patent Application No. 16201159.7, mailed on Sep. 23, 2021, 6 pages.
Office Action received for Chinese Patent Application No. 201711292804.3, dated Sep. 10, 2021, 19 pages (8 pages of English Translation and 11 pages of Official Copy).
Office Action received for Chinese Patent Application No. 201780033622.6, dated Sep. 3, 2021, 11 pages (5 pages of English Translation and 6 pages of Official Copy).
Office Action received for Chinese Patent Application No. 201780033899.9, dated Sep. 3, 2021, 12 pages (6 pages of English Translation and 6 pages of Official Copy).
Office Action received for Chinese Patent Application No. 201911199010.1, dated Sep. 3, 2021, 12 pages (7 pages of English Translation and 5 pages of Official Copy).
Office Action received for European Patent Application No. 20198076.0, dated Sep. 22, 2021, 6 pages.
Office Action received for Korean Patent Application No. 10-2019-7006639, dated Sep. 16, 2021, 20 pages (10 pages of English Translation and 10 pages of Official Copy).
Notice of Allowance received for Korean Patent Application No. 10-2020-7027862, dated Jun. 29, 2021, 5 pages (1 page of English Translation and 4 pages of Official Copy).
Office Action received for Australian Patent Application No. 2020273355, dated Jul. 6, 2021, 3 pages.
Office Action received for European Patent Application No. 21150992.2, dated Jul. 6, 2021, 6 pages.
Summons to Attend Oral Proceedings received for European Patent Application No. 17865509.8, mailed on Jul. 14, 2021, 8 pages.
Final Office Action received for U.S. Appl. No. 16/125,267, dated Dec. 10, 2020, 20 pages.
Non-Final Office Action received for U.S. Appl. No. 16/670,949, dated Dec. 9, 2020, 11 pages.
Notice of Allowance received for Korean Patent Application No. 10-2020-7002929, dated Nov. 26, 2020, 3 pages (1 page of English Translation and 2 pages of Official Copy).
Notice of Allowance received for U.S. Appl. No. 15/823,269, dated Dec. 10, 2020, 10 pages.

(56) References Cited

OTHER PUBLICATIONS

Office Action received for Australian Patent Application No. 2019250143, dated Dec. 3, 2020, 5 pages.
Office Action received for Chinese Patent Application No. 201911199010.1, dated Nov. 4, 2020, 20 pages (10 pages of English Translation and 10 pages of Official Copy).
Office Action received for Japanese Patent Application No. 2020-028315, dated Nov. 9, 2020, 11 pages (6 pages of English Translation and 5 pages of Official Copy).
Notice of Allowance received for Chinese Patent Application No. 201780033899.9, dated Feb. 8, 2022, 2 pages (1 page of English Translation and 1 page of Official Copy).
Office Action received for Japanese Patent Application No. 2020-184605, dated Feb. 14, 2022, 24 pages (11 pages of English Translation and 13 pages of Official Copy).
Board Decision received for Chinese Patent Application No. 201510284896.5, dated Nov. 19, 2021, 14 pages (1 page of English Translation and 13 pages of Official Copy).
Board Decision received for Chinese Patent Application No. 201810094316.X, dated Dec. 3, 2021, 18 pages (1 page of English Translation and 17 pages of Official Copy).
Decision to Refuse received for European Patent Application No. 17865509.8, dated Jan. 4, 2022, 13 pages.
Minutes of the Oral Proceedings received for European Patent Application No. 17865509.8, mailed on Jan. 4, 2022, 8 pages.
Notice of Acceptance received for Australian Patent Application No. 2020289822, dated Dec. 22, 2021, 3 pages.
Office Action received for Indian Patent Application No. 201917024374, dated Dec. 30, 2021, 10 pages.
Office Action received for Korean Patent Application No. 10-2020-7034405, dated Dec. 4, 2021, 15 pages (7 pages of English Translation and 8 pages of Official Copy).
Summons to Attend Oral Proceedings received for European Patent Application No. 17813737.8, mailed on Jan. 4, 2022, 12 pages.
Notice of Allowance received for Korean Patent Application No. 10-2021-7032984, dated Jun. 29, 2022, 5 pages (2 pages of English Translation and 3 pages of Official Copy).
Board Decision received for Chinese Patent Application No. 201810338826.7, dated May 30, 2022, 20 pages (2 pages of English Translation and 18 pages of Official Copy).
Summons to Attend Oral Proceedings received for European Patent Application No. 18208881.5, mailed on Jun. 29, 2022, 9 pages.
Applicant-Initiated Interview Summary received for U.S. Appl. No. 16/789,132, dated Nov. 29, 2021, 5 pages.
Invitation to Pay Search Fees received for European Patent Application No. 19731554.2, dated Dec. 16, 2021, 3 pages.
Non-Final Office Action received for U.S. Appl. No. 15/274,910, dated Dec. 24, 2021, 35 pages.
Notice of Allowance received for Korean Patent Application No. 10-2021-7030343, dated Dec. 9, 2021, 6 pages (2 pages of English Translation and 4 pages of Official Copy).
Notice of Allowance received for U.S. Appl. No. 17/015,429, dated Dec. 13, 2021, 2 pages.
Notice of Allowance received for U.S. Appl. No. 17/015,429, dated Dec. 24, 2021, 2 pages.
Office Action received for Australian Patent Application No. 2019281965, dated Nov. 30, 2021, 3 pages.
Office Action received for Australian Patent Application No. 2020203899, dated Nov. 26, 2021, 4 pages.
Office Action received for Australian Patent Application No. 2020273355, dated Nov. 23, 2021, 6 pages.
Office Action received for Indian Patent Application No. 202018041558, dated Dec. 3, 2021, 7 pages.
Summons to Attend Oral Proceedings received for European Patent Application No. 17799904.2, mailed on Dec. 20, 2021, 8 pages.
Advisory Action received for U.S. Appl. No. 14/503,296, dated Oct. 2, 2015, 3 pages.
Adrianisen, "Samsung Galaxy S8 Face Recognition—Register Your Face Review!", Retrieved from < https://www.youtube.com/watch?v=04KVPaCJq94>, Apr. 27, 2017, 1 page.

Advisory Action received for U.S. Appl. No. 15/137,944, dated May 11, 2017, 6 pages.
Advisory Action received for U.S. Appl. No. 15/274,910, dated Aug. 12, 2019, 3 pages.
Advisory Action received for U.S. Appl. No. 16/164,561, dated Nov. 14, 2019, 2 pages.
Advisory Action received for U.S. Appl. No. 15/250,152, dated Mar. 25, 2019, 5 pages.
Applicant Initiated Interview Summary received for U.S. Appl. No. 15/351,230, dated Nov. 22, 2019, 5 pages.
Applicant Initiated Interview Summary received for U.S. Appl. No. 15/433,320, dated Feb. 11, 2020, 5 pages.
Applicant Initiated Interview Summary received for U.S. Appl. No. 15/823,269, dated Sep. 17, 2020, 3 pages.
Applicant Initiated Interview Summary received for U.S. Appl. No. 16/147,023, dated Oct. 29, 2019, 3 pages.
Applicant-Initiated Interview Summary received for U.S. Appl. No. 15/274,910, dated Jul. 9, 2020, 3 pages.
Applicant-Initiated Interview Summary received for U.S. Appl. No. 16/125,267, dated Sep. 14, 2020, 5 pages.
Applicant-Initiated Interview Summary received for U.S. Appl. No. 16/667,271, dated Apr. 8, 2020, 3 pages.
Bao et al., "Location-based and Preference-Aware Recommendation Using Sparse Geo-Social Networking Data", ACM SIGSPATIAL GIS 42, Redondo Beach, CA, USA, Online available at: https://www.microsoft.com/en-us/research/wp-content/uploads/2016/02/LocationRecommendation.pdf, Nov. 6-9, 2012, 10 pages.
Brief Communication Regarding Oral Proceedings received for European Patent Application No. 15727291.5, dated Jun. 9, 2020, 12 pages.
Brief Communication regarding Oral Proceedings received for European Patent Application No. 16201205.8, dated May 29, 2020, 29 pages.
Brief Communication regarding Oral Proceedings received for European Patent Application No. 19171661.2, dated May 28, 2020, 2 pages.
Brief Communication Regarding Oral Proceedings received for European Patent Application No. 19171661.2, dated Sep. 3, 2020, 2 pages.
Certificate of Examination received for Australian Patent Application No. 2017101425, dated Jan. 17, 2018, 2 pages.
Certificate of Examination received for Australian Patent Application No. 2018101014, dated Mar. 20, 2019, 2 pages.
Certification of Examination received for Australian Patent Application No. 2017100553, dated Jan. 17, 2018, 2 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/294,439, dated Mar. 13, 2019, 4 pages.
Corrected Notice of Allowance received for U.S. Appl. No. 15/845,794, dated Feb. 25, 2019, 2 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
CV Meerkat, "Extracting Face Orientation in Real-time", Available online at: <https://www.youtube.com/watch?v=Ugwfnjx6UYw>, Jul. 22, 2016, 3 pages.
Decision on Appeal received for Korean Patent Application No. 10-2016-0152210, dated Jun. 23, 2020, 20 pages (2 pages of English Translation and 18 pages of Official Copy).
Decision on Appeal received for Korean Patent Application No. 10-2018-7019643, dated Jun. 9, 2020, 27 pages (3 pages of English Translation and 24 pages of Official Copy).

(56) References Cited

OTHER PUBLICATIONS

Decision on Appeal received for U.S. Appl. No. 14/869,831, dated Nov. 2, 2020, 8 pages.
Decision to Grant received for Danish Patent Application No. PA201670042, dated Mar. 19, 2018, 2 pages.
Decision to Grant received for Danish Patent Application No. PA201670628, dated Nov. 20, 2017, 2 pages.
Decision to Grant received for Danish Patent Application No. PA201770715, dated Feb. 15, 2019, 2 pages.
Decision to Grant received for Danish Patent Application No. PA201770782, dated Oct. 25, 2019, 2 pages.
Decision to Grant received for Danish Patent Application No. PA201770804, dated Jun. 28, 2019, 2 pages.
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Decision to Grant received for Danish Patent Application No. PA201870855, dated Oct. 20, 2020, 2 pages.
Decision to Grant received for Danish Patent Application No. PA201970127, dated Aug. 20, 2020, 2 pages.
Decision to Grant received for European Patent Application No. 12773460.6, dated Jun. 27, 2019, 2 pages.
Decision to Grant received for Japanese Patent Application No. 2017-075031, dated Jul. 1, 2019, 3 pages (1 page of English Translation and 2 pages of Official Copy).
Decision to Refuse received for European Patent Application No. 12770400.5, dated Nov. 8, 2018, 12 pages.
Decision to Refuse received for European Patent Application No. 15727291.5, dated Jun. 30, 2020, 21 pages.
Decision to Refuse received for European Patent Application No. 15728352.4, dated May 28, 2020, 25 pages.
Decision to Refuse received for European Patent Application No. 16201195.1, dated Mar. 4, 2019, 23 pages.
Decision to Refuse received for European Patent Application No. 16201205.8, dated Jun. 30, 2020, 29 pages.
Decision to Refuse received for European Patent Application No. 16703893.4, dated Jul. 24, 2019, 22 pages.
Decision to Refuse received for European Patent Application No. 19171661.2, dated Oct. 22, 2020, 7 pages.
Does Apple Pay change payment?, Mac Fan, Japan, Mynavi Publishing Corporation, vol. 22, No. 11 common No. 381, Nov. 1, 2014, 11 pages (4 pages of English Translation and 7 Pages of Official Copy).
Drareni Jamil, "Face Tracking and Head Pose Estimation with Open CV", Available online at: <https://www.youtube.com/watch?v=Etj_aktbnwM>, Jun. 9, 2013, 3 pages.
European Search Report received for European Patent Application No. 17865509.8, dated Oct. 2, 2019, 5 pages.
European Search Report received for European Patent Application No. 19171661.2, dated Jul. 17, 2019, 6 pages.
Examiner's Answer to Appeal Brief received for U.S. Appl. No. 14/869,831, dated Aug. 12, 2019, 16 pages.
Extended European Search Report received for European Application No. 17813737.8, dated Nov. 22, 2019, 9 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 17799904.2, dated Jul. 30, 2018, 7 pages.
Extended European Search Report received for European Patent Application No. 17810682.9, dated Mar. 26, 2019, 7 pages.
Extended European Search Report received for European Patent Application No. 17835789.3, dated Jun. 23, 2020, 12 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19160344.8, dated Jun. 14, 2019, 7 pages.
Extended European Search Report received for European Patent Application No. 19160348.9, dated Jul. 19, 2019, 6 pages.
Extended European Search Report received for European Patent Application No. 19186538.5, dated Oct. 9, 2019, 10 pages.
Extended European Search Report received for European Patent Application No. 19194828.0, dated Dec. 19, 2019, 7 pages.
Final Office Action received for U.S. Appl. No. 13/248,882, dated Dec. 4, 2013, 22 pages.
Final Office Action received for U.S. Appl. No. 14/285,378, dated Jul. 23, 2015, 19 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 15/137,944, dated Feb. 27, 2017, 10 pages.
Final Office Action received for U.S. Appl. No. 15/274,910, dated May 31, 2019, 31 pages.
Final Office Action received for U.S. Appl. No. 15/274,910, dated Oct. 16, 2020, 34 pages.
Final Office Action received for U.S. Appl. No. 15/351,230, dated Nov. 4, 2019, 6 pages.
Final Office Action received for U.S. Appl. No. 15/433,320, dated Dec. 31, 2019, 30 pages.
Final Office Action received for U.S. Appl. No. 15/866,341, dated May 14, 2019, 10 pages.
Final Office Action received for U.S. Appl. No. 16/147,023, dated Jul. 23, 2019, 18 pages.
Final Office Action received for U.S. Appl. No. 16/147,115, dated Jun. 19, 2019, 14 pages.
Final Office Action received for U.S. Appl. No. 16/164,561, dated Sep. 5, 2019, 12 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received for U.S. Appl. No. 14/870,694, dated Apr. 7, 2017, 16 pages.
Giving Apple Pay a Try, The Consumer Credit Monthly, Kinzai Institute for Financial Affairs, Inc, vol. 33, No. 1, ISSN: 0288-8122, 2015, 7 pages (Official Copy only) (See Communication under 37 CFR § 1.98(a) (3)).
How to Smartphone, "Samsung Galaxy S7—screen rotation on / off", Available Online at <https//www.youtube.com/watch?v=np54sEEI11E >, see video from 1:10 to 1:30, Dec. 12, 2016, 3 pages.
Intention to Grant received for Danish patent Application No. PA201670042, dated Jan. 29, 2018, 2 pages.
Intention to Grant received for Danish Patent Application No. PA201670628, dated Aug. 28, 2017, 2 pages.
Intention to Grant received for Danish Patent Application No. PA201770714, dated Feb. 15, 2019, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.

(56) References Cited

OTHER PUBLICATIONS

Intention to Grant received for Danish Patent Application No. PA201770782, dated Aug. 8, 2019, 2 pages.
Intention to Grant received for Danish Patent Application No. PA201770804, dated Apr. 10, 2019, 2 pages.
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Intention to Grant received for Danish Patent Application No. PA201870855, dated Jul. 13, 2020, 2 pages.
Intention to Grant received for Danish Patent Application No. PA201970127, dated Apr. 21, 2020, 2 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/031748, dated Dec. 20, 2018, 10 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2017/058368, dated Feb. 19, 2019, 5 pages.
International Preliminary Report on Patentability received for PCT Patent Application No. PCT/US2017/49500, dated Mar. 21, 2019, 14 pages.
International Preliminary Report on Patentability received for PCT Patent Application No. PCT/US2018/015603, dated Mar. 19, 2020, 8 pages.
International Search Report and Written Opinion received for PCT Application No. PCT/US2015/033326, dated Aug. 10, 2015, 13 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2018/049289, dated Feb. 19, 2019, 12 pages.
International Search Report and Written Opinion received for PCT Patent Application No. PCT/US2019/035092, dated Jan. 16, 2020, 16 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fee received for PCT Patent Application No. PCT/US2019/035092, dated Nov. 20, 2019, 6 pages.
Invitation to Pay Additional Fee received for PCT Patent Application No. PCT/US2017/058368, dated Dec. 14, 2017, 2 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31 (Official Copy only) (See Communication under 37 CFR § 1.98(a) (3)).
Komachi Aneem, "Time Attendance—Face Recognition—Biometrics", Available at <https://www.youtube.com/watch?v=asclTiiiSbc>, Feb. 9, 2010, 1 page.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Minutes of Oral Proceeding received for European Patent Application No. 16703893.4, mailed on Jul. 22, 2019, 9 pages.
Minutes of the Oral Proceedings received for European Application No. 12770400.5, mailed on Nov. 6, 2018, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201205.8, mailed on Jun. 29, 2020, 6 pages.
Minutes of the Oral Proceedings received for European Patent Application No. 19171661.2, mailed on Oct. 15, 2020, 5 pages.
Naver Blog, "How to Use Smart Wallet and Registered Card", Online Available at <http://feena74.blog.me/140185758401>, Mar. 29, 2013, 20 pages.
Nhdanh-Protocol Corp, "How to Enroll Face Enbioaccess T9 Nitgen Korea—Đăng Ký Khuôn Mặ Enbioaccess T9 Nitgen", Available online at <https://www.youtube.com/watch?v=mFn03PD4NIE>, Mar. 30, 2017, 1 page.
Nomad Studio, "Hajimete-no-smartphone-No. komatta-wo-sakutto-kaiketsu (Easy solution to troubles at your first smartphone)", Kazukuni Saito of Shuwa System Co., Ltd., 1st Ed, Jul. 1, 2016, 20 pages (Official Copy only) (See Communication under 37 CFR § 1.98(a) (3)).

(56) References Cited

OTHER PUBLICATIONS

Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 15/274,910, dated Oct. 18, 2018, 26 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/642,366, dated Aug. 24, 2015, 7 pages.
Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/269,801, dated Dec. 30, 2016, 17 pages.
Non-Final Office Action received for U.S. Appl. No. 15/274,086, dated Jan. 11, 2017, 21 pages.
Non-Final Office Action received for U.S. Appl. No. 15/274,910, dated Apr. 6, 2020, 33 pages.
Non-Final Office Action received for U.S. Appl. No. 15/294,439, dated Jan. 26, 2018, 18 pages.
Non-Final Office Action received for U.S. Appl. No. 15/351,230, dated Apr. 18, 2019, 16 pages.
Non-Final Office Action received for U.S. Appl. No. 15/433,320, dated Jul. 31, 2020, 13 pages.
Non-Final Office Action received for U.S. Appl. No. 15/782,068, dated Jun. 3, 2019, 17 pages.
Non-Final Office Action received for U.S. Appl. No. 15/823,269, dated Jun. 23, 2020, 14 pages.
Non-Final Office Action received for U.S. Appl. No. 15/845,794, dated Oct. 15, 2018, 8 pages.
Non-Final Office Action received for U.S. Appl. No. 15/866,341, dated Nov. 13, 2018, 11 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 15/992,722, dated Aug. 6, 2020, 7 pages.
Non-Final Office Action received for U.S. Appl. No. 16/125,267, dated Jul. 2, 2020, 20 pages.
Non-Final Office Action received for U.S. Appl. No. 16/147,023, dated Dec. 26, 2018, 17 pages.
Non-Final Office Action received for U.S. Appl. No. 16/147,115, dated Dec. 13, 2018, 12 pages.
Non-Final Office Action received for U.S. Appl. No. 16/164,561, dated Jan. 4, 2019, 14 pages.
Non-Final Office Action received for U.S. Appl. No. 16/434,865, dated Jan. 16, 2020, 9 pages.
Non-Final Office Action received for U.S. Appl. No. 16/542,084, dated Jan. 24, 2020, 21 pages.
Non-Final Office Action received for U.S. Appl. No. 16/667,271, dated Dec. 13, 2019, 8 pages.
Non-Final Office Action received for U.S. Appl. No. 16/990,974, dated Oct. 15, 2020, 6 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Non-Final Office Action received for U.S. Appl. No. 14/870,694, dated Sep. 23, 2016, 13 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2017317605, dated Aug. 28, 2019, 3 pages.
Notice of Acceptance received for Australian Patent Application No. 2018200628, dated Jun. 13, 2019, 3 pages.
Notice of Acceptance received for Australian Patent Application No. 2018202559, dated Oct. 21, 2019, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.
Notice of Acceptance received for Australian Patent Application No. 2019200360, dated Mar. 15, 2019, 3 pages.
Notice of Acceptance received for Australian Patent Application No. 2019201101, dated May 6, 2019, 3 pages.
Notice of Acceptance received for Australian Patent Application No. 2019203473, dated Nov. 7, 2019, 3 pages.
Notice of Acceptance received for Australian Patent Application No. 2020200795, dated Feb. 28, 2020, 3 pages.
Notice of Acceptance received for Australian Patent Application No. 2020201306, dated Mar. 12, 2020, 3 pages.
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201520357381.9, dated Jul. 29, 2015, 4 pages (2 pages of English Translation and 2 pages of Official Copy).
Notice of Allowance received for Chinese Patent Application No. 201520358683.8, dated Mar. 10, 2016, 5 pages (3 pages of English Translation and 2 pages of Official Copy).
Notice of Allowance received for Chinese Patent Application No. 201610069731.0, dated Sep. 6, 2019, 2 pages (1 page of English Translation and 1 page of Official Copy).
Notice of Allowance received for Chinese Patent Application No. 201620480708.6, dated Apr. 20, 2017, 3 pages (2 pages of English Translation and 1 page of Official Copy).
Notice of Allowance received for Chinese Patent Application No. 201620480846.4, dated Apr. 20, 2017, 3 pages (2 pages of English Translation and 1 page of Official Copy).

(56) References Cited

OTHER PUBLICATIONS

Notice of Allowance received for Chinese Patent Application No. 201710093861.2, dated Sep. 24, 2019, 4 pages (1 page of English Translation and 3 pages of Official Copy).
Notice of Allowance received for Chinese Patent Application No. 201780002398.4, dated Jun. 17, 2019, 2 pages (1 page of English Translation and 1 page of Official Copy).
Notice of Allowance received for Chinese Patent Application No. 201810338038.8, dated Jun. 30, 2020, 2 pages (1 page of English Translation and 1 page of Official Copy).
Notice of Allowance received for Chinese Patent Application No. 201910354714.5, dated Oct. 14, 2020, 2 pages (1 page of English Translation and 1 page of Official Copy).
Notice of Allowance received for Japanese Patent Application No. 2016-224506, dated Jan. 24, 2020, 4 pages (1 page of English Translation and 3 pages of Official Copy).
Notice of Allowance received for Japanese Patent Application No. 2016-224507, dated Mar. 26, 2019, 3 pages (1 page of English Translation and 2 pages of Official Copy).
Notice of Allowance received for Japanese Patent Application No. 2016-224508, dated Jun. 20, 2017, 3 pages (Official Copy only) (See Communication under 37 CFR § 1.98(a) (3)).
Notice of Allowance received for Japanese Patent Application No. 2016-558332, dated Jan. 11, 2019, 4 pages (1 page of English Translation and 3 pages of Official Copy).
Notice of Allowance received for Japanese Patent Application No. 2016-569665, dated Feb. 22, 2019, 4 pages (1 Page of English Translation and 3 Pages of Official Copy).
Notice of Allowance received for Japanese Patent Application No. 2017-540616, dated Apr. 23, 2019, 4 pages (1 page of English Translation and 3 pages of Official Copy).
Notice of Allowance received for Japanese Patent Application No. 2018-158482, dated Sep. 7, 2020, 4 pages (1 page of English Translation and 3 pages of Official Copy).
Notice of Allowance received for Japanese Patent Application No. 2018-504997, dated Aug. 3, 2018, 4 pages (1 page of English Translation and 3 pages of Official copy).
Notice of Allowance received for Japanese Patent Application No. 2018-551159, dated Jun. 15, 2020, 4 pages (1 page of English Translation and 3 pages of Official Copy).
Notice of Allowance received for Japanese Patent Application No. 2018-560107, dated Dec. 6, 2019, 4 pages (1 page of English Translation and 3 pages of Official Copy).
Notice of Allowance received for Japanese Patent Application No. 2019-096220, dated Nov. 25, 2019, 4 pages (1 page of English Translation and 3 pages of Official Copy).
Notice of Allowance received for Japanese Patent Application No. 2019-107235, dated May 15, 2020, 4 pages (1 page of English Translation and 3 pages of Official Copy).
Notice of Allowance received for Japanese Patent Application No. 2019-238894, dated Oct. 5, 2020, 4 pages (1 page of English Translation and 3 pages of Official Copy).
Notice of Allowance received for Japanese Patent Application No. 2019-510416, dated Oct. 12, 2020, 4 pages (1 page of English Translation and 3 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-0022365, dated Mar. 27, 2018, 4 pages (1 page of English Translation and 3 pages of Official copy).
Notice of Allowance received for Korean Patent Application No. 10-2017-0022546, dated Feb. 27, 2018, 4 pages (1 page of English Translation and 3 pages of Official Copy).
Notice of Allowance received for Korean Patent Application No. 10-2017-0022582, dated Feb. 27, 2020, 5 pages (2 pages of English Translation and 3 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2017-7024513, dated Apr. 20, 2018, 5 pages (2 pages of English Translation and 3 pages of Official copy).
Notice of Allowance received for Korean Patent Application No. 10-2018-7033301, dated Feb. 20, 2019, 5 pages (2 Pages of English Translation and 3 Pages of Official Copy).
Notice of Allowance received for Korean Patent Application No. 10-2019-7003374, dated Oct. 4, 2019, 9 pages (2 pages of English Translation and 7 pages of Official Copy).
Notice of Allowance received for Korean Patent Application No. 10-2019-7003836, dated Oct. 4, 2019, 4 pages (1 page of English Translation and 3 pages of Official Copy).
Notice of Allowance received for Korean Patent Application No. 10-2019-7004734, dated Oct. 24, 2019, 6 pages (2 pages of English Translation and 4 pages of Official Copy).
Notice of Allowance received for Korean Patent Application No. 10-2019-7005925, dated Jan. 21, 2020, 6 pages (2 pages of English Translation and 4 pages of Official Copy).
Notice of Allowance received for Korean Patent Application No. 10-2019-7014494, dated Mar. 19, 2020, 4 pages (1 page of English Translation and 3 pages of Official Copy).
Notice of Allowance received for Korean Patent Application No. 10-2019-7038021, dated May 2, 2020, 5 pages (1 page of English Translation and 4 pages of Official Copy).
Notice of Allowance received for Korean Patent Application No. 10-2020-0048600, dated Apr. 30, 2020, 5 pages (2 pages of English Translation and 3 pages of Official Copy).
Notice of Allowance received for Korean Patent Application No. 10-2020-7011172, dated Aug. 25, 2020, 7 pages (2 pages of English Translation and 5 pages of Official Copy).
Notice of Allowance received for Korean Patent Application No. 10-2014-7008348, dated Feb. 21, 2019, 5 pages (2 Pages of English Translation and 3 Pages of Official Copy).
Notice of Allowance received for Taiwanese Patent Application No. 104117508, dated Sep. 18, 2019, 5 pages (2 pages of English Translation and 3 pages of Official Copy).
Notice of Allowance received for the U.S. Appl. No. 14/503,381, dated Dec. 16, 2015, 8 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/285,378, dated May 19, 2016, 10 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/642,366, dated Jan. 14, 2016, 8 pages.
Notice of Allowance received for U.S. Appl. No. 14/870,694, dated Dec. 11, 2018, 6 pages.
Notice of Allowance received for U.S. Appl. No. 14/870,694, dated Jul. 31, 2018, 7 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/137,944, dated Dec. 21, 2017, 8 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,086, dated Jun. 7, 2017, 8 pages.

(56) References Cited

OTHER PUBLICATIONS

Notice of Allowance received for U.S. Appl. No. 15/274,086, dated Oct. 19, 2017, 9 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/351,230, dated Dec. 11, 2019, 11 pages.
Notice of Allowance received for U.S. Appl. No. 15/782,068, dated Sep. 24, 2019, 7 pages.
Notice of Allowance received for U.S. Appl. No. 15/845,794, dated Feb. 14, 2019, 6 pages.
Notice of Allowance received for U.S. Appl. No. 15/866,341, dated Jul. 26, 2019, 8 pages.
Notice of Allowance received for U.S. Appl. No. 15/894,221, dated Apr. 11, 2019, 5 pages.
Notice of Allowance received for U.S. Appl. No. 15/894,221, dated Aug. 13, 2019, 2 pages.
Notice of Allowance received for U.S. Appl. No. 15/894,221, dated Feb. 1, 2019, 5 pages.
Notice of Allowance received for U.S. Appl. No. 15/894,221, dated Mar. 4, 2019, 2 pages.
Notice of Allowance received for U.S. Appl. No. 15/903,456, dated May 1, 2019, 6 pages.
Notice of Allowance received for U.S. Appl. No. 15/945,610, dated May 20, 2019, 7 pages.
Notice of Allowance received for U.S. Appl. No. 15/992,722, dated Oct. 19, 2020, 5 pages.
Notice of Allowance received for U.S. Appl. No. 16/131,767, dated Sep. 6, 2019, 7 pages.
Notice of Allowance received for U.S. Appl. No. 16/147,023, dated Apr. 3, 2020, 2 pages.
Notice of Allowance received for U.S. Appl. No. 16/147,023, dated Aug. 13, 2020, 2 pages.
Notice of Allowance received for U.S. Appl. No. 16/147,023, dated Feb. 27, 2020, 2 pages.
Notice of Allowance received for U.S. Appl. No. 16/147,023, dated Jan. 31, 2020, 7 pages.
Notice of Allowance received for U.S. Appl. No. 16/147,023, dated Jul. 2, 2020, 2 pages.
Notice of Allowance received for U.S. Appl. No. 16/147,023, dated Jul. 21, 2020, 2 pages.
Notice of Allowance received for U.S. Appl. No. 16/147,023, dated Jun. 1, 2020, 2 pages.
Notice of Allowance received for U.S. Appl. No. 16/147,023, dated Jun. 18, 2020, 2 pages.
Notice of Allowance received for U.S. Appl. No. 16/147,023, dated Mar. 27, 2020, 2 pages.
Notice of Allowance received for U.S. Appl. No. 16/147,023, dated May 5, 2020, 2 pages.
Notice of Allowance received for U.S. Appl. No. 16/147,023, dated May 20, 2020, 7 pages.
Notice of Allowance received for U.S. Appl. No. 16/147,115, dated Oct. 30, 2019, 10 pages.
Notice of Allowance received for U.S. Appl. No. 16/164,561, dated Apr. 8, 2020, 5 pages.
Notice of Allowance received for U.S. Appl. No. 16/434,865, dated Apr. 7, 2020, 5 pages.
Notice of Allowance received for U.S. Appl. No. 16/542,084, dated May 20, 2020, 7 pages.
Notice of Allowance received for U.S. Appl. No. 16/667,271, dated May 12, 2020, 11 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages (7 pages of English Translation and 7 pages of Official Copy).
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016102031, dated Feb. 28, 2017, 4 pages.
Office Action received for Australian Patent Application No. 2017100070, dated Mar. 16, 2017, 6 pages.
Office Action received for Australian Patent Application No. 2017100553, dated Aug. 4, 2017, 5 pages.
Office Action received for Australian Patent Application No. 2017100558, dated Sep. 1, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2017317605, dated Apr. 11, 2019, 4 pages.
Office Action received for Australian Patent Application No. 2017317605, dated Feb. 22, 2019, 4 pages.
Office Action received for Australian Patent Application No. 2017324176, dated Apr. 21, 2020, 3 pages.
Office Action received for Australian Patent Application No. 2017324176, dated Aug. 17, 2020, 5 pages.
Office Action received for Australian Patent Application No. 2017324176, dated Feb. 27, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018200628, dated Jan. 24, 2019, 3 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2018279788, dated Feb. 8, 2019, 4 pages.
Office Action received for Australian Patent Application No. 2018312629, dated Feb. 25, 2019, 4 pages.
Office Action received for Australian Patent Application No. 2019201101, dated Feb. 28, 2019, 3 pages.

(56) References Cited

OTHER PUBLICATIONS

Office Action received for Australian Patent Application No. 2019203473, dated Oct. 25, 2019, 2 pages.
Office Action received for Australian Patent Application No. 2019250143, dated Sep. 15, 2020, 5 pages.
Office Action received for Australian Patent Application No. 2020200685, dated Apr. 20, 2020, 3 pages.
Office Action received for Australian Patent Application No. 2020200685, dated Aug. 12, 2020, 3 pages.
Office Action received for Australian Patent Application No. 2020200685, dated Feb. 10, 2020, 4 pages.
Office Action received for Australian Patent Application No. 2020239783, dated Oct. 13, 2020, 4 pages.
Office Action received for Chinese Patent Application No. 201510284715.9, dated Apr. 14, 2020, 19 pages (7 pages of English Translation and 12 pages of Official Copy).
Office Action received for Chinese Patent Application No. 201510284715.9, dated Dec. 18, 2019, 24 pages (7 pages of English Translation and 17 pages of Official Copy).
Office Action received for Chinese Patent Application No. 201510284715.9, dated Dec. 21, 2018, 22 pages (5 pages of English Translation and 17 pages of Official Copy).
Office Action received for Chinese Patent Application No. 201510284715.9, dated Jun. 19, 2019, 26 pages (8 pages of English Translation and 18 pages of Official Copy).
Office Action received for Chinese Patent Application No. 201510284896.5, dated Jun. 28, 2018, 15 pages (4 pages of English Translation and 11 pages of Official Copy).
Office Action received for Chinese Patent Application No. 201510284896.5, dated Mar. 6, 2019, 13 pages (4 pages of English Translation and 9 pages of Official Copy).
Office Action received for Chinese Patent Application No. 201510284896.5, dated Sep. 3, 2019, 9 pages (2 pages of English Translation and 7 pages of Official Copy).
Office Action received for Chinese Patent Application No. 201520358683.8, dated Sep. 2, 2015, Sep. 2, 2015, 4 pages (2 pages of English Translation and 2 pages of Official Copy).
Office Action received for Chinese Patent Application No. 201610069731.0, dated Mar. 5, 2019, 10 pages (5 pages of English Translation and 5 pages of Official Copy).
Office Action received for Chinese Patent Application No. 201620101636.X, dated May 25, 2016, 3 pages (1 page of English Translation and 2 pages of Official Copy).
Office Action received for Chinese Patent Application No. 201620101636.X, dated Oct. 13, 2016, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).
Office Action received for Chinese Patent Application No. 201620480708.6, dated Sep. 14, 2016, 3 pages (1 page of English Translation and 2 pages of Official Copy ).
Office Action received for Chinese Patent Application No. 201620480846.4, dated Jan. 9, 2017, 3 pages (1 page of English Translation and 2 pages of Official Copy ).
Office Action received for Chinese Patent Application No. 201620480846.4, dated Sep. 14, 2016, 3 pages (1 page of English Translation and 2 pages of Official Copy).
Office Action received for Chinese Patent Application No. 201710093861.2, dated Mar. 5, 2019, 6 pages (3 pages of English Translation and 3 pages of Official Copy).
Office Action received for Chinese Patent Application No. 201710093861.2, dated Sep. 14, 2018, 15 pages (6 pages of English Translation and 9 pages of Official copy).
Office Action received for Chinese Patent Application No. 201710094150.7, dated Dec. 19, 2018, 12 Pages (5 pages of English Translation and 7 pages of Official Copy).
Office Action received for Chinese Patent Application No. 201710094150.7, dated Jul. 31, 2019, 6 pages (2 pages of English Translation and 4 pages of Official Copy).
Office Action received for Chinese Patent Application No. 201711292804.3, dated Aug. 5, 2020, 26 pages (16 pages of English Translation and 10 pages of Official Copy).
Office Action received for Chinese Patent Application No. 201780002398.4, dated Feb. 27, 2019, 6 pages (3 pages of English Translation and 3 pages of Official Copy).
Office Action received for Chinese Patent Application No. 201780002398.4, dated Sep. 12, 2018, 17 pages (5 pages of English Translation and 12 pages of Official Copy).
Office Action received for Chinese Patent Application No. 201780002648.4, dated Dec. 5, 2018, 13 pages (5 pages of English Translation and 8 pages of Official Copy).
Office Action received for Chinese Patent Application No. 201780002648.4, dated Jun. 12, 2019, 11 pages (5 pages of English Translation and 6 pages of Official Copy).
Office Action received for Chinese Patent Application No. 201780002648.4, dated Nov. 26, 2019, 10 pages (4 pages of English Translation and 6 pages of Official Copy).
Office Action received for Chinese Patent Application No. 201810094316.X, dated Apr. 28, 2019, 9 pages (3 pages of English Translation and 6 pages of Official Copy).
Office Action received for Chinese Patent Application No. 201810094316.X, dated Aug. 5, 2019, 9 pages (3 pages of English Translation and 6 pages of Official Copy).
Office Action received for Chinese Patent Application No. 201810094316.X, dated Oct. 29, 2018, 12 pages (5 pages of English Translation and 7 pages of Official Copy).
Office Action received for Chinese Patent Application No. 201810338038.8, dated Jan. 21, 2020, 26 pages (13 pages of English Translation and 13 pages of Official Copy).
Office Action received for Chinese Patent Application No. 201810338038.8, dated May 14, 2019, 26 pages (13 pages of English Translation and 13 pages of Official Copy).
Office Action received for Chinese Patent Application No. 201810338826.7, dated Apr. 3, 2019, 21 pages (13 pages of English Translation and 8 pages of Official Copy).
Office Action received for Chinese Patent Application No. 201810338826.7, dated Jan. 16, 2020, 16 Pages (10 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201811460172.1, dated Jan. 21, 2020, 17 pages (8 pages of English Translation and 9 pages of Official Copy).
Office Action received for Chinese Patent Application No. 201910070375.8, dated Dec. 4, 2019, 23 pages (12 pages of English Translation and 11 pages of Official Copy).
Office Action received for Chinese Patent Application No. 201910070375.8, dated Sep. 3, 2020, 8 pages (4 pages of English Translation and 4 pages of Official Copy).
Office Action received for Chinese Patent Application No. 201910109868.8, dated Jun. 30, 2020, 15 pages (7 pages of English Translation and 8 pages of Official Copy).
Office Action received for Chinese Patent Application No. 201910109868.8, dated Mar. 16, 2020, 19 pages (10 pages of English Translation and 9 pages of Official Copy).
Office Action received for Chinese Patent Application No. 201910109868.8, dated Sep. 19, 2019, 23 pages (11 pages of English Translation and 12 pages of Official Copy).
Office Action received for Chinese Patent Application No. 201910246439.5, dated Apr. 23, 2020, 14 pages (7 pages of English Translation and 7 pages of Official Copy).
Office Action received for Chinese Patent Application No. 201910246439.5, dated Oct. 15, 2019, 17 pages (9 pages of English Translation and 8 pages of Official Copy).
Office Action received for Chinese Patent Application No. 201910246439.5, dated Sep. 2, 2020, 15 pages (8 pages of English Translation and 7 pages of Official Copy).
Office Action received for Chinese Patent Application No. 201910354714.5, dated Feb. 3, 2020, 12 pages (7 pages of English Translation and 5 pages of Official Copy).

(56) References Cited

OTHER PUBLICATIONS

Office Action received for Chinese Patent Application No. 201910498825.3, dated May 21, 2020, 16 pages (9 pages of English Translation and 7 pages of Official Copy).
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for Danish Patent Application No. PA201770712, dated Jul. 20, 2018, 4 pages.
Office Action received for Danish Patent Application No. PA201770712, dated Mar. 1, 2019, 3 pages.
Office Action received for Danish Patent Application No. PA201770713, dated Apr. 18, 2018, 4 pages.
Office Action received for Danish Patent Application No. PA201770713, dated Jun. 7, 2019, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for Danish Patent Application No. PA201770804, dated Nov. 6, 2018, 4 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for Danish Patent Application No. PA201870855, dated May 14, 2020, 4 pages.
Office Action received for Danish Patent Application No. PA201870855, dated Nov. 7, 2019, 4 pages.
Office Action received for Danish Patent Application No. PA201970127, dated Dec. 20, 2019, 3 pages.
Office Action received for Danish Patent Application No. PA201970127, dated Feb. 24, 2020, 2 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 15727291.5, dated Jan. 15, 2018, 8 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated ep. 17, 2018, 7 pages.
Office Action received for European Patent Application No. 17799904.2, dated Oct. 21, 2020, 6 pages.
Office Action received for European Patent Application No. 17865509.8, dated Jul. 28, 2020, 8 pages.
Office Action received for European Patent Application No. 17865509.8, dated Oct. 10, 2019, 6 pages.
Office Action received for European Patent Application No. 18208881.5, dated Jun. 11, 2019, 5 pages.
Office Action received for European Patent Application No. 18713408.5, dated May 20, 2019, 5 pages.
Office Action received for European Patent Application No. 18713408.5, dated May 26, 2020, 5 pages.
Office Action received for European Patent Application No. 18713408.5, dated Nov. 20, 2019, 4 pages.
Office Action received for European Patent Application No. 18830326.7, dated Apr. 30, 2020, 5 pages.
Office Action received for European Patent Application No. 18830326.7, dated Aug. 13, 2020, 6 pages.
Office Action received for European Patent Application No. 18830326.7, dated Aug. 27, 2019, 6 pages.
Office Action received for European Patent Application No. 18830326.7, dated Nov. 22, 2019, 8 pages.
Office Action received for European Patent Application No. 18830326.7, dated Sep. 16, 2019, 6 pages.
Office Action received for European Patent Application No. 19150528.8, dated Jul. 1, 2020, 6 pages.
Office Action received for European Patent Application No. 19160348.9, dated May 14, 2020, 4 pages.
Office Action received for European Patent Application No. 19171661.2, dated Aug. 7, 2019, 7 pages.
Office Action received for European Patent Application No. 19186538.5, dated Oct. 12, 2020, 7 pages.
Office Action received for European Patent Application No. 19194828.0, dated Oct. 15, 2020, 7 pages.
Office Action received for German Patent Application No. 202015004267.8, dated Nov. 4, 2015, 4 pages (3 pages of English Translation and 1 pages of Official Copy).
Office Action received for German Patent Application No. 202017005507.4, dated Feb. 5, 2018, 2 pages (1 page of English Translation and 1 page of Official Copy).
Office Action received for Indian Patent Application No. 201617039493, dated Oct. 21, 2019, 6 pages.
Office Action received for Japanese Patent Application No. 2016-224506, dated May 14, 2019, 22 pages (11 pages of English Translation and 11 pages of Official Copy).
Office Action received for Japanese Patent Application No. 2016-224507, dated Jun. 16, 2017, 16 pages (8 pages of English Translation and 8 pages of Official Copy).
Office Action received for Japanese Patent Application No. 2016-558332, dated Dec. 8, 2017, 12 pages (6 pages of English Translation and 6 pages of Official copy).
Office Action received for Japanese Patent Application No. 2016-558332, dated Jul. 27, 2018, 9 pages (4 pages of English Translation and 5 pages of Official Copy).

(56) References Cited

OTHER PUBLICATIONS

Office Action received for Japanese Patent Application No. 2016-569665, dated Aug. 20, 2018, 9 pages (4 pages of English Translation and 5 pages of Official Copy).
Office Action received for Japanese Patent Application No. 2016-569665, dated Jan. 19, 2018, 10 pages (5 pages of English Translation and 5 pages of Official Copy).
Office Action received for Japanese Patent Application No. 2017-075031, dated Jul. 30, 2018, 16 pages (8 pages of English Translation and 8 pages of Official Copy).
Office Action received for Japanese Patent Application No. 2017-540616, dated Jan. 12, 2018, 24 pages (13 pages of English Translation and 11 pages of Official Copy).
Office Action received for Japanese Patent Application No. 2017-540616, dated Jul. 27, 2018, 20 pages (11 pages of English Translation and 9 pages of Official copy).
Office Action received for Japanese Patent Application No. 2018-158482, dated Jan. 10, 2020, 9 pages (5 pages of English Translation and 4 pages of Official Copy).
Office Action received for Japanese Patent Application No. 2018-551159, dated Jan. 27, 2020, 8 pages (4 pages of English Translation and 4 pages of Official Copy).
Office Action received for Japanese Patent Application No. 2018-551159, dated Sep. 30, 2019, 6 pages (3 pages of English Translation and 3 pages of Official Copy).
Office Action received for Japanese Patent Application No. 2018-560107, dated Jun. 14, 2019, 26 pages (13 pages of English Translation and 13 pages of Official Copy).
Office Action received for Japanese Patent Application No. 2019-053379, dated May 29, 2020, 11 pages (6 pages of English Translation and 5 pages of Official Copy).
Office Action received for Japanese Patent Application No. 2019-053379, dated Oct. 18, 2019, 11 pages (6 pages of English Translation and 5 pages of Official Copy).
Office Action received for Japanese Patent Application No. 2019-096220, dated Sep. 9, 2019, 8 pages (4 pages of English Translation and 4 pages of Official Copy).
Office Action received for Japanese Patent Application No. 2019-107235, dated Oct. 18, 2019, 8 pages (4 pages of English Translation and 4 pages of Official Copy).
Office Action received for Japanese Patent Application No. 2019-238894, dated Mar. 6, 2020, 7 pages (3 pages of English Translation and 4 pages of Official Copy).
Office Action received for Japanese Patent Application No. 2019-510416, dated May 15, 2020, 4 pages (2 pages of English Translation and 2 pages of Official Copy).
Office Action received for Japanese Patent Application No. 2019-510416, dated Oct. 18, 2019, 4 pages (2 pages of English Translation and 2 pages of Official copy).
Office Action received for Japanese Patent Application No. 2020-028315, dated Jul. 6, 2020, 18 pages (10 pages of English Translation and 8 pages of Official Copy).
Office Action received for Korean Patent Application No. 10-2014-7008348, dated Jan. 22, 2019, 16 pages (1 page of English Translation and 15 pages of Official Copy).
Office Action received for Korean Patent Application No. 10-2016-0152210, dated Jan. 29, 2019, 7 pages (3 pages of English Translation and 4 pages of Official Copy).
Office Action received for Korean Patent Application No. 10-2016-0152210, dated May 14, 2018, 13 pages (6 pages of English Translation and 7 pages of Official Copy).
Office Action received for Korean Patent Application No. 10-2016-0152210, dated May 30, 2019, 8 pages (4 pages of English Translation and 4 pages of Official copy).
Office Action received for Korean Patent Application No. 10-2016-7035555, dated Dec. 26, 2017, 5 pages (2 pages of English Translation and 3 pages of Official Copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-0022365, dated Jun. 26, 2017, 10 pages (4 pages of English Translation and 6 pages of Official Copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2017-0022582, dated Jul. 31, 2019, 5 pages (2 pages of English Translation and 3 pages of Official Copy).
Office Action received for Korean Patent Application No. 10-2017-0022582, dated Sep. 19, 2018, 6 pages (2 pages of English Translation and 4 pages of Official Copy).
Office Action received for Korean Patent Application No. 10-2017-7012145, dated Jul. 18, 2019, 5 pages (2 Pages of English Translation and 3 Pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2018-7019643, dated Jan. 6, 2020, 7 pages (3 pages of English Translation and 4 pages of Official Copy).
Office Action received for Korean Patent Application No. 10-2018-7019643, dated Jul. 2, 2019, 12 pages (5 pages of English Translation and 7 pages of Official Copy).
Office Action received for Korean Patent Application No. 10-2018-7033301, dated Dec. 14, 2018, 6 pages (2 pages of English Translation and 4 pages of Official Copy).
Office Action received for Korean Patent Application No. 10-2019-7003374, dated Jun. 10, 2019, 7 pages (2 pages of English Translation and 5 pages of official copy).
Office Action received for Korean Patent Application No. 10-2019-7003836, dated Jun. 14, 2019, 7 pages (2 pages of English Translation and 5 pages of Official Copy).
Office Action received for Korean Patent Application No. 10-2019-7004734, dated Jul. 4, 2019, 7 pages (2 pages of English Translation and 5 pages of Official Copy).
Office Action received for Korean Patent Application No. 10-2019-7005925, dated Jul. 4, 2019, 24 pages (11 pages of English Translation and 13 pages of Official Copy).
Office Action received for Korean Patent Application No. 10-2019-7014494, dated Jun. 14, 2019, 11 pages (5 pages of English Translation and 6 pages of Official Copy).
Office Action received for Korean Patent Application No. 10-2020-0097418, dated Aug. 28, 2020, 6 pages (2 pages of English Translation and 4 pages of Official Copy).
Office Action received for Korean Patent Application No. 10-2020-7002929, dated Mar. 22, 2020, 5 pages (2 pages of English Translation and 3 pages of Official Copy).
Office Action received for Korean Patent Application No. 10-2020-7010007, dated Aug. 26, 2020, 12 pages (5 pages of English Translation and 7 pages of Official Copy).
Office Action received for Taiwanese Patent Application No. 104117508, dated Jul. 14, 2017, 9 pages (4 pages of English Translation and 5 pages of Official Copy).
Office Action received for Taiwanese Patent Application No. 104117508, dated Jul. 20, 2016, 19 pages (8 pages of English Translation and 11 pages of Official Copy).
Office Action received for Taiwanese Patent Application No. 104117508, dated Mar. 20, 2017, 22 pages (9 pages of English Translation and 13 pages of Official Copy).
Office Action received for Taiwanese Patent Application No. 104117508, dated Jan. 25, 2019, 24 pages (5 pages of English Translation and 19 pages of Official Copy).
Office Action received for Taiwanese Patent Application No. 104117508, dated May 22, 2019, 7 pages (3 pages of English Translation and 4 pages of Official Copy).
Okazolab, "Kinect Based 3D Head Tracking in Behavioural Research", Available online at: <https://www.youtube.com/watch?v=nigRvT9beQw>, Aug. 8, 2012, 3 pages.

(56) References Cited

OTHER PUBLICATIONS

Onefacein, "[How It Works] Securing Your Smartphone with OneFaceIn", Biometric Password Manager, Available at <https://www.youtube.com/watch?v=h-JG5SPxBQ0>, Dec. 2, 2016, 1 page.
Page Sebastien, "Leaked iOS 11 GM details how you will set up Face ID on your iPhone 8", Online available at:https://www.idownloadblog.com/2017/09/08/leaked-ios-11-gm-details-how-you-will-set-up-face-id-on-your-iphone-8/, Sep. 8, 2017, 9 pages.
Phonebuff, "How to Use Face Unlock on Android 4.0 ICS", Retrieved from <https://www.youtube.com/watch?v=0ASf6jkpFKE>, Dec. 15, 2011, 1 page.
Pre-Brief Appeal Conference decision received for U.S. Appl. No. 14/869,831, mailed on Jan. 18, 2019, 3 pages.
PSP Security Ltd, "AccuFACE features", Available online at <https://www.youtube.com/watch?v=p3jvGoEbioY>, Oct. 14, 2009, 1 page.
PSP Security Ltd, "PSP Security—AccuFACE Step by Step Enrollment Process", Available online at <https://www.youtube.com/watch?v=0llF5OOdya0>, Oct. 14, 2009, 1 page.
Real Solution of two-step-authentication Password Management for Authentication Enhancement, Fukuda Takao, Nikkei PC, JPN, Nikkei Business Publications, Inc., No. 694, Mar. 24, 2014, 11 pages (3 pages of English Translation and 8 pages of Official Copy).
Record of Oral Hearing received for U.S. Appl. No. 14/869,831, mailed on Oct. 6, 2020, 12 pages.
Result of Consultation received for European Patent Application No. 16703893.4, dated Jun. 7, 2019, 3 pages.
Schofield Tim, "Face Unlock Live Demonstration on the HTC EVO 4G LTE", Retrieved from <https://www.youtube.com/watch?v=TNL9Or_9SWg>, May 31, 2012, 1 page.
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Search Report and Opinion received for Danish Patent Application No. PA201870855, dated Apr. 3, 2019, 12 pages.
Search Report and Opinion received for Danish Patent Application No. PA201970127, dated Oct. 4, 2019, 9 pages.
Search Report received for Germany Patent Application No. 202017005507.4, dated Jan. 2, 2019, 6 pages (1 page of English Translation and 5 pages of Official Copy).
Sensory Trulysecure, "AppLock Face/Voice Recognition", Available at <https://www.youtube.com/watch?v=odax5O51aT0>, May 27, 2015, 1 page.
Summons to Attend Oral Proceedings received for European Patent Application No. 12770400.5, dated Mar. 19, 2018, 10 pages.
Summons to Attend Oral Proceedings received for European Patent Application No. 15727291.5, dated Jan. 28, 2020, 13 pages.
Summons to Attend Oral Proceedings received for European Patent Application No. 15728352.4, dated May 12, 2020, 25 pages.
Summons to Attend Oral Proceedings received for European Patent Application No. 15728352.4, dated Nov. 18, 2019, 15 pages.
Summons to Attend Oral Proceedings received for European Patent Application No. 16201195.1, dated Sep. 4, 2018, 21 pages.
Summons to Attend Oral Proceedings received for European Patent Application No. 16201205.8, dated Jan. 28, 2020, 18 pages.
Summons to Attend Oral Proceedings received for European Patent Application No. 16703893.4, dated Mar. 26, 2019, 14 pages.
Summons to Attend Oral Proceedings received for European Patent Application No. 19171661.2, mailed on Apr. 16, 2020, 12 pages.
Summons to Attend Oral Proceedings received for European Patent Application No. 19171661.2, mailed on Jun. 2, 2020, 13 pages.
Supplemental Notice of Allowance received for U.S. Appl. No. 14/870,694, dated Jan. 17, 2019, 3 pages.
Thanakulmas Thanit, "MasterCard Identity Check Facial Recognition Biometrics", Available at <https://www.youtube.com/watch?v=g4sMbrkt1gl>, Oct. 10, 2016, 1 page.
Wikipedia, "QR code", Available online at: https://en.wikipedia.org/w/index.php?title=OR_code&oldid=452939488, Sep. 28, 2011, pp. 1-9.
Applicant-Initiated Interview Summary received for U.S. Appl. No. 16/125,267, dated Oct. 25, 2021, 4 pages.
Applicant-Initiated Interview Summary received for U.S. Appl. No. 16/667,174, dated Oct. 25, 2021, 2 pages.
Board Opinion received for Chinese Patent Application No. 201810094316.X, dated Sep. 30, 2021, 11 pages (3 pages of English Translation and 8 pages of Official Copy).
Notice of Acceptance received for Australian Patent Application No. 2020204256, dated Oct. 9, 2021, 3 pages.
Notice of Allowance received for U.S. Appl. No. 17/015,429, dated Oct. 8, 2021, 5 pages.
Notice of Allowance received for U.S. Appl. No. 17/015,429, dated Oct. 22, 2021, 2 pages.
Office Action received for European Patent Application No. 19160344.8, dated Oct. 7, 2021, 8 pages.
Office Action received for European Patent Application No. 19186538.5, dated Oct. 22, 2021, 7 pages.
International Preliminary Report on Patentability received for PCT Patent Application No. PCT/US2019/035092, dated Dec. 17, 2020, 10 pages.
Office Action received for Korean Patent Application No. 10-2019-7006639, dated Dec. 21, 2020, 20 pages (10 pages of English Translation and 10 pages of Official Copy).
Decision on Request for Rehearing received for U.S. Appl. No. 14/869,831, mailed on Mar. 8, 2021, 9 pages.
Notice of Allowance received for Chinese Patent Application No. 201910498825.3, dated Mar. 8, 2021, 2 pages (1 page of English Translation and 1 page of Official Copy).
Notice of Acceptance received for Australian Patent Application No. 2020239783, dated Mar. 2, 2021, 3 pages.
Office Action received for Chinese Patent Application No. 201711292804.3, dated Feb. 23, 2021, 17 pages (8 pages of English Translation and 9 pages of Official Copy).
Brief Communication Regarding Oral Proceedings received for European Patent Application No. 17865509.8, mailed on Nov. 1, 2021, 2 pages.
Intention to Grant received for European Patent Application No. 18713408.5, dated Oct. 28, 2021, 10 pages.
Notice of Allowance received for Japanese Patent Application No. 2020-103213, dated Oct. 25, 2021, 4 pages (1 page of English Translation and 3 pages of Official Copy).
Office Action received for Chinese Patent Application No. 201810339290.0, dated Oct. 18, 2021, 20 pages (11 pages of English Translation and 9 pages of Official Copy).
Office Action received for Indian Patent Application No. 201817036875, dated Oct. 29, 2021, 8 pages.
Pu Fang, "Research on Location-aware Service in Pervasive Computing", Issue No. 7, Information Technology Series, China Doctoral Dissertations, Jul. 15, 2008, 140 pages (Official Copy only). See communication under 37 CFR § 1.98(a) (3).
Result of Consultation received for European Patent Application No. 17865509.8, dated Nov. 2, 2021, 3 pages.
Extended European Search Report received for European Patent Application No. 20198076.0, dated Jan. 13, 2021, 8 pages.
Notice of Allowance received for Chinese Patent Application No. 201811460172.1, dated Jan. 11, 2021, 2 pages (1 page of English Translation and 1 page of Official Copy).
Notice of Allowance received for U.S. Appl. No. 16/990,974, dated Jan. 22, 2021, 7 pages.
Office Action received for European Patent Application No. 17835789.3, dated Jan. 20, 2021, 14 pages.
Decision to Grant received for European Patent Application No. 18830326.7, dated Nov. 11, 2021, 3 pages.
International Search Report and Written Opinion received for PCT Patent Application No. PCT/US2021/037949, dated Nov. 12, 2021, 19 pages.

(56) References Cited

OTHER PUBLICATIONS

Non-Final Office Action received for U.S. Appl. No. 16/125,267, dated Nov. 23, 2021, 21 pages.
Notice of allowance received for Japanese Patent Application No. 2020-159979, dated Nov. 8, 2021, 4 pages (1 page of English Translation and 3 pages of Official Copy).
Notice of Allowance received for Korean Patent Application No. 10-2021-0099243, dated Oct. 30, 2021, 4 pages (1 page of English Translation and 3 pages of Official Copy).
Notice of Allowance received for U.S. Appl. No. 17/015,429, dated Nov. 24, 2021, 2 pages.
Office Action received for Chinese Patent Application No. 201810338040.5, dated Oct. 25, 2021, 22 pages (13 pages of English Translation and 9 pages of Official Copy).
Office Action received for Indian Patent Application No. 201918003782, dated Nov. 18, 2021, 8 pages.
Office Action received for Indian Patent Application No. 202018014786, dated Nov. 9, 2021, 7 pages.
Corrected Notice of Allowance received for U.S. Appl. No. 16/670,949, dated Sep. 8, 2021, 2 pages.
Intention to Grant received for European Patent Application No. 18830326.7, dated Sep. 15, 2021, 11 pages.
Notice of Allowance received for U.S. Appl. No. 16/670,949, dated Sep. 14, 2021, 7 pages.
Notice of Allowance received for U.S. Appl. No. 17/015,429, dated Sep. 22, 2021, 6 pages.
Applicant-Initiated Interview Summary received for U.S. Appl. No. 16/125,267, dated Jun. 25, 2021, 5 pages.
Brief Communication Regarding Oral Proceedings received for European Patent Application No. 16201159.7, mailed on Jun. 29, 2021, 13 pages.
Brief Communication Regarding Oral Proceedings received for European Patent Application No. 18830326.7, mailed on Jun. 30, 2021, 2 pages.
European Search Report received for European Patent Application No. 21150992.2, dated Jun. 23, 2021, 6 pages.
Non-Final Office Action received for U.S. Appl. No. 16/667,174, dated Jun. 24, 2021, 16 pages.
Notice of Allowance received for U.S. Appl. No. 14/869,831, dated Jul. 2, 2021, 9 pages.
Notice of Allowance received for U.S. Appl. No. 17/015,429, dated Jun. 17, 2021, 10 pages.
Office Action received for Australian Patent Application No. 2020204256, dated Jun. 21, 2021, 2 pages.
Office Action received for Chinese Patent Application No. 201780069966.2, dated Jun. 1, 2021, 23 pages (12 pages of English Translation and 11 pages of Official Copy).
Office Action received for Chinese Patent Application No. 201810338040.5, dated Jun. 3, 2021, 25 pages (15 pages of English Translation and 10 pages of Official Copy).
Office Action received for Chinese Patent Application No. 201810339290.0, dated Jun. 4, 2021, 20 pages (11 pages of English Translation and 9 pages of Official Copy).
Office Action received for Korean Patent Application No. 10-2019-7006639, dated Jun. 15, 2021, 8 pages (4 pages of English Translation and 4 pages of Official Copy).
Office Action received for Korean Patent Application No. 10-2020-7010007, dated Jun. 21, 2021, 7 pages (3 pages of English Translation and 4 pages of Official Copy).
Result of Consultation received for European Patent Application No. 18830326.7, dated Jun. 21, 2021, 5 pages.
Notice of Allowance received for Chinese Patent Application No. 201810338040.5, dated Mar. 30, 2022, 6 pages (2 pages of English Translation and 4 pages of Official Copy).
Qiye Wang, "Design and Implementation of SAN Device Access Control in Unified Storage Platform", master's Theses, Huazhong University of Science & Technology, Wuhan, Jun. 2008, 63 pages (Official Copy only). (See Communication under 37 CFR § 1.98(a)(3)).
Applicant-Initiated Interview Summary received for U.S. Appl. No. 16/125,267, dated Feb. 8, 2021, 3 pages.
Office Action received for Australian Patent Application No. 2017324176, dated Jan. 14, 2021, 6 pages.
Summons to Attend Oral Proceedings received for European Patent Application No. 16201159.7, mailed on Feb. 4, 2021, 12 pages.
"Use NFC with Screen Off or in Lock Screen on Galaxy Nexus", Available online at: https://www.xda-developers.com/use-nfc-with-screen-off-or-in-lock-screen-on-galaxy-nexus/, Jun. 14, 2012, 4 pages.
Extended European Search Report received for European Patent Application No. 20186286.9, dated Nov. 2, 2020, 9 pages.
Notice of Acceptance received for Australian Patent Application No. 2020200685, dated Oct. 29, 2020, 3 pages.
Notice of Allowance received for Korean Patent Application No. 10-2020-7017803, dated Nov. 5, 2020, 6 pages (2 pages of English Translation and 4 pages of Official Copy).
Office Action received for European Patent Application No. 18713408.5, dated Nov. 4, 2020, 6 pages.
Applicant-Initiated Interview Summary received for U.S. Appl. No. 16/369,355, dated Jul. 28, 2021, 2 pages.
Notice of Allowance received for Korean Patent Application No. 10-2021-7020549, dated Jul. 13, 2021, 3 pages (1 page of English Translation and 2 pages of Official Copy).
Office Action received for European Patent Application No. 20186286.9, dated Jul. 29, 2021, 8 pages.
Summons to Attend Oral Proceedings received for European Patent Application No. 19150528.8, mailed on Mar. 15, 2022, 7 pages.
Non-Final Office Action received for U.S. Appl. No. 16/987,003, dated May 10, 2021, 20 pages.
Notice of Allowance received for Korean Patent Application No. 10-2020-0097418, dated Apr. 27, 2021, 5 pages (2 pages of English Translation and 3 pages of Official Copy).
Office Action received for Australian Patent Application No. 2020203899, dated May 5, 2021, 10 pages.
Office Action received for European Patent Application No. 18208881.5, dated May 7, 2021, 6 pages.
Office Action received for European Patent Application No. 19194828.0, dated May 10, 2021, 6 pages.
Adractas et al., "The road to mobile payments services", McKinsey on Payments, Sep. 2011, pp. 45-52.
Corrected Notice of Allowance received for U.S. Appl. No. 16/987,003, dated Sep. 1, 2021, 3 pages.
Final Office Action received for U.S. Appl. No. 16/125,267, dated Aug. 26, 2021, 22 pages.
Notice of Allowance received for Japanese Patent Application No. 2020-126751, dated Aug. 16, 2021, 4 pages (1 page of English Translation and 3 pages of Official Copy).
Notice of Allowance received for U.S. Appl. No. 16/369,355, dated Sep. 1, 2021, 10 pages.
Office Action received for Australian Patent Application No. 2020289822, dated Aug. 24, 2021, 7 pages.
Office Action received for Korean Patent Application No. 10-2020-7034180, dated Aug. 17, 2021, 15 pages (6 pages of English Translation and 9 pages of Official Copy).
Result of Consultation received for European Patent Application No. 18713408.5, dated Aug. 30, 2021, 5 pages.
Supplemental Notice of Allowance received for U.S. Appl. No. 14/869,831, dated Aug. 20, 2021, 2 pages.
Board Opinion received for Chinese Patent Application No. 201810338826.7, dated Jan. 19, 2022, 18 pages (6 pages of English Translation and 12 pages of Official Copy).
Ex Parte Quayle Action received for U.S. Appl. No. 14/869,831, mailed on May 28, 2021, 16 pages.
Notice of Allowance received for Chinese Patent Application No. 201910744886.3, dated Jun. 3, 2021, 2 pages (1 page of English Translation and 1 page of Official Copy).
Notice of Allowance received for U.S. Appl. No. 15/823,269, dated Jun. 3, 2021, 6 pages.
Notice of Allowance received for U.S. Appl. No. 16/670,949, dated May 27, 2021, 7 pages.
Office Action received for Japanese Patent Application No. 2020-159979, dated May 10, 2021, 9 pages (5 pages of English Translation and 4 pages of Official Copy).

(56) References Cited

OTHER PUBLICATIONS

Applicant-Initiated Interview Summary received for U.S. Appl. No. 16/125,267, dated Jan. 25, 2022, 5 pages.
Notice of Acceptance received for Australian Patent Application No. 2020273355, dated Jan. 17, 2022, 3 pages.
Office Action received for Chinese Patent Application No. 201710094150.7, dated Jan. 10, 2022, 6 pages (3 pages of English Translation and 3 pages of Official Copy).
Notice of Acceptance received for Australian Patent Application No. 2019250143, dated Jan. 29, 2021, 3 pages.
Notice of Allowance received for U.S. Appl. No. 15/823,269, dated Feb. 22, 2021, 7 pages.
Office Action received for Chinese Patent Application No. 201910744886.3, dated Jan. 18, 2021, 7 pages (1 page of English Translation and 6 pages of Official Copy).
Office Action received for Japanese Patent Application No. 2020-126751, dated Jan. 5, 2021, 8 pages (4 pages of English Translation and 4 pages of Official Copy).
Office Action received for Korean Patent Application No. 10-2020-7027862, dated Jan. 29, 2021, 8 pages (3 pages of English Translation and 5 pages of Official Copy).
Wang Na, "Research of Face Detection System Based on Mobile Phone Platform", Video Engineering, vol. 36, No. 11, Nov. 2012, 5 pages (Official Copy Only) (See communication under 37 CFR § 1.98(a) (3)).
Notice of Allowance received for Chinese Patent Application No. 201810339290.0, dated Mar. 9, 2022, 2 pages (1 page of English Translation and 1 page of Official Copy).
Office Action received for Korean Patent Application No. 10-2021-7032984, dated Feb. 22, 2022, 8 pages (4 pages of English Translation and 4 pages of Official Copy).
Applicant-Initiated Interview Summary received for U.S. Appl. No. 16/670,949, dated Apr. 6, 2021, 2 pages.
Non-Final Office Action received for U.S. Appl. No. 16/125,267, dated Mar. 26, 2021, 20 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for Korean Patent Application No. 10-2021-7005691, dated Mar. 29, 2021, 3 pages (1 page of English Translation and 2 pages of Official Copy).
Notice of Allowance received for U.S. Appl. No. 15/433,320, dated Apr. 1, 2021, 19 pages.
Notice of Allowance received for U.S. Appl. No. 15/823,269, dated Mar. 31, 2021, 9 pages.
Notice of Allowance received for U.S. Appl. No. 16/583,989, dated Apr. 1, 2021, 5 pages.
Notice of Allowance received for U.S. Appl. No. 16/584,490, dated Mar. 26, 2021, 13 pages.
Office Action received for European Patent Application No. 17810682.9, dated Mar. 26, 2021, 8 pages.
Office Action received for European Patent Application No. 19160344.8, dated Mar. 26, 2021, 7 pages.
Office Action received for Korean Patent Application No. 10-2020-7010007, dated Mar. 15, 2021, 7 pages (3 pages of English Translation and 4 pages of Official Copy).
Notice of Allowance received for U.S. Appl. No. 15/823,269, dated Mar. 10, 2021, 6 pages.

Office Action received for Australian Patent Application No. 2017324176, dated Feb. 25, 2021, 6 pages.
Summons to Attend Oral Proceedings received for European Patent Application No. 18830326.7, mailed on Feb. 25, 2021, 6 pages.
Applicant-Initiated Interview Summary received for U.S. Appl. No. 15/433,320, dated Nov. 25, 2020, 4 pages.
Notice of Allowance received for Japanese Patent Application No. 2019-053379, dated Nov. 16, 2020, 4 pages (1 page of English Translation and 3 pages of Official Copy).
Office Action received for Chinese Patent Application No. 201811460172.1, dated Oct. 14, 2020, 7 pages (4 pages of English Translation and 3 pages of Official Copy).
Office Action received for European Patent Application No. 19160348.9, dated Nov. 17, 2020, 6 pages.
Decision to Refuse received for European Patent Application No. 18208881.5, dated Dec. 23, 2022, 12 pages.
Minutes of Oral Proceedings received for European Patent Application No. 18208881.5, mailed on Dec. 22, 2022, 4 pages.
Non-Final Office Action received for U.S. Appl. No. 17/320,900, dated Dec. 22, 2022, 30 pages.
Office Action received for Japanese Patent Application No. 2020-184605, dated Dec. 12, 2022, 9 pages (4 pages of English Translation and 5 pages of Official Copy).
International Preliminary Report on Patentability received for PCT Patent Application No. PCT/US2021/037949, dated Jan. 5, 2023, 13 pages.
Extended European Search Report received for European Patent Application No. 22188377.0, dated Oct. 27, 2022, 8 pages.
Decision to Refuse received for European Patent Application No. 17813737.8, dated Sep. 30, 2022, 5 pages.
Brief Communication Regarding Oral Proceedings received for European Patent Application No. 17799904.2, mailed on Sep. 13, 2022, 1 page.
Brief Communication Regarding Oral Proceedings received for European Patent Application No. 17813737.8, mailed on Sep. 19, 2022, 1 page.
Brief Communication Regarding Oral Proceedings received for European Patent Application No. 19150528.8, mailed on Sep. 5, 2022, 2 pages.
Decision to Refuse received for European Patent Application No. 17799904.2, dated Sep. 19, 2022, 4 pages.
Decision to Refuse received for European Patent Application No. 19150528.8, dated Sep. 9, 2022, 4 pages.
Extended European Search Report received for European Patent Application No. 22198071.7, dated Dec. 5, 2022, 8 pages.
Result of Consultation received for European Patent Application No. 18208881.5, dated Dec. 6, 2022, 10 pages.
Applicant-Initiated Interview Summary received for U.S. Appl. No. 17/320,900, dated Apr. 17, 2023, 4 pages.
Applicant-Initiated Interview Summary received for U.S. Appl. No. 17/874,159, dated Apr. 24, 2023, 4 pages.
Extended European Search Report received for European Patent Application No. 23157906.1, dated Apr. 6, 2023, 10 pages.
Final Office Action received for U.S. Appl. No. 17/874,159, dated May 11, 2023, 21 pages.
International Search Report and Written Opinion received for PCT Patent Application No. PCT/US2022/043863, dated Dec. 14, 2022, 13 pages.
Non-Final Office Action received for U.S. Appl. No. 17/874,159, dated Mar. 9, 2023, 19 pages.
Notice of Allowance received for U.S. Appl. No. 17/519,025, dated Mar. 2, 2023, 8 pages.

\* cited by examiner

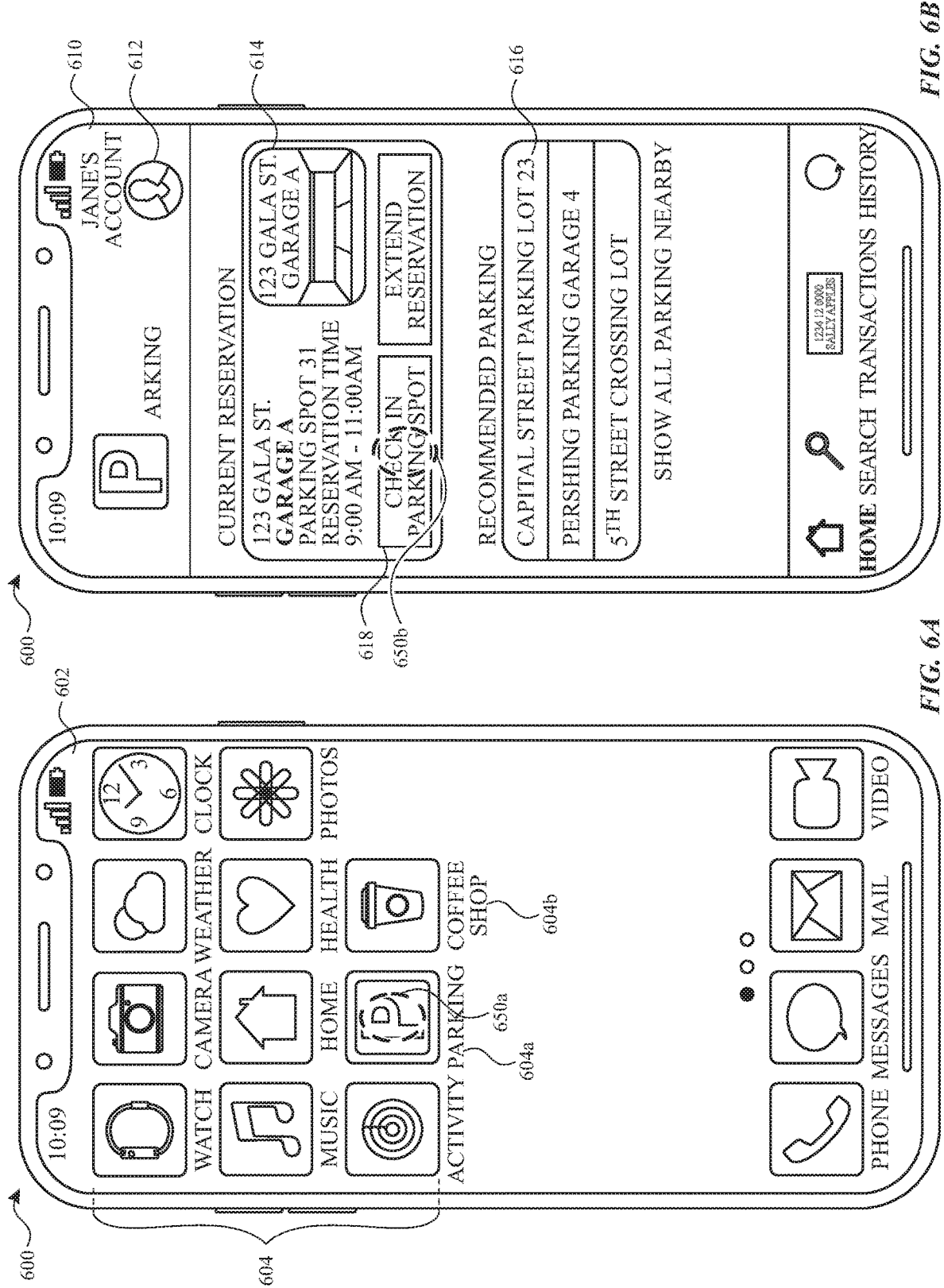

900

902
While the computer system is connected to an external input device, receive a first request from the external input device to interact with a first portion of a user interface that is associated with a secure transaction that, if authorized from the computer system, would require separate authorization from the user

904
In response to receiving the first request:

906
In accordance with a determination that the external input device satisfies a set of authorization criteria, provide an option, via the external input device, to initiate a secure transaction without requiring the separate authorization from the user

908
After providing the option to initiate a secure transaction without requiring the separate authorization from the user, receive a request from the external input device to proceed with the secure transaction

910
In response to receiving the request from the external input device to proceed with the secure transaction, perform the secure transaction including securely transmitting to an external receiving device first data that includes information that identifies a first account for use in the secure transaction

912
In accordance with a determination that the external input device does not satisfy the set of authorization criteria, forgo providing the option to initiate a secure transaction without requiring the separate authorization from the user

*FIG. 9*

USER INTERFACES FOR MANAGING SECURE OPERATIONS

CROSS-REFERENCE TO RELATED APPLICATIONS

This application claims priority to U.S. Provisional Application No. 63/041,969, filed Jun. 21, 2020, entitled "USER INTERFACES FOR MANAGING SECURE OPERATIONS." The content of which is hereby incorporated by reference in its entirety.

FIELD

The present disclosure relates generally to computer user interfaces, and more specifically to techniques for managing secure operations via input received at an external device.

BACKGROUND

Users often perform operations using personal electronic devices. Such techniques typically require the user to provide various inputs and authorization to perform these operations.

BRIEF SUMMARY

Some techniques for managing secure operations using electronic devices, however, are generally cumbersome and inefficient. For example, some existing techniques require the user to provide various inputs and authorization to perform these operations on a personal device (e.g., cell phone), which may not be convenient or safe for the user to provide while the user is operating a vehicle.

Accordingly, the present technique provides electronic devices with faster, safer, and more efficient methods and interfaces for managing secure operations using electronic devices. Such methods and interfaces optionally complement or replace other methods for managing secure operations. Such methods and interfaces are safer, such as not to distract a user while the user is operating a vehicle. Such method and interfaces reduce the cognitive burden on a user and produce a more efficient human-machine interface.

In accordance with some embodiments, a method is described. The method is performed at a computer system that is in communication with an external automotive head unit that includes one or more input components and that is in communication with an external receiving device. The method comprises: receiving, from the external automotive head unit, first data corresponding to an input received at the one or more input components of the external automotive head unit that corresponds to a request to perform a first transfer operation from a first account to a second account using an application on the computer system that is associated with the first account; and in response to receiving the first data, initiating a process to perform the first transfer operation using the application on the computer system, where performing the first transfer operation includes transmitting, to the external receiving device, second data that includes information that identifies the first account.

In accordance with some embodiments, a non-transitory computer-readable storage medium is described. The non-transitory computer-readable storage medium stores one or more programs configured to be executed by one or more processors of a computer system that is in communication with an external automotive head unit that includes one or more input components and that is in communication with an external receiving device. The one or more programs include instructions for: receiving, from the external automotive head unit, first data corresponding to an input received at the one or more input components of the external automotive head unit that corresponds to a request to perform a first transfer operation from a first account to a second account using an application on the computer system that is associated with the first account; and in response to receiving the first data, initiating a process to perform the first transfer operation using the application on the computer system, where performing the first transfer operation includes transmitting, to the external receiving device, second data that includes information that identifies the first account.

In accordance with some embodiments, a transitory computer-readable storage medium is described. The transitory computer-readable storage medium stores one or more programs configured to be executed by one or more processors of a computer system that is in communication with an external automotive head unit that includes one or more input components and that is in communication with an external receiving device. The one or more programs include instructions for: receiving, from the external automotive head unit, first data corresponding to an input received at the one or more input components of the external automotive head unit that corresponds to a request to perform a first transfer operation from a first account to a second account using an application on the computer system that is associated with the first account; and in response to receiving the first data, initiating a process to perform the first transfer operation using the application on the computer system, where performing the first transfer operation includes transmitting, to the external receiving device, second data that includes information that identifies the first account.

In accordance with some embodiments, a computer system is described. The computer system comprises: one or more processors, where the computer system is in communication with an external automotive head unit that includes one or more input components, and where the computer system is in communication with an external receiving device; and memory storing one or more programs configured to be executed by the one or more processors. The one or more programs include instructions for: receiving, from the external automotive head unit, first data corresponding to an input received at the one or more input components of the external automotive head unit that corresponds to a request to perform a first transfer operation from a first account to a second account using an application on the computer system that is associated with the first account; and in response to receiving the first data, initiating a process to perform the first transfer operation using the application on the computer system, where performing the first transfer operation includes transmitting, to the external receiving device, second data that includes information that identifies the first account.

In accordance with some embodiments, a computer system is described, where the computer system is in communication with an external automotive head unit that includes one or more input components, and where the computer system is in communication with an external receiving device. The computer system comprises: means for receiving, from the external automotive head unit, first data corresponding to an input received at the one or more input components of the external automotive head unit that corresponds to a request to perform a first transfer operation from a first account to a second account using an application on the computer system that is associated with the first account; and means, responsive to receiving the first data, for initiating a process to perform the first transfer operation using the application on the computer system, where performing the first transfer operation includes transmitting, to the external receiving device, second data that includes information that identifies the first account.

In accordance with some embodiments, a method is described. The method is performed at a computer system. The computer system comprises: while the computer system is connected to an external input device, receiving a first request from the external input device to interact with a first portion of a user interface that is associated with a secure transaction that, if authorized from the computer system, would require separate authorization from the user. The computer system further comprises, in response to receiving the first request: in accordance with a determination that the external input device satisfies a set of authorization criteria, providing an option, via the external input device, to initiate a secure transaction without requiring the separate authorization from the user; and in accordance with a determination that the external input device does not satisfy the set of authorization criteria, forgoing providing the option to initiate a secure transaction without requiring the separate authorization from the user.

In accordance with some embodiments, a non-transitory computer-readable storage medium is described. The non-transitory computer-readable storage medium stores one or more programs configured to be executed by one or more processors of a computer system. The one or more programs include instructions for: while the computer system is connected to an external input device, receiving a first request from the external input device to interact with a first portion of a user interface that is associated with a secure transaction that, if authorized from the computer system, would require separate authorization from the user. The one or more programs further include instructions for: in response to receiving the first request: in accordance with a determination that the external input device satisfies a set of authorization criteria, providing an option, via the external input device, to initiate a secure transaction without requiring the separate authorization from the user; and in accordance with a determination that the external input device does not satisfy the set of authorization criteria, forgoing providing the option to initiate a secure transaction without requiring the separate authorization from the user.

In accordance with some embodiments, a transitory computer-readable storage medium is described. The transitory computer-readable storage medium stores one or more programs configured to be executed by one or more processors of a computer system. The one or more programs include instructions for: while the computer system is connected to an external input device, receiving a first request from the external input device to interact with a first portion of a user interface that is associated with a secure transaction that, if authorized from the computer system, would require separate authorization from the user. The one or more programs further include instructions for: in response to receiving the first request: in accordance with a determination that the external input device satisfies a set of authorization criteria, providing an option, via the external input device, to initiate a secure transaction without requiring the separate authorization from the user; and in accordance with a determination that the external input device does not satisfy the set of authorization criteria, forgoing providing the option to initiate a secure transaction without requiring the separate authorization from the user.

In accordance with some embodiments, a computer system is described. The computer system comprises: one or more processors; and memory storing one or more programs configured to be executed by the one or more processors. The one or more programs include instructions for: while the computer system is connected to an external input device, receiving a first request from the external input device to interact with a first portion of a user interface that is associated with a secure transaction that, if authorized from the computer system, would require separate authorization from the user. The one or more programs further include instructions for: in response to receiving the first request: in accordance with a determination that the external input device satisfies a set of authorization criteria, providing an option, via the external input device, to initiate a secure transaction without requiring the separate authorization from the user; and in accordance with a determination that the external input device does not satisfy the set of authorization criteria, forgoing providing the option to initiate a secure transaction without requiring the separate authorization from the user.

In accordance with some embodiments, a computer system is described. The computer system comprises: means, while the computer system is connected to an external input device, for receiving a first request from the external input device to interact with a first portion of a user interface that is associated with a secure transaction that, if authorized from the computer system, would require separate authorization from the user; and means, responsive to receiving the first request, for: in accordance with a determination that the external input device satisfies a set of authorization criteria, providing an option, via the external input device, to initiate a secure transaction without requiring the separate authorization from the user; and in accordance with a determination that the external input device does not satisfy the set of authorization criteria, forgoing providing the option to initiate a secure transaction without requiring the separate authorization from the user.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing secure operations, thereby increasing the effectiveness, efficiency, and user satisfaction with such devices. Such methods and interfaces may complement or replace other methods for managing secure operations.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6F illustrate exemplary user interfaces for performing a secure operation in accordance with some embodiments.

FIG. 9 is a flow diagram illustrating a method for providing an option to initiate a secure operation in accordance with some embodiments.

DESCRIPTION OF EMBODIMENTS

Figure 1A:
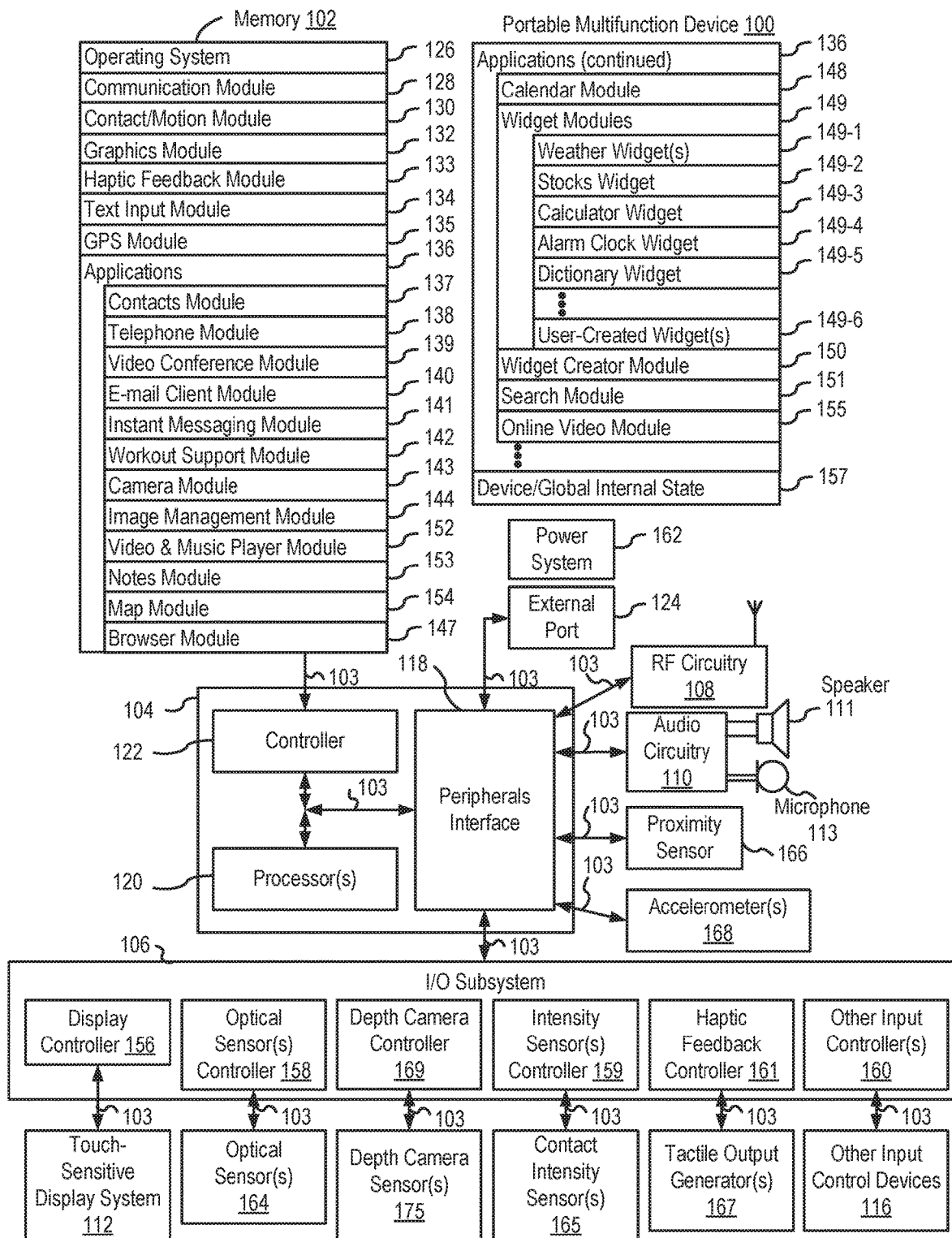
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing secure operations. For example, there is a need to provide techniques that increase safety when for managing operations that can be perform while a vehicle is being operated. Such methods and interfaces are safer, such as not to distract a user while the user is operating a vehicle. Such techniques can reduce the cognitive burden on a user who needs to perform an operation, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing secure operations.

FIGS. 6A-6F illustrate exemplary user interfaces for performing a secure operation in accordance with some embodiments. FIGS. 7A-7M illustrate exemplary user interfaces for performing a secure operation in accordance with some embodiments. FIG. 8 is a flow diagram illustrating a method for performing a secure operation in accordance with some embodiments. FIG. 9 is a flow diagram illustrating a method for providing an option to initiate a secure operation in accordance with some embodiments. The user interfaces in FIGS. 6A-6F and FIGS. 7A-7M are used to illustrate the processes described below, including the processes in FIG. 8 and FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
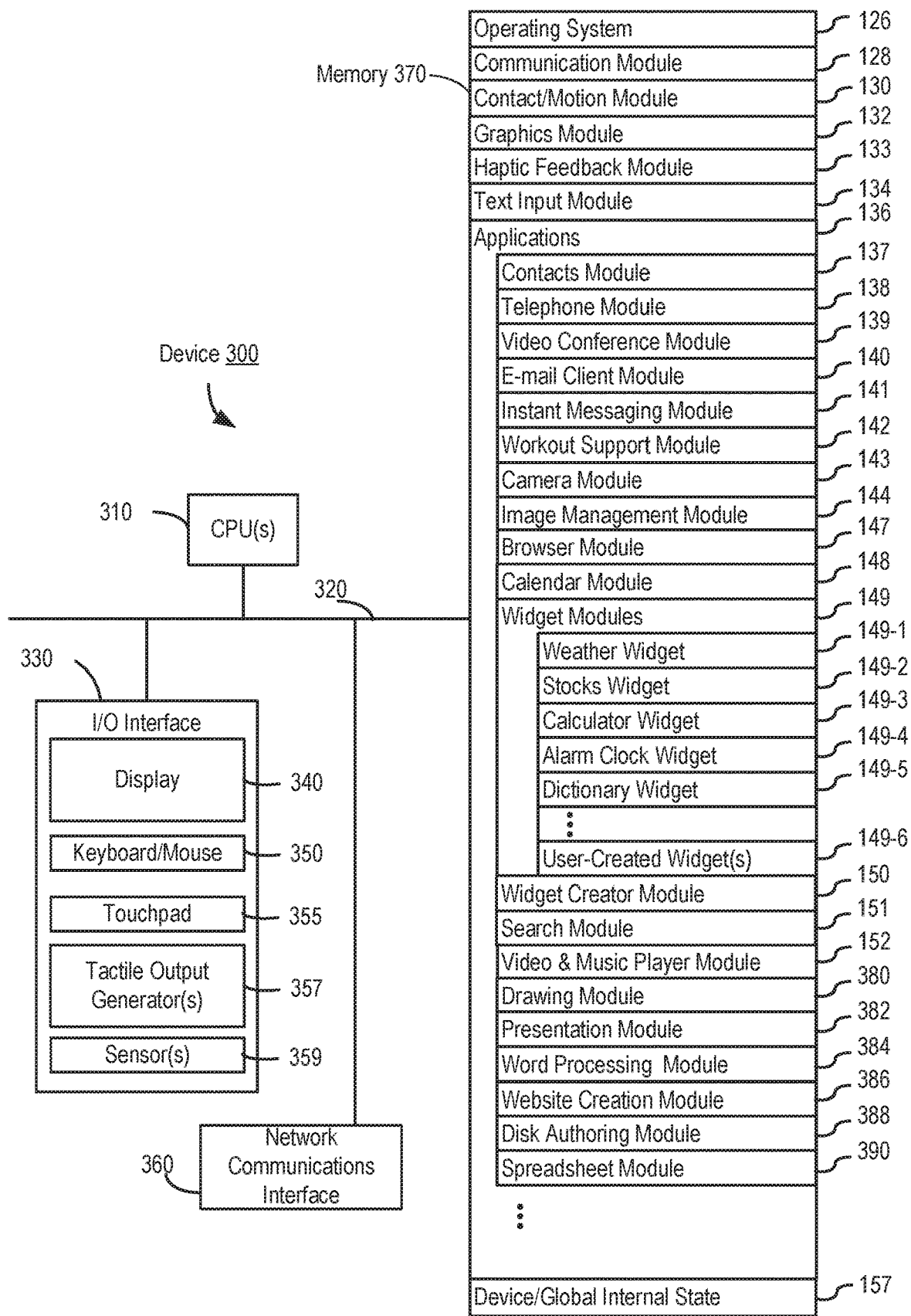
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MIMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
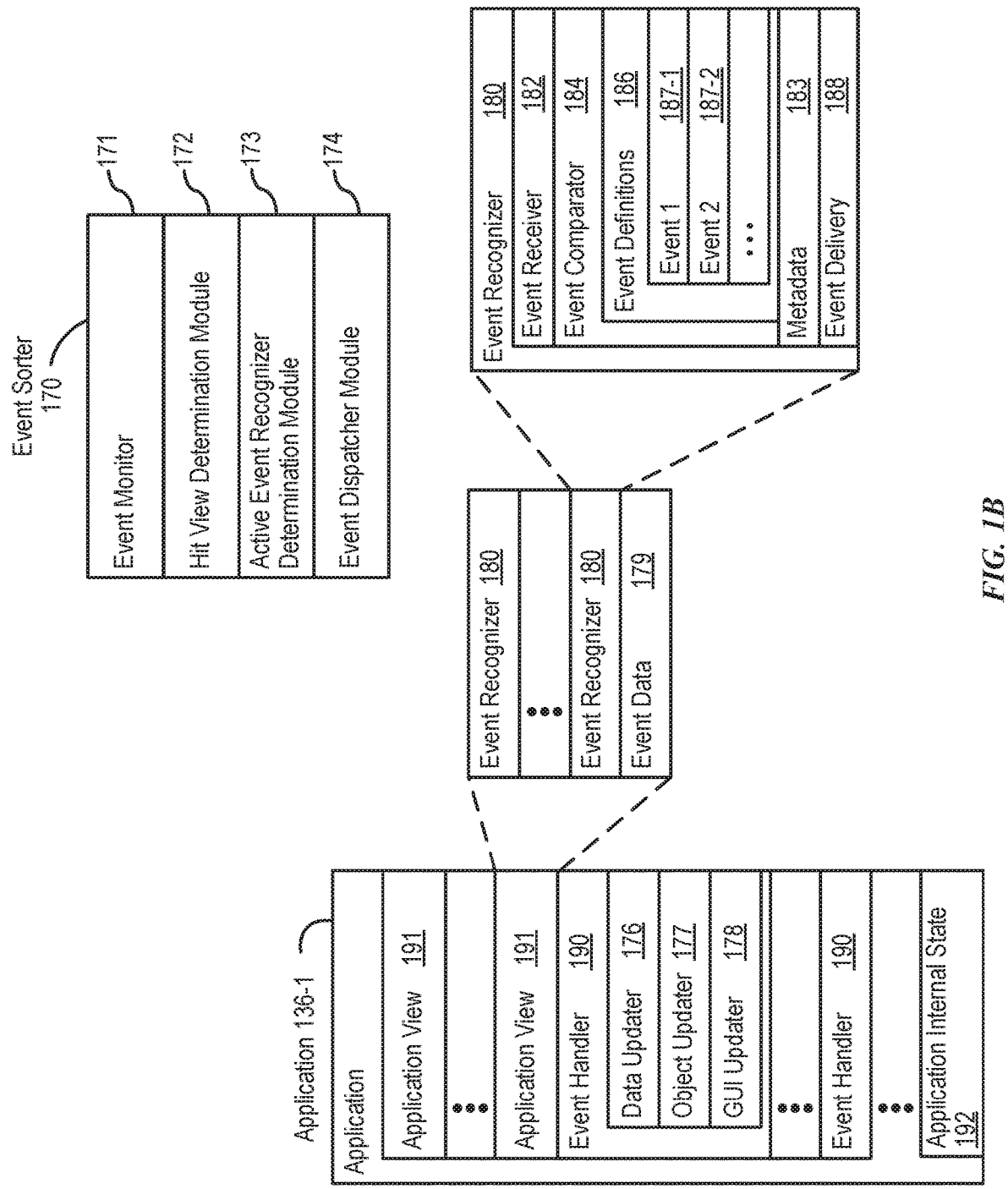
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate portable multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
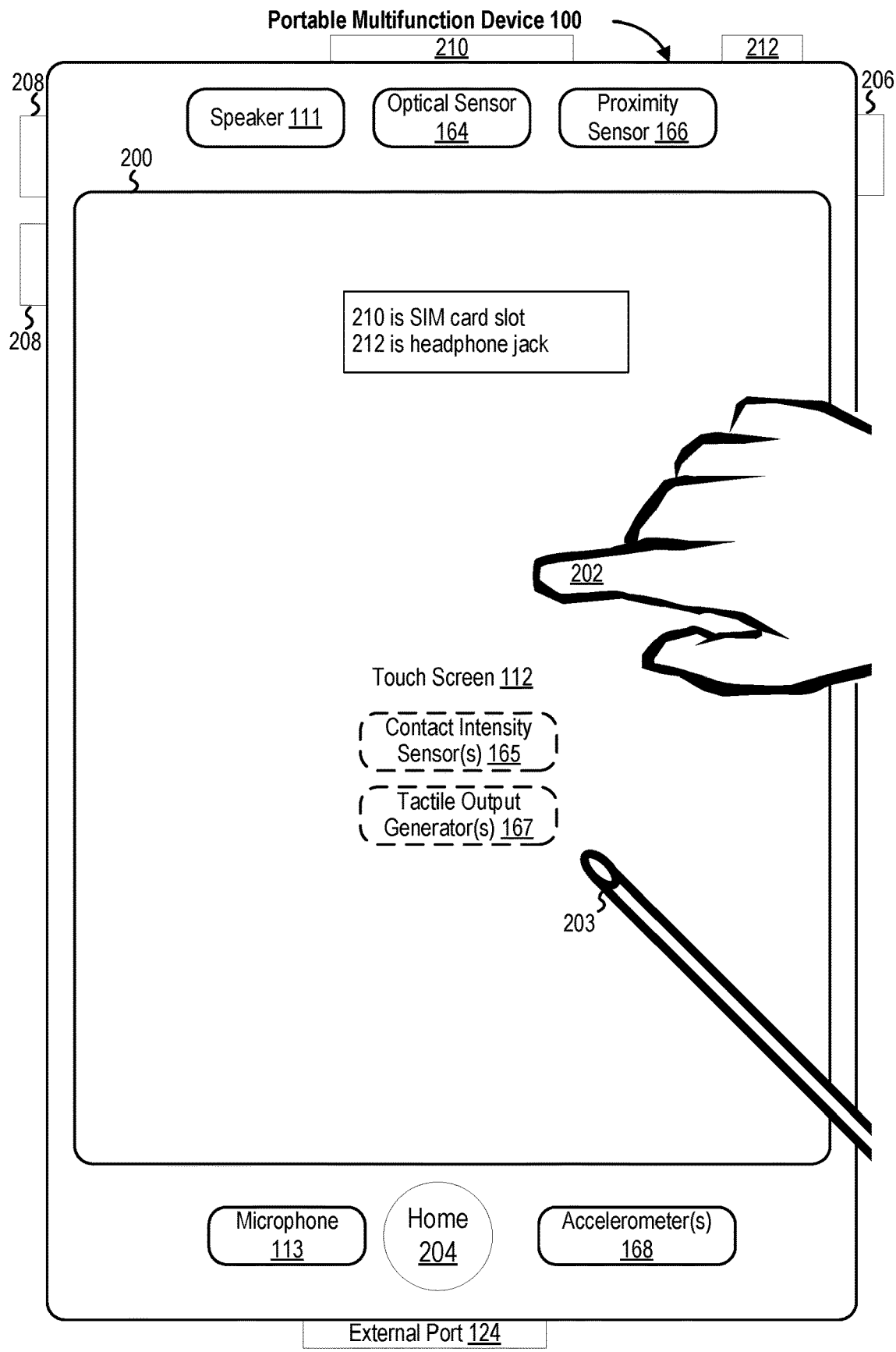
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
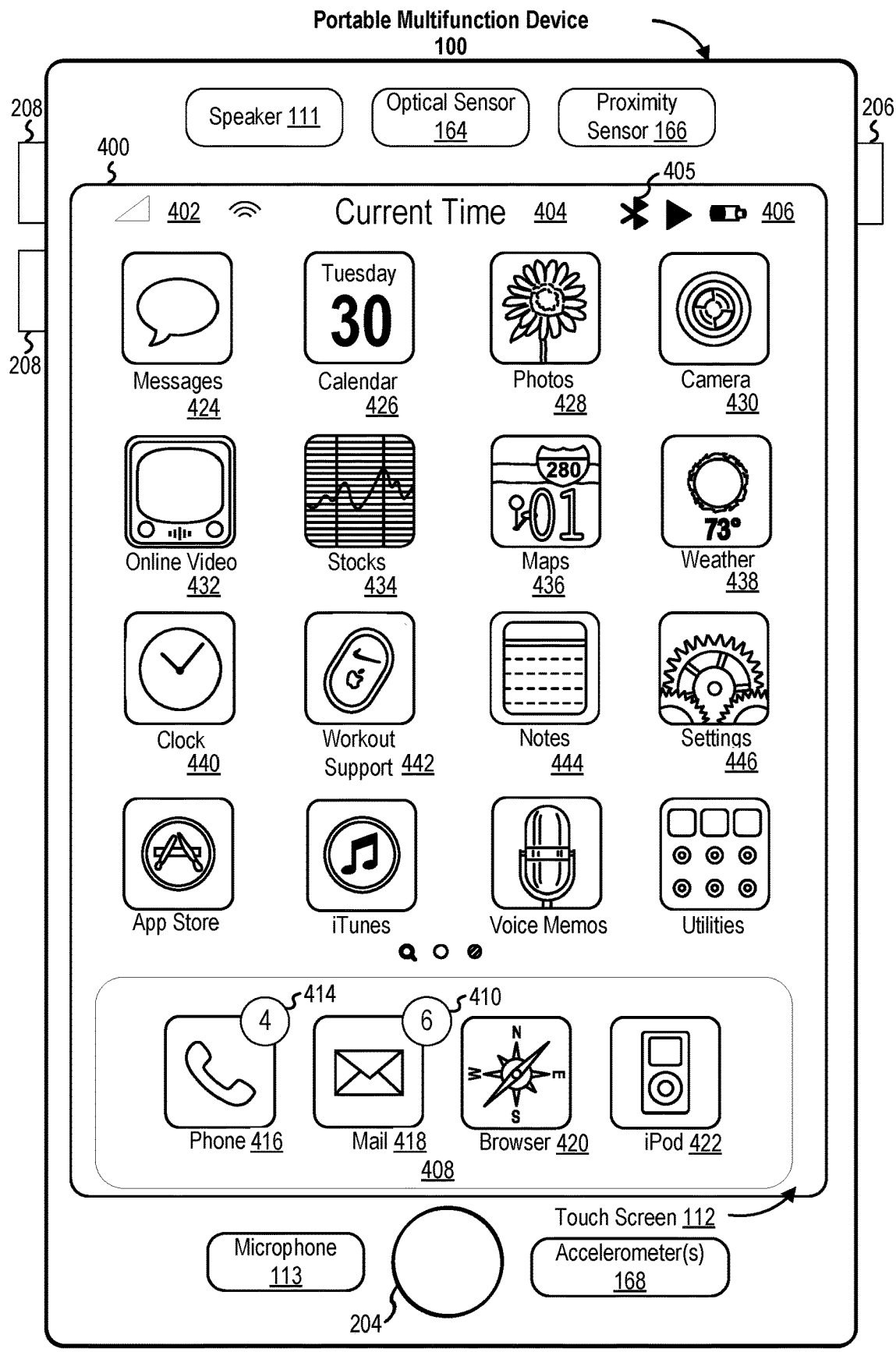
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and
Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
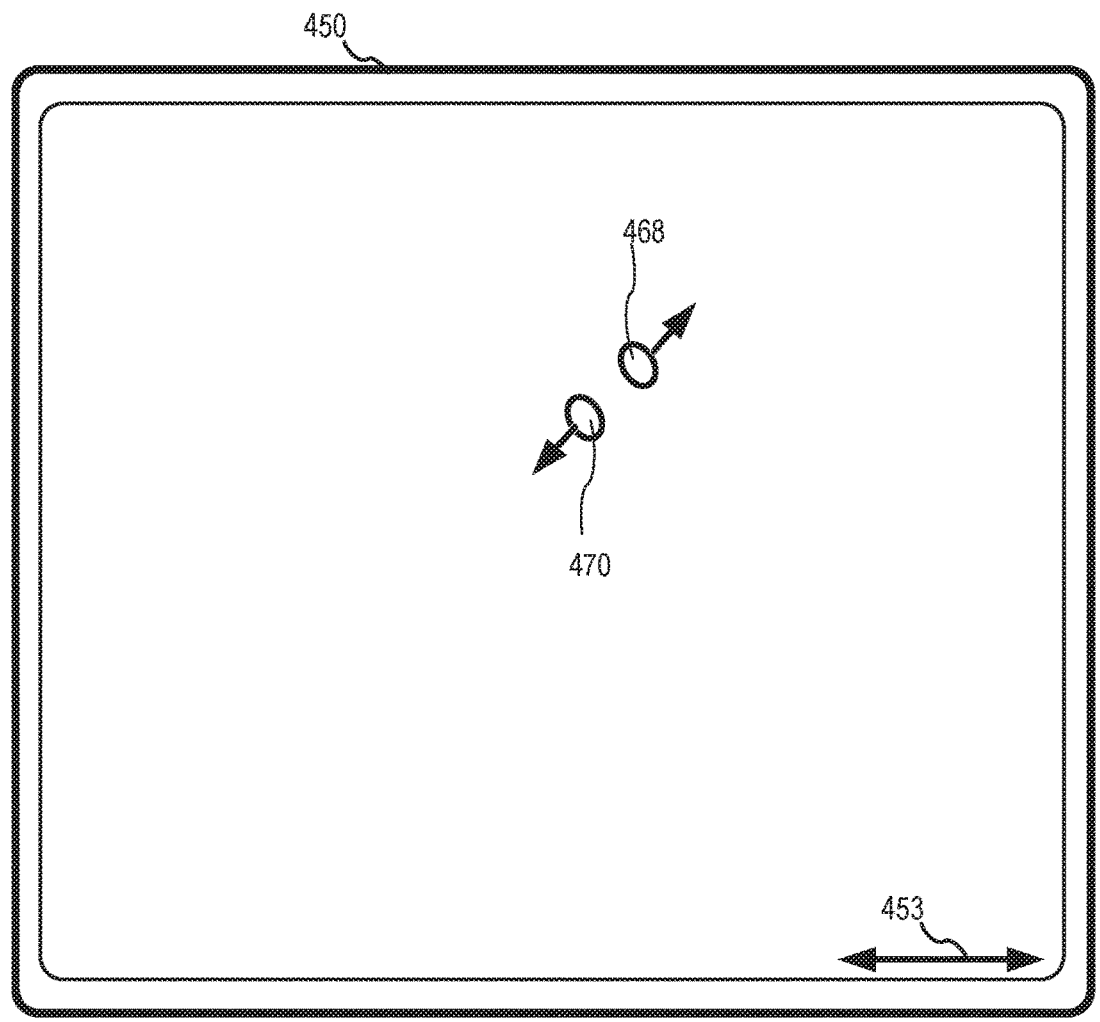
FIG. 4B illustrates an exemplary user interface for a multifunction device with a touch-sensitive surface that is separate from the display in accordance with some embodiments.
Figure 4B:
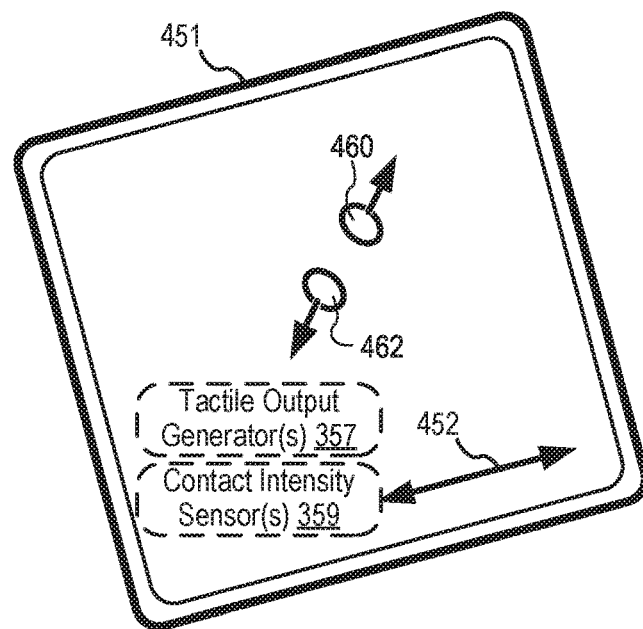

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
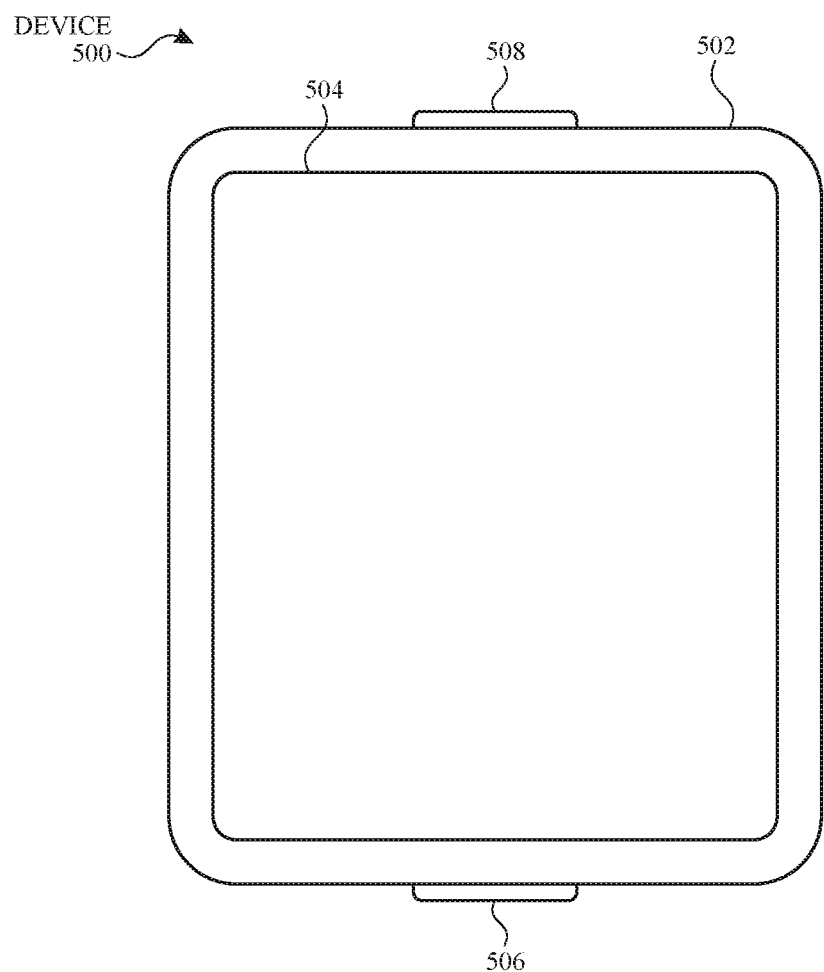
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
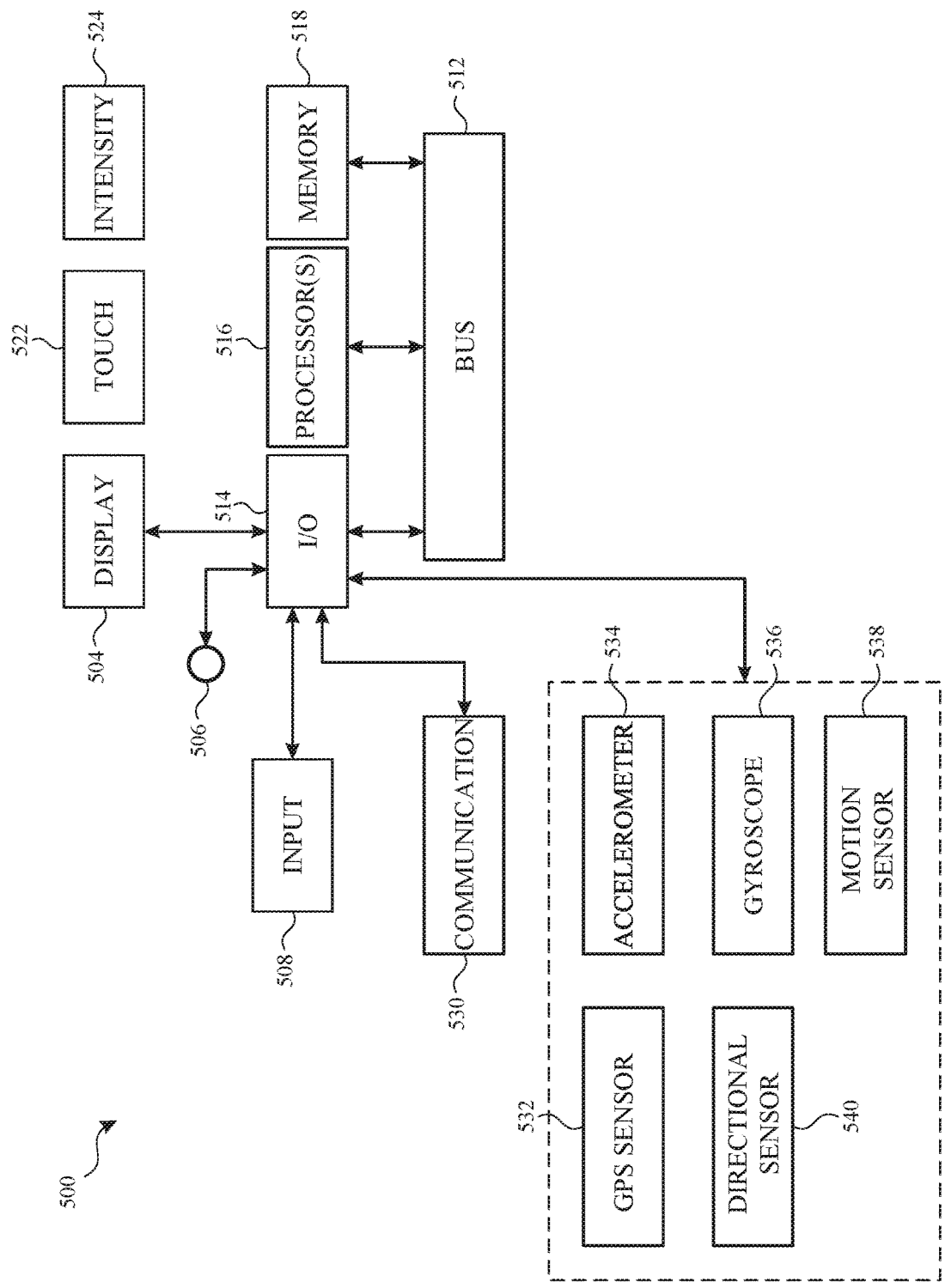
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to touch-sensitive display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800 and 900 (FIG. 8 and FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UP") and associated processes that are implemented on an electronic device, such as portable multifunction device 100, device 300, or device 500.

FIGS. 6A-6F illustrate exemplary user interfaces for performing a secure operation in accordance with some embodiments. In particular, FIGS. 6A-6F illustrate exemplary user interfaces that can be displayed during a scenario where a secure transaction (e.g., transferring a parking spot between accounts) is completed in response to receiving one or more gestures and biometric data from a user of device 600. The user interfaces in these figures are used to illustrate the processes described below, including the processes in FIG. 8 and FIG. 9. In some embodiments, the exemplary user interfaces of FIGS. 6A-6F can be combined or displayed simultaneously with the exemplary user interfaces of FIGS. 7A-7M described below.

FIG. 6A illustrates device 600 displaying user interface 602 on a touch-sensitive display. In some embodiments, device 600 includes one or more features of devices 100, 300, and 500, which are described above.

As illustrated in FIG. 6A, user interface 602 includes application icons 604. Application icons 604 includes multiple application icons for launching different applications that cause different user interfaces to be displayed on device 600. Application icons 604 include parking application icon 604a for launching a parking application and coffee shop application icon 604b for launching a coffee shop application. At FIG. 6A, device 600 detects tap gesture 650a on (e.g., directed to, at a location corresponding to) parking application icon 604a.

As illustrated in FIG. 6B, in response to detecting tap gesture 650a, device 600 launches a parking application that corresponds to parking application icon 604a and displays user interface 610 of the parking application. User interface 610 includes account identifier 612, current parking information 614, and recommended parking information 616. Account identifier 612 indicates that device 600 is currently logged into a particular account ("Jane's account") that is recognized by and/or belongs to (e.g., stored in a database that is communication with) the parking application. Recommended parking information 616 includes information related to one or more available parking spots that are being recommended to the user of device 600.

As illustrated in FIG. 6B, current parking information 614 indicates that parking spot #31 is currently assigned to Jane's account, which is located in Garage A at 123 Gala Street. Current parking information 614 also includes a timeframe (e.g., 9:00 AM-11:00 AM) for which parking spot #31 will be assigned to Jane's account before parking spot #31 is automatically transferred back to an account associated with Garage A. Moreover, current parking information includes check-in control 618 for transferring parking spot #31 from Jane's account to an account that belongs to Garage A. At FIG. 6B, device 600 detects tap gesture 650b on check-in control 618.

Figures 6C, 6D:
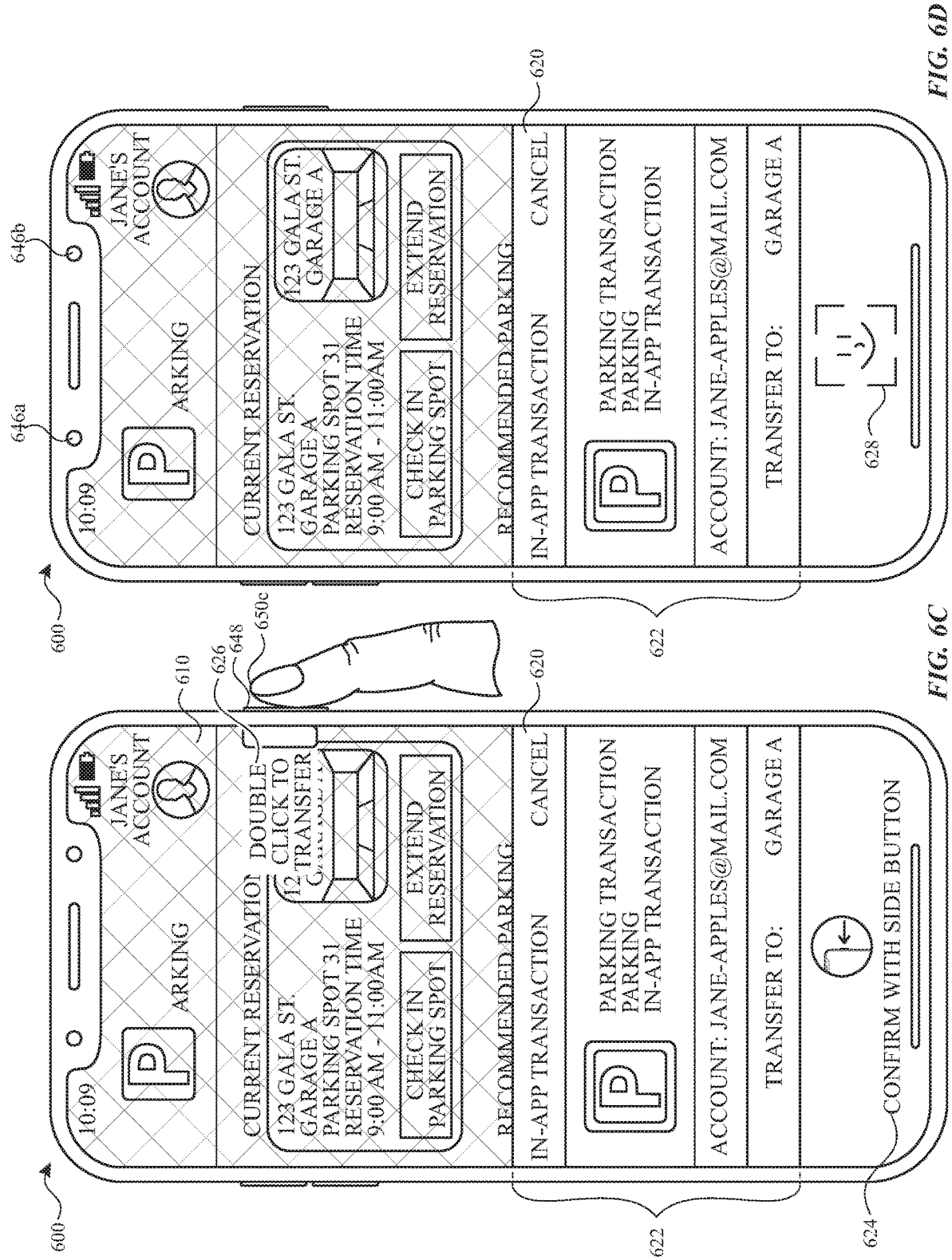

As illustrated in FIG. 6C, in response to detecting tap gesture 650b, device 600 initiates a process for performing a transaction (e.g., performing a secure operation) that includes transferring parking spot #31 from Jane's account to an account associated with Garage A. As shown in FIG. 6C, in response to detecting tap gesture 650b, device 600 displays user interface 620 over a portion of user interface 610 and blurs a portion of user interface 610 that remains displayed in FIG. 6C. User interface 620 includes transaction information 622, confirmation instruction 624, and input instruction 626. Transaction information 622 includes information, such as the e-mail address (e.g., "jane-apples@mail.com") that is assigned to (e.g., on file with) the particular account (e.g., "Jane's Account") to which parking spot #31 is currently assigned and an identifier ("Garage A") that is associated with the account to which parking spot #31 will be transferred. In FIG. 6C, the parking application is configured to perform a transfer operation using Jane's account (e.g., and/or the e-mail address assigned to Jane's account). Confirmation instruction 624 indicates that input has to be received on hardware button 648 (e.g., "side button") in order for the transaction to be initiated, and input instruction 626 indicates that the hardware button 648 must be quickly pressed twice (e.g., "double click") in order for the transaction to be initiated. At FIG. 6C, device 600 detects double-click input 650c on hardware button 648.

At FIG. 6D, in response to detecting double-click input 650c, device 600 initiates an authentication process, which causes camera 646a and/or camera 646b to capture images in order to obtain biometric data (e.g., data corresponding to one or more features of a user's face). As a part of the authentication process, device 600 also replaces confirmation instruction 624 with biometric identification status indicator 628 to indicate that device 600 is attempting to capture images in order to obtain biometric information.

At FIG. 6D, after capturing a set of images, device 600 obtains biometric data (e.g., one or more features of a user's face) in order to authenticate the user so that the transaction can be authorized. Device 600 uses this newly obtained biometric data in order to authenticate the current user of device 600 by matching the newly obtained biometric data to previously stored biometric data that is associated with a known user who has permission to complete secure transactions via device 600 (e.g., matching within a certain confidence level). In some embodiments, the biometric data (e.g., the previously stored biometric data and the newly captured biometric data) is accessible to an application for managing secure transactions (or operations) on device 600. In some embodiments, the parking application does not have access to the biometric data. In some embodiments, when device 600 cannot match the newly obtained biometric data with previously stored biometric data, device 600 will continue to capture images to obtain additional biometric data in order to match the previously stored biometric data. In some embodiments, device 600 will only capture images for a predetermined period of time. In some embodiments, when device 600 cannot match the biometric data, device 600 will display an indication that parking spot #31 cannot be transferred to Garage A because the user of device 600 could not be authenticated and/or display controls for completing authentication for transaction in other ways (e.g., via entry of a password). In some embodiments, device 600 can authenticate a user via capturing and comparing other types of biometric data, such as finger data (e.g., captured via the touch-sensitive displaying that includes a fingerprint sensor), voice data (e.g., via one or more microphones), etc. At FIG. 6D, device 600 (or another device in communication with device 600) matches a set of newly obtained biometric data with previously stored biometric data, which authenticates the current user of device 600 as a user that has permission to complete secure transactions via device 600.

Figure 6E:
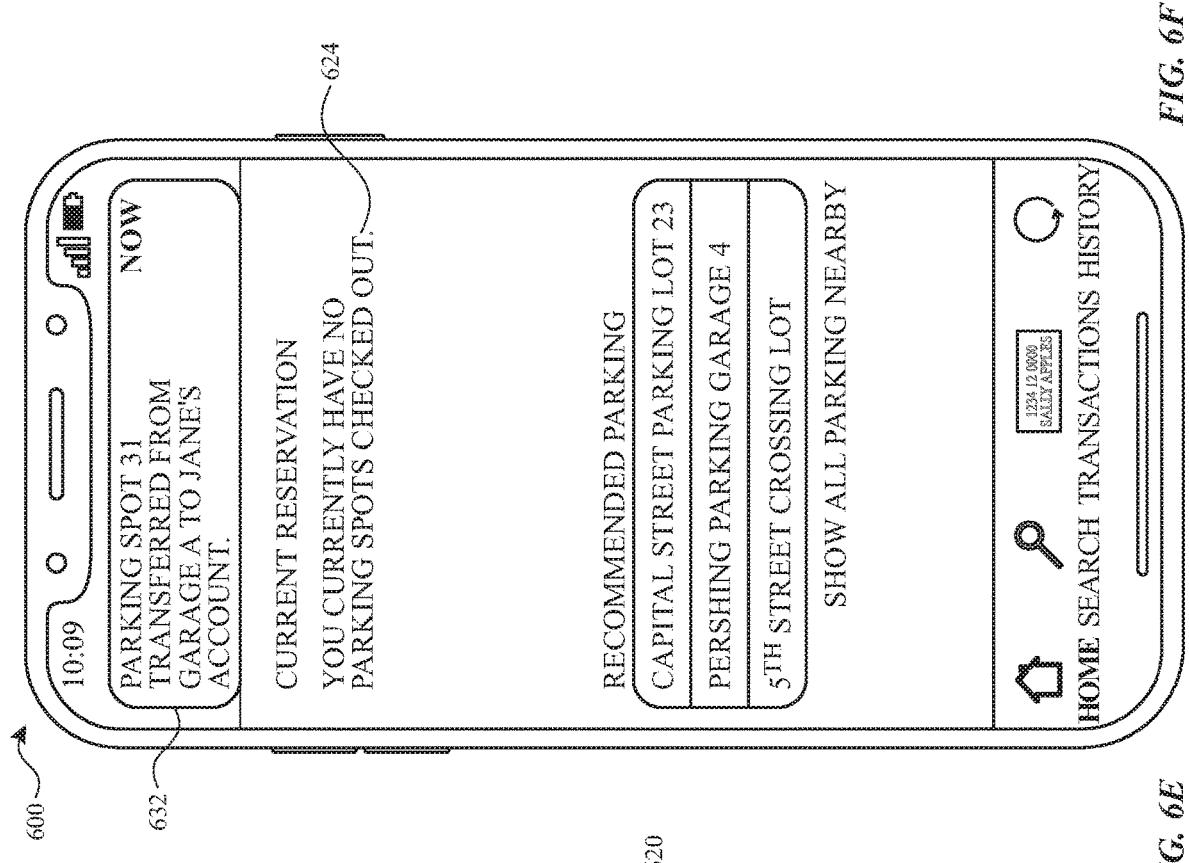

At FIG. 6E, in response to authenticating the current user of device 600 as a user that has permission to complete secure transactions (e.g., via Jane's account), device 600 causes parking spot #31 to be transferred from Jane's account to Garage A's account. In some embodiments, device 600 causes parking spot #31 to be transferred from Jane's account to Garage A's account using a secure hardware component (e.g., a hardware chip) that stores information that is representative of Jane's account (e.g., Jane's e-mail address; a device specific account identifier). In some embodiments, the secure hardware component does not store or have access to primary information (e.g., a primary account number) that is associated with Jane's account. In some embodiments, authenticating that the current user of device 600 has permission to complete secure transactions authorizes device 600 to use the secure hardware component to complete the secure transaction.

As illustrated in FIG. 6E, in response to authenticating the current user of device 600 as a user that has permission to complete secure transactions, device 600 also replaces biometric identification status indicator 628 with authenticated status indicator 630 to indicate that the user has been authenticated and the transfer has been completed.

Figure 6F:
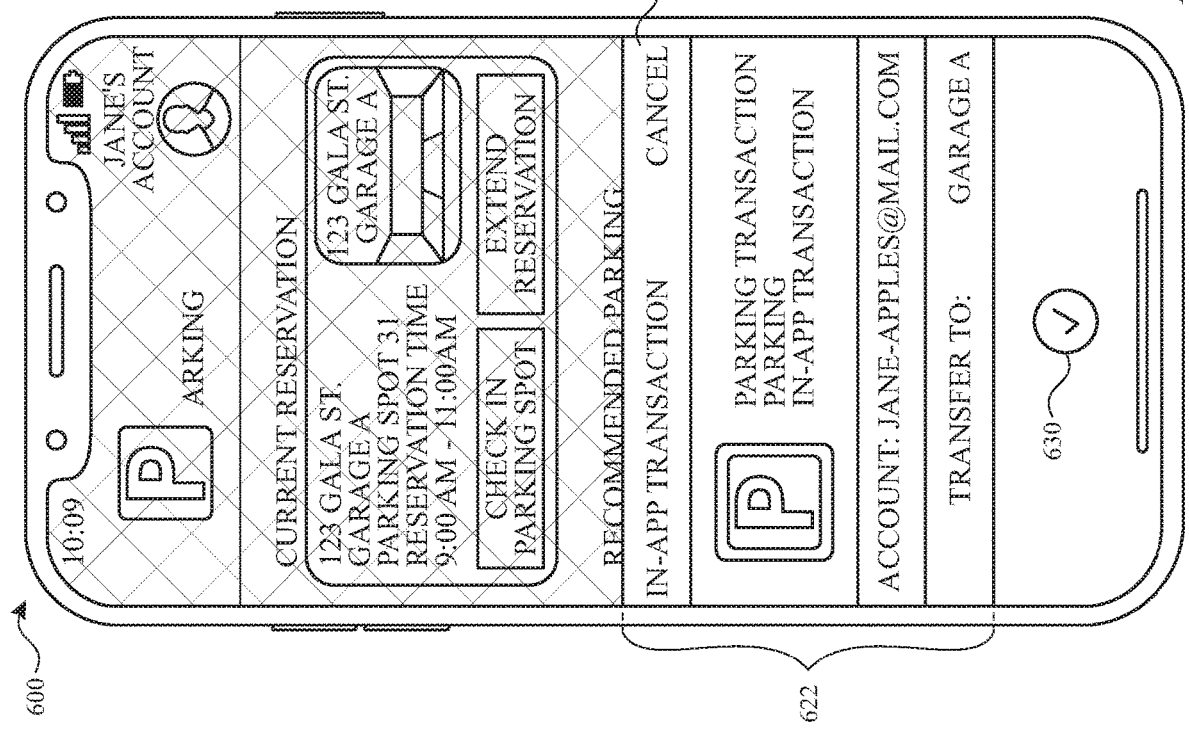

As illustrated in FIG. 6F, after completing the transfer, device 600 ceases to display user interface 620 and updates user interface 610 to show that parking spot #31 is no longer assigned to Jane's account (e.g., via confirmation instruction 624). In addition, after completing the transfer, device 600 also receives (e.g., from one or more external devices) and displays notification 632, which indicates that the transfer has been completed.

FIGS. 7A-7M illustrate exemplary user interfaces for performing a secure operation in accordance with some embodiments. In particular, FIGS. 7A-7M illustrate exemplary user interfaces that can be displayed during scenarios where one or more secure transactions are attempted to be completed in response to receiving one or more gestures on the touch-sensitive display of automotive head unit 700 that is in communication with device 600. The user interfaces in these figures are used to illustrate the processes described below, including the processes in FIG. 8 and FIG. 9.

Figure 7A:
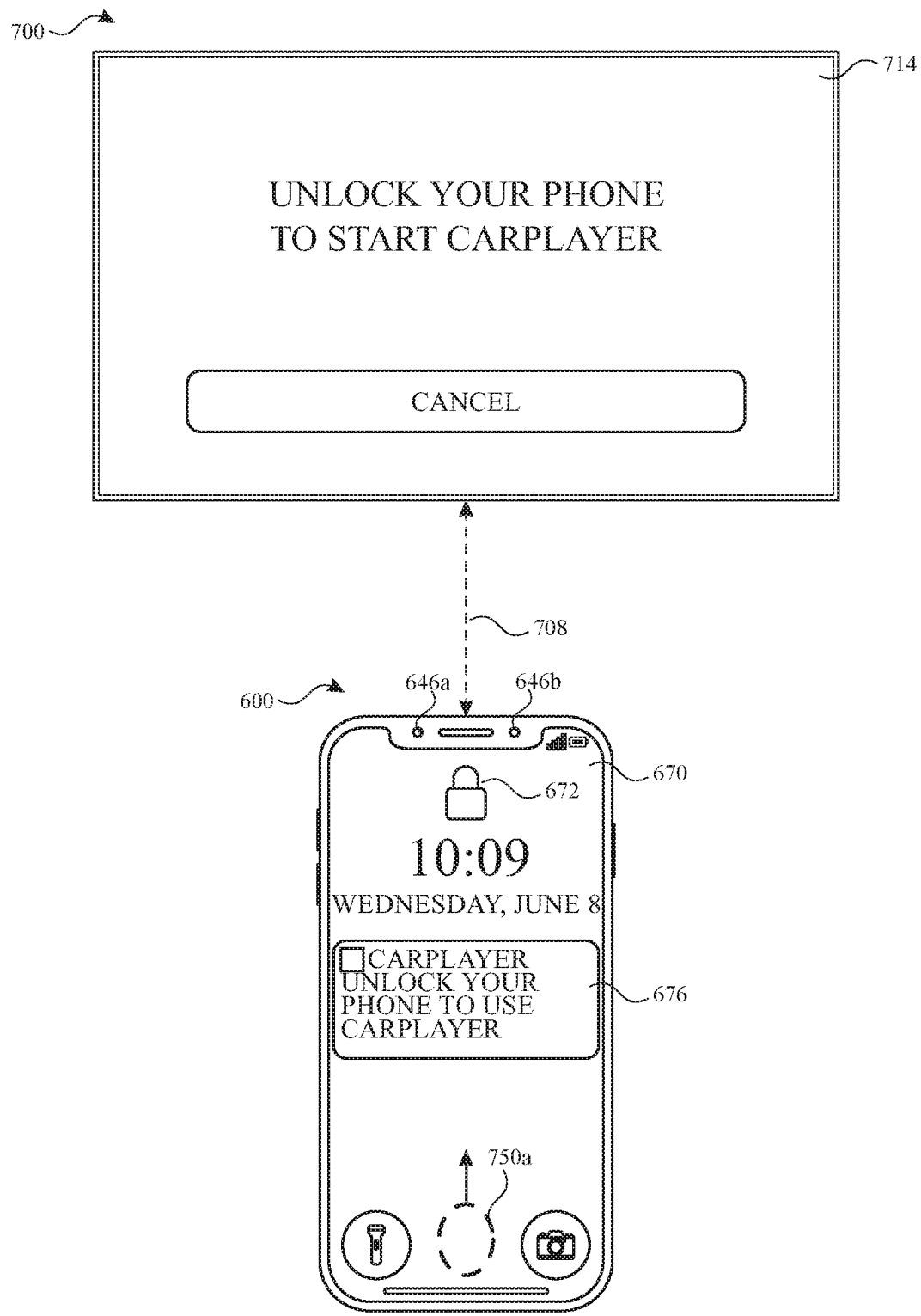
FIGS. 7A-7M illustrate exemplary user interfaces for performing a secure operation in accordance with some embodiments.
Figure 8:
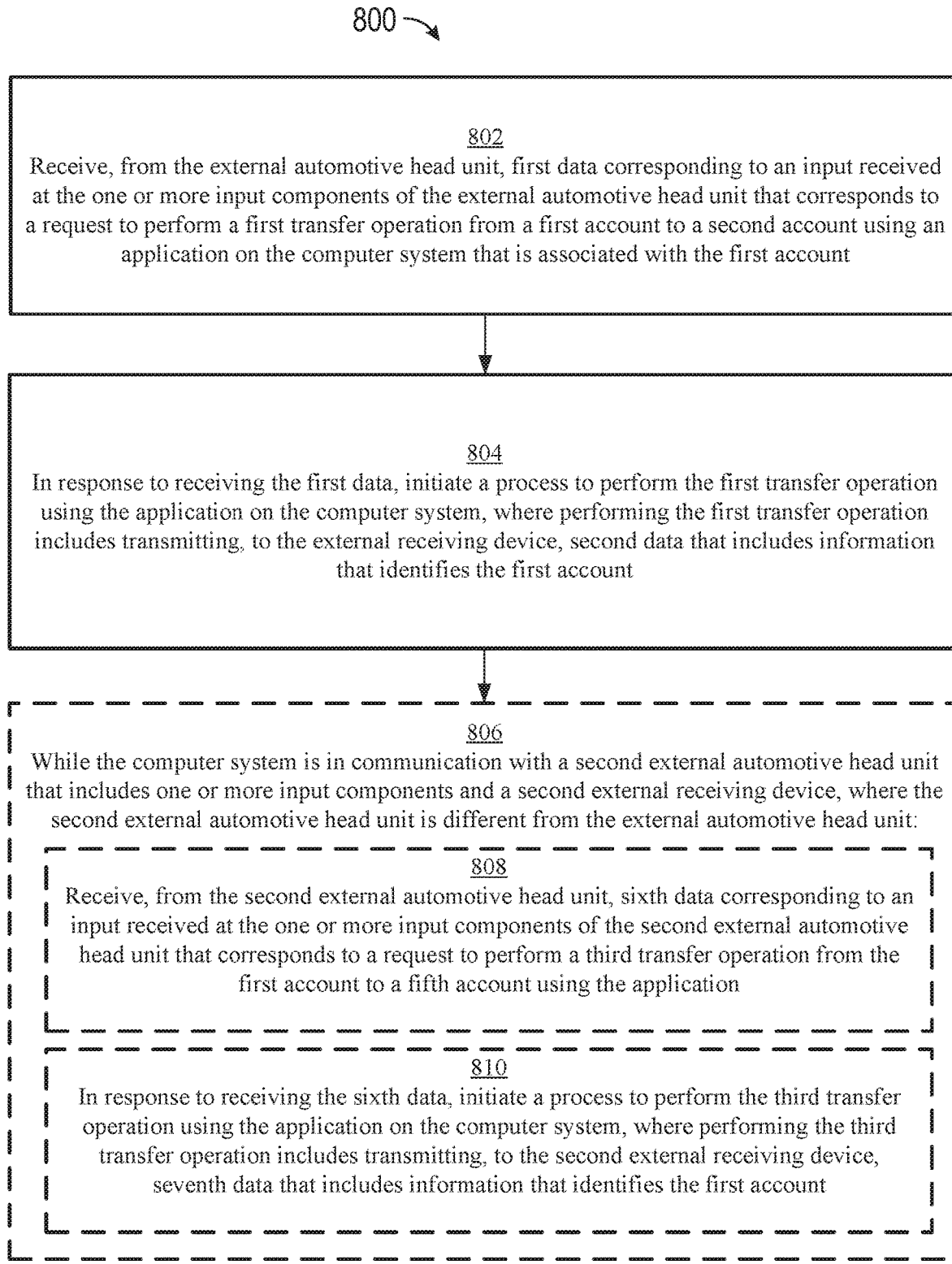
FIG. 8 is a flow diagram illustrating a method for performing a secure operation in accordance with some embodiments.

As illustrated in FIG. 7A, device 600 is in operable communication with automotive head unit 700, as indicated by communication link 708. In some embodiments, device 600 is in operable communication with automotive head unit 700 via wireless or wired connection. In some embodiments, automotive head unit 700 includes a touch-sensitive display and is installed in the dashboard of an automobile. In some embodiments, automotive head unit 700 includes one or more features of devices 100, 300, and 500, which are described above.

As illustrated in FIG. 7A, device 600 display user interface 670 that includes lock indication 672, which indicates that device 600 is in a locked state (e.g., a state in which one or functions of the display (e.g., display functions; input functions), which are available in an unlocked state, are disabled/unavailable). While device 600 is in the locked state, one or more operations that can be performed when device 600 is in an unlocked state cannot be performed when device 600 is in the locked state. The one or more operations include device 600 performing one or more operations for interacting with automotive head unit 700 while device 600 is in a locked state without receiving previous permission to do so. The one or more operations for interacting with automotive head unit 700 includes an operation that causes (e.g., by sending instructions and data) automotive head unit 700 to display one or more user interface components (e.g., user interfaces, icons) that correspond to applications installed on device 600.

At FIG. 7A, device 600 has not received previous permission to interact with automotive head unit 700 while device 600 is operating in the locked state. Thus, at FIG. 7A, device 600 causes automotive head unit 700 to display user interface 714. User interface 714 is displayed in response to device 600 detecting a connection (e.g., that operable communication has been established) between automotive head unit 700 and device 600. User interface 714 includes an instruction for a user to unlock device 600 in order for device 600 to cause "Carplayer" to be started on automotive head unit 700 and/or perform one or more operations that cause automotive head unit 700 to display one or more user interface components that correspond to applications installed on device 600.

As illustrated in FIG. 7A, because device 600 has not received previous permission to interact with (e.g., to provide data to and/or receive data from) automotive head unit 700 while device 600 is operating in the locked state, device 600 displays notification 676, which includes an instruction that is similar to the instruction displayed on automotive head unit 700. In some embodiments, when device 600 is in operable communication with another display device (e.g., automotive head unit 700) and previous permission has been received to interact with the other display device, device 600 causes the other display device to display one or more user interface components that correspond to applications installed on device 600. At FIG. 7A, device 600 receives upward swipe gesture 750a on user interface 670 and obtains biometric data (e.g., via one or more of cameras 646a and 646b) to authenticate a user in order to perform the secure operation of unlocking device 600. In some embodiments, device 600 obtains biometric data (e.g., via cameras 646a and/or 646b) and/or authenticates the user of device 600 to unlock device 600 using one or more similar techniques to those described above (e.g., in response to detecting gesture 650c in FIG. 6C).

Figure 7B:
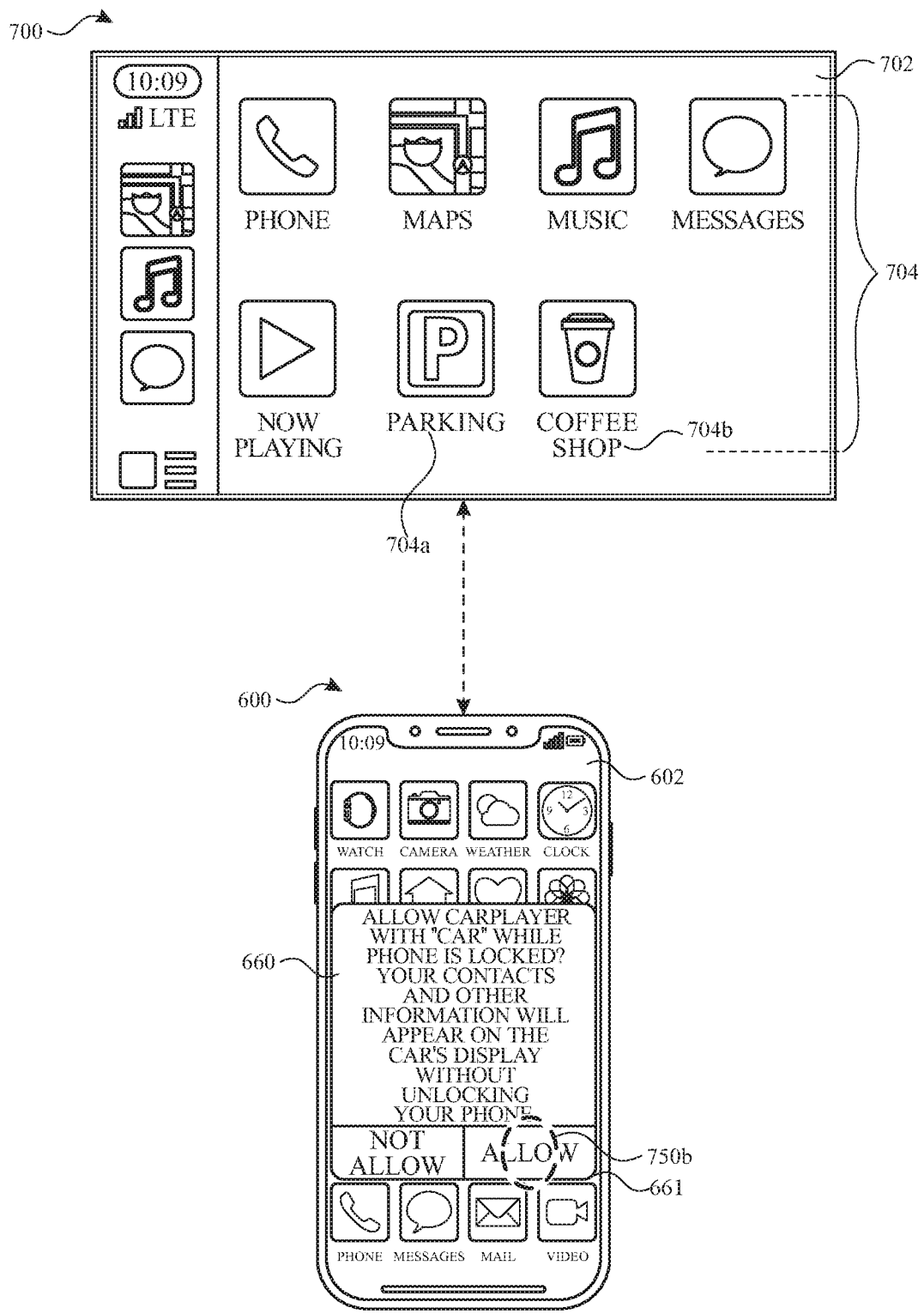

As illustrated in FIG. 7B, in response to receiving upward swipe gesture 750a and in response to authenticating the user of device 600, device 600 switches to operate in an unlocked state and ceases to display user interface 670. Moreover, in response to receiving upward swipe gesture 750a and in response to authenticating the user of device 600, device 600 displays user interface 602 that includes application icons 604. At FIG. 7B, user interface 602 is displayed because user interface 602 was the last user interface that was displayed by device 600 before device 600 entered into the locked state.

As illustrated in FIG. 7B, because device 600 is operating in an unlocked state, device 600 causes automotive head unit 700 to display user interface 702, which includes an enlarged set application icons 704. Application icons 704 include parking application icon 704a that corresponds to the same application (e.g., that launches an application on automotive head unit 700 that is compatible with (e.g., that can access data from) the parking application of application icon 604; that causes device 600 to cause automotive head unit 700 to display interfaces generated directly by the parking application on device 600) as parking application icon 604a and coffee shop application icon 704b that corresponds to the same application as coffee shop application icon 604b. Application icons 704 are bigger than application icons 604, such that application icon 704 can be more readily seen and interacted with by a user operating a vehicle. In addition, application icons 704 are a subset of application icons 604. That is, the number of application icons 704 is smaller than the number of applications icons 604, and some of the application icons included in application icons 604 are not included in application icons 704 (e.g., the camera application icon).

As illustrated in FIG. 7B, in response to receiving upward swipe gesture 750a and in response to authenticating the user of device 600, device 600 also displays user interface 660 overlaid onto user interface 602. Device 600 displays user interface 660 because device 600 has not received previous permission to interact with automotive head unit 700 while device 600 is operating in the locked state. User interface 660 includes allow-interaction-while-locked control 661. At FIG. 7B, device 600 detects tap gesture 750b on allow-control-while-locked control 661.

Figure 7C:
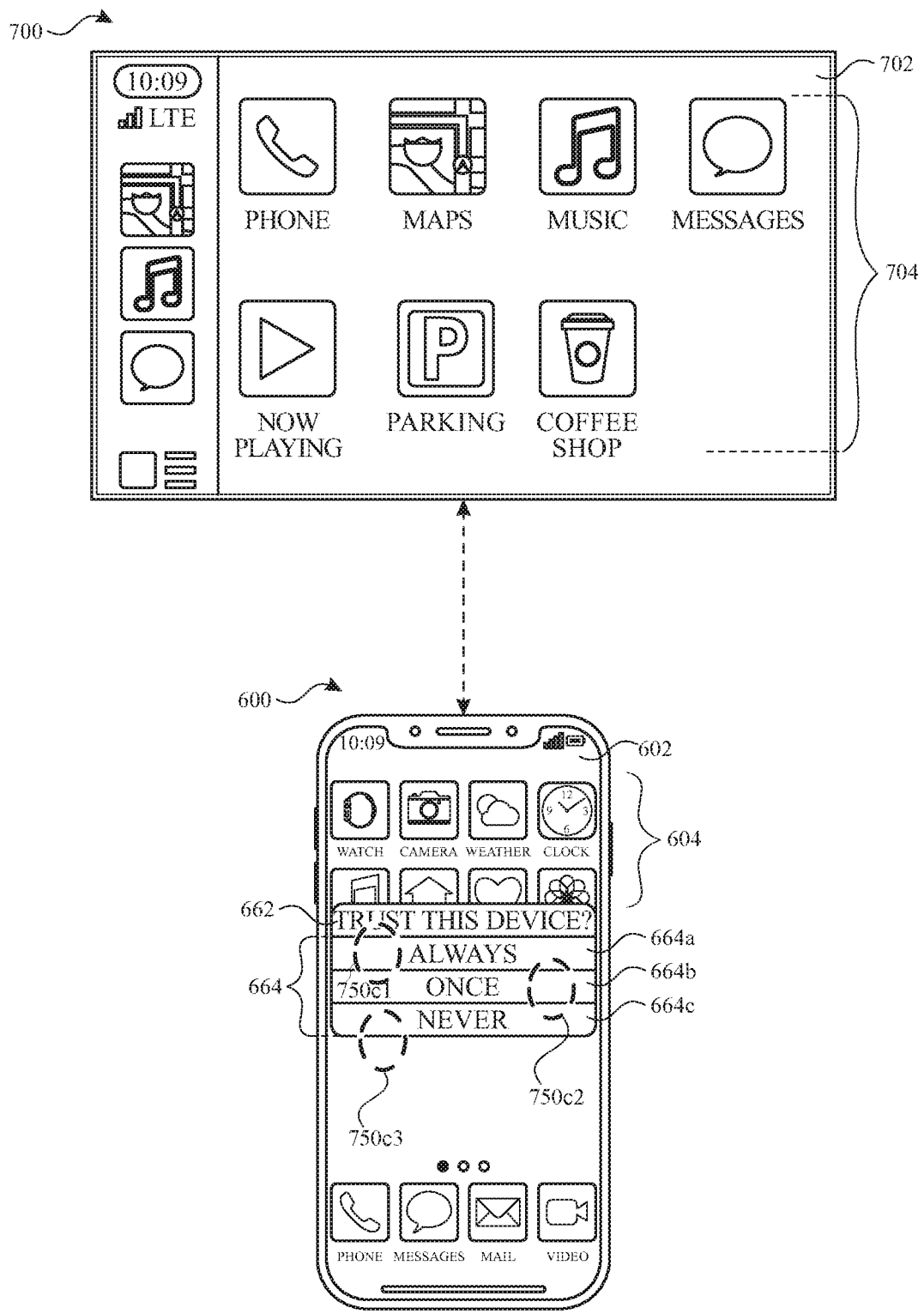

At FIG. 7C, in response to detecting tap gesture 750b, device 600 receives permission to interact with automotive head unit 700 while device 600 is operating in the locked state and ceases to display user interface 660. As illustrated in FIG. 7C, in response to detecting tap gesture 750b, device 600 displays user interface 662 overlaid on user interface 602. User interface 662 is a user interface for setting a trust level assigned to automotive head unit 700, which device 600 will use to determine if automotive head unit 700 is trusted to initiate one or more secure operations, as further described below. As illustrated in FIG. 7C, user interface 662 includes three options 664: always option 664a; once option 664b, and never option 664c.

When always option 664a is selected (e.g., via a gesture, such as a tap gesture), device 600 is configured to permanently trust automotive head unit 700, such that automotive head unit 700 will be trusted by device 600 until device 600 is manually reconfigured (e.g., via one or more inputs on different interfaces) to not trust automotive head unit 700. Thus, device 600 does not display the user interfaces illustrated in FIGS. 7A-7C because automotive head unit 700 is a permanently trusted device in scenarios where device 600 is disconnected (e.g., operable communication has ceased) and subsequently reconnected (e.g., operable communication has been initiated) to automotive head unit 700 after option always 664a has been selected.

When once option 664b is selected, device 600 is configured to temporarily trust automotive head unit 700, such that automotive head unit 700 will be trusted by device 600 until device 600 is disconnected from automotive head unit 700. Thus, device 600 does re-display the user interfaces illustrated in FIGS. 7A-7C because automotive head unit 700 would no longer be a trusted device in scenarios where device 600 is disconnected (e.g., operable communication has ceased) and subsequently reconnected (e.g., operable communication has been initiated) to automotive head unit 700 after once option 664b has been selected.

When never option 664c is selected, device 600 is configured to not trust automotive head unit 700, such that automotive head unit 700 is not a trusted device. Thus, device 600 does display the user interfaces illustrated in FIGS. 7A-7C because automotive head unit 700 is not a trusted device in scenarios where device 600 is disconnected (e.g., operable communication has ceased) and subsequently reconnected (e.g., operable communication has been initiated) to automotive head unit 700 after never option 664c has been selected.

While FIG. 7C illustrates user interface 662 that includes three options 664 for setting device 600's level of trust for automotive head unit 700, automotive head unit 700 can be trusted or not trusted based on other factors. In some embodiments, device 600 will be configured to trust automotive head unit 700 when automotive head unit 700 is a particular type of display device, such as a display device that is from a specific manufacturer or has a particular type of software installed. In some embodiments, device 600 will be configured to trust automotive head unit 700 when device 600 is physically connected to a vehicle that includes hardware (e.g., a secure identity chip) that is trusted by device 600. In some embodiments, when device 600 trusts automotive head unit 700 based on other factors, user interface 662 is not displayed in response to detecting tap gesture 750b.

Figure 7D:
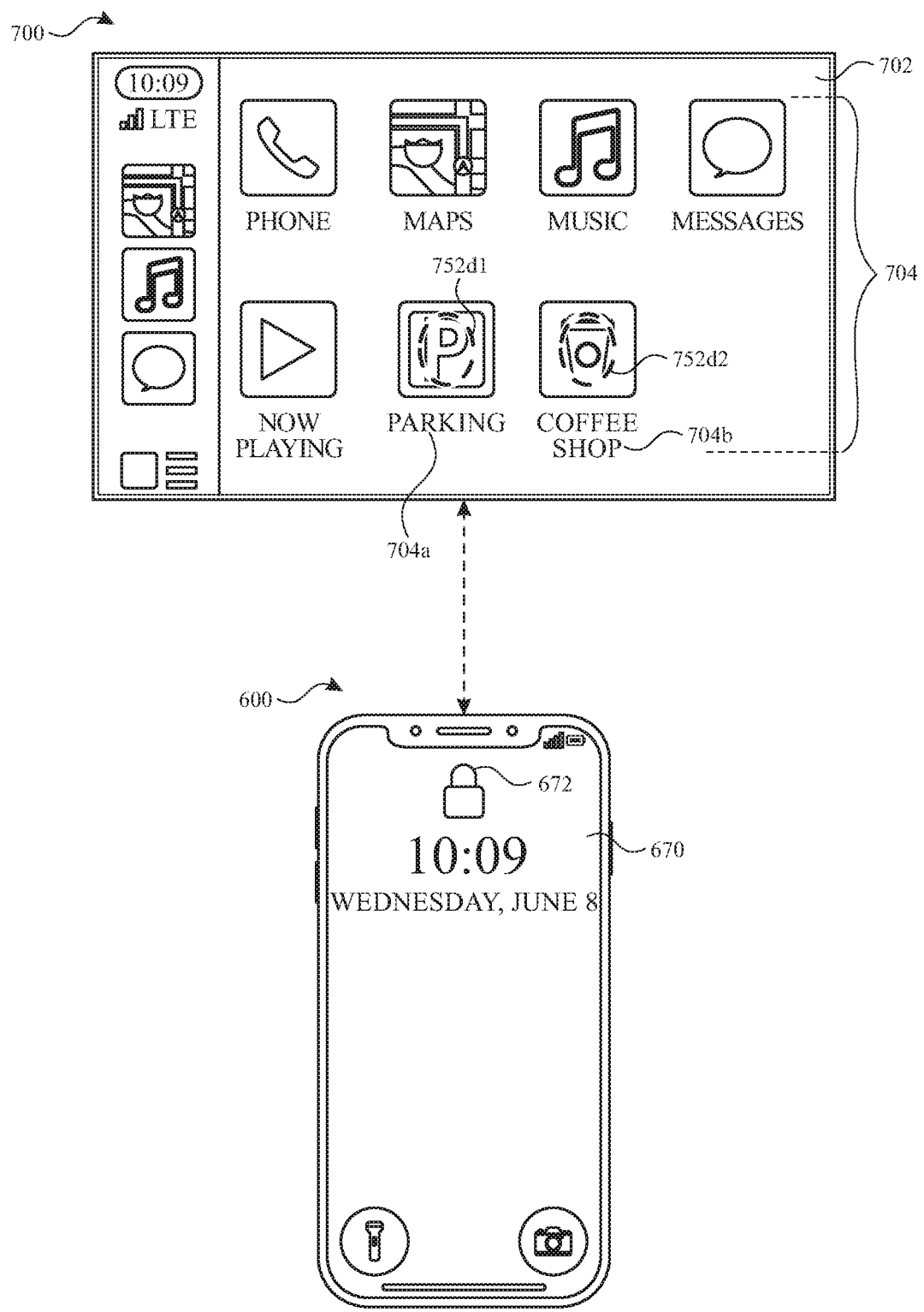
Figure 7E:
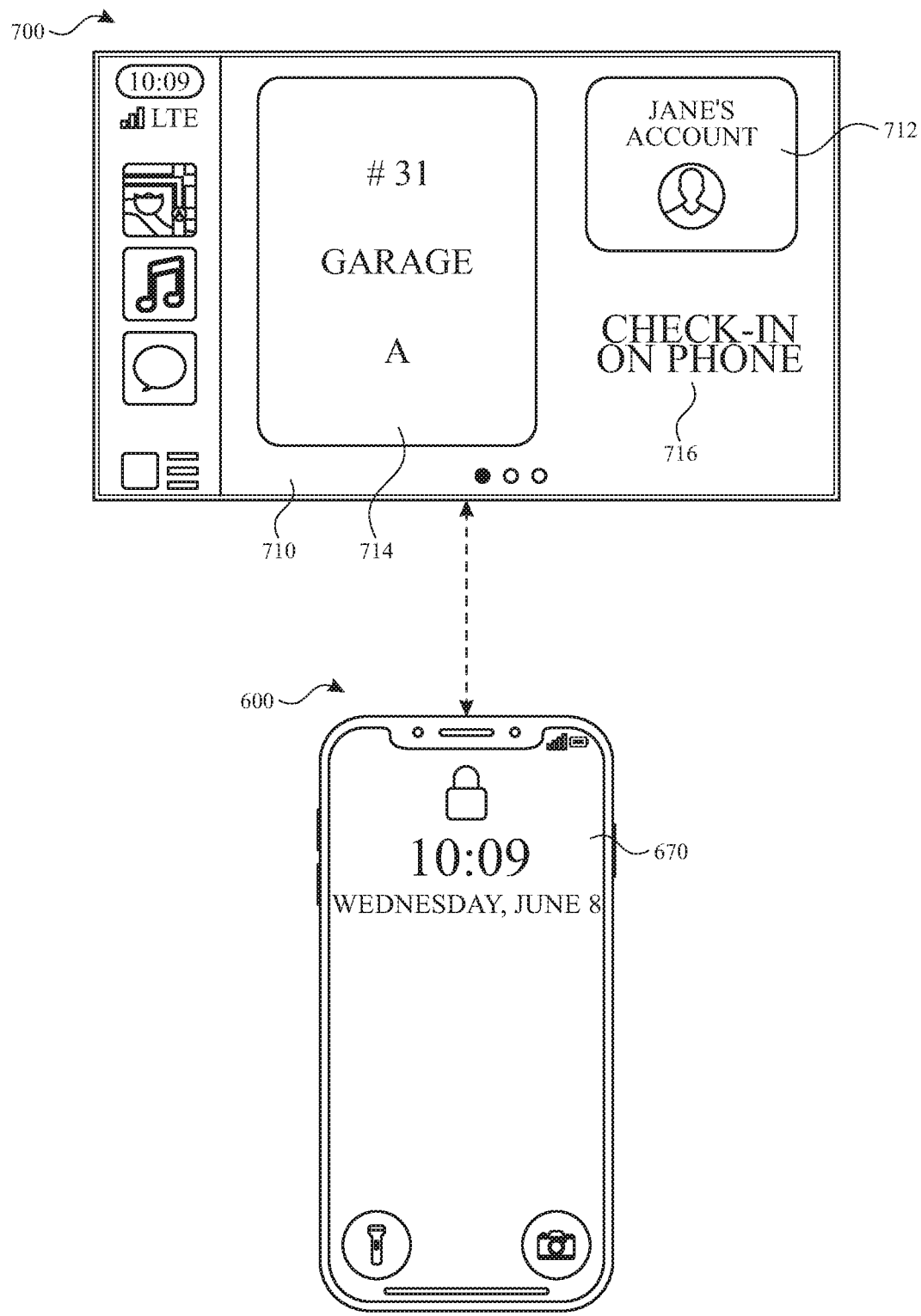
Figure 7F:
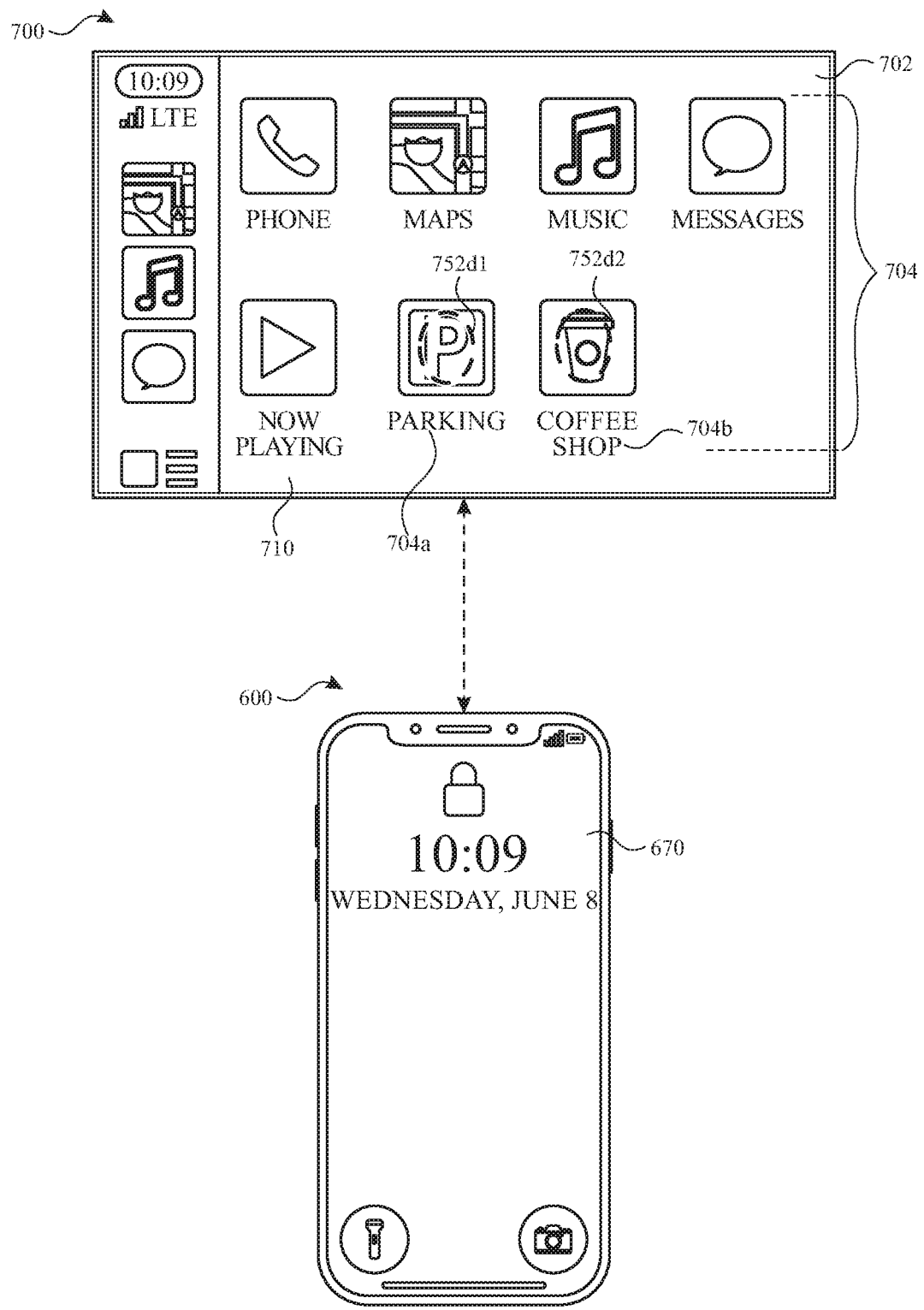

FIGS. 7D-7E illustrate exemplary user interfaces that are displayed after never option 664c has been selected in FIG. 7C. At FIG. 7C, device 600 detects tap gesture 750c3 on never option 664c.

At FIG. 7D, in response to detecting tap gesture 750c3, device 600 is configured such that automotive head unit 700 is not a trusted device, as discussed above in relation to FIG. 7C. As illustrated in FIG. 7D, device 600 is also in a locked state (e.g., as indicated by lock indicator 672) because a predetermined has passed since tap gesture 750c3 was detected, and device 600 is configured to enter into the locked state after the predetermined period of time has passed. Notably, device 600 continues to interact with automotive head unit 700 (e.g., cause user interface 702 to be displayed) while device 600 is in the locked state because device 600 received permission to do so (e.g., via tap gesture 750b on allow-interaction-while-locked control 661 in FIG. 7B). At FIG. 7D, device 600 receives an indication from automotive head unit 700 that tap gesture 752d1 has been detected at a location on automotive head unit 700 that corresponds to parking application icon 704a.

As illustrated in FIG. 7E, in response to device 600 receiving the indication that tap gesture 752d1 has been detected, device 600 causes automotive head unit 700 to display user interface 710. User interface 710 corresponds to user interface 610 that was discussed above in relation to FIGS. 6B-6D. Thus, user interface 710 is a user interface for the parking application. When compared to user interface 610 of FIG. 6B, user interface 710 includes less information (e.g., no recommendation information on user interface 710) than the information that is displayed on user interface 610. Also, one or more similar components (e.g., account identifier 712) displayed on user interface 710 is enlarged when compared to the corresponding component (e.g., account identifier 612) on user interface 610. However, user interface 610 of FIG. 6B and user interface 710 convey similar information.

As illustrated in FIG. 7E, user interface 710 includes account identifier 712 and current parking information 714 (e.g., which are displayed using similar techniques and for similar reasons as discussed above in relation to account identifier 612 and current parking information 614). As shown in FIG. 7E, account identifier 712 indicates that device 600 is currently logged into "Jane's Account" and currently parking information 714 indicates that parking spot #31 in Garage A is currently assigned to Jane's account.

Notably, as illustrated in FIG. 7E, device 600 does not display a control that corresponds to check-in control 618 in response to device 600 receiving the indication that tap gesture 752d1 has been detected. Here, device 600 does not display a control that corresponds to check-in control 618 because automotive head unit 700 is not a trusted device (e.g., via tap gesture 750c3 on never option 664c). Instead of causing a check-control to be displayed, device 600 causes automotive head unit 700 to display instruction 716, which indicates that a user must complete the check-in process on device 600 (e.g., via one or more inputs on device 600 as discussed above in relation to FIGS. 6A-6E). In some embodiments, device 600 causes automotive head unit 700 to display instruction 716, even if the device is a trusted device, if the parking application on device 600 does not have an account already on file (e.g., linked to) the application. Thus, at FIG. 7E, one or more inputs cannot be detected on automotive head unit 700 that would cause device 600 to complete a secure operation because automotive head unit 700 is not trusted by device 600.

FIGS. 7F-7I illustrate exemplary user interfaces that are displayed after always option 664a or once option 644b has been selected in FIG. 7C. At FIG. 7C, device 600 detects tap gesture 750c1 on always option 664a or tap gesture 750c2 on once option 644b. At FIG. 7F, in response to detecting tap gesture 750c1 or tap gesture 750c2, device 600 is configured such that automotive head unit 700 is a trusted device (e.g., as discussed above in relation to FIG. 7C). At FIG. 7F, automotive head unit 700 and device 600 display the same respective user interfaces as the user interfaces displayed in FIG. 7D. At FIG. 7F, device 600 receives an indication from automotive head unit 700 that tap gesture 752d1 has been detected at a location on automotive head unit 700 that corresponds to parking application icon 704a.

Figure 7G:
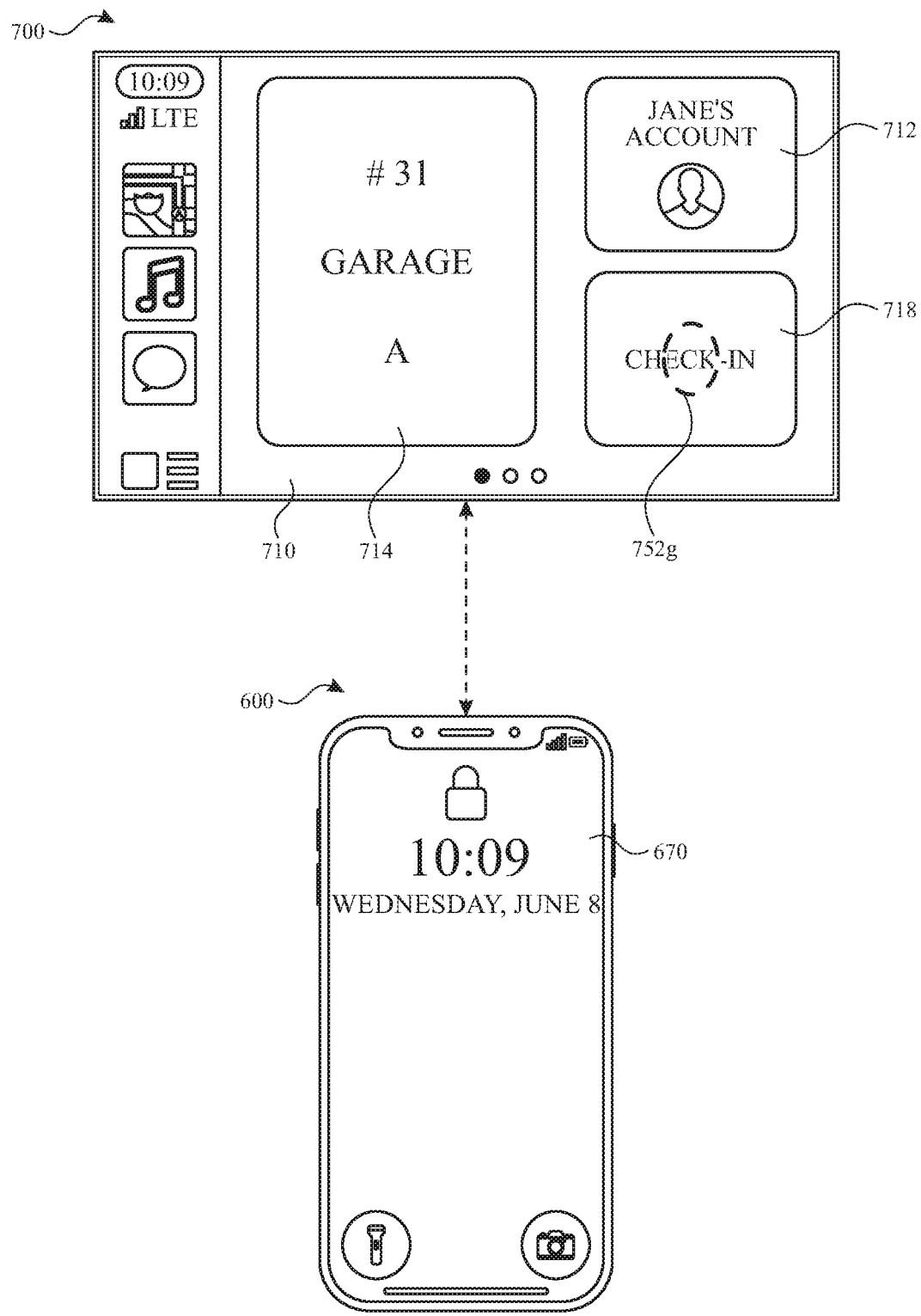

As illustrated in FIG. 7G, in response to device 600 receiving the indication that tap gesture 752d1 has been detected, device 600 causes automotive head unit 700 to display user interface 710. User interface 710 of FIG. 7G includes the same components as described above in relation to user interface of FIG. 7E, except for one distinct component. As illustrated in FIG. 7G, user interface 710 includes check-in control 718 that was not displayed in FIG. 7E and excludes instruction 716 displayed in FIG. 7E. At FIG. 7G, device 600 causes automotive head unit 700 to display check-in control because automotive head unit 700 is trusted by device 600 (e.g., via selection of always option 664a or once option 644b). In some embodiments where tap gesture 750c2 on once option 644b was detected in FIG. 7C, check-in control 718 would not be displayed when user interface 710 is re-displayed after device 600 is disconnected and subsequently reconnected to automotive head unit 700. In some embodiments where tap gesture 750c1 on always option 644a was detected in FIG. 7C, check-in control 718 would be displayed when user interface 710 is re-displayed after device 600 is disconnected and subsequently reconnected to automotive head unit 700. At FIG. 7G, device 600 receives an indication from automotive head unit 700 that tap gesture 752g has been detected at a location on automotive head unit 700 that corresponds to check-in control 718. In some embodiments, check-in control 718 is not displayed when account information (e.g., Jane's e-mail address) related to Jane's account is not stored in the secure hardware component and configured to be used to complete a transaction using the parking application.

Figure 7H:
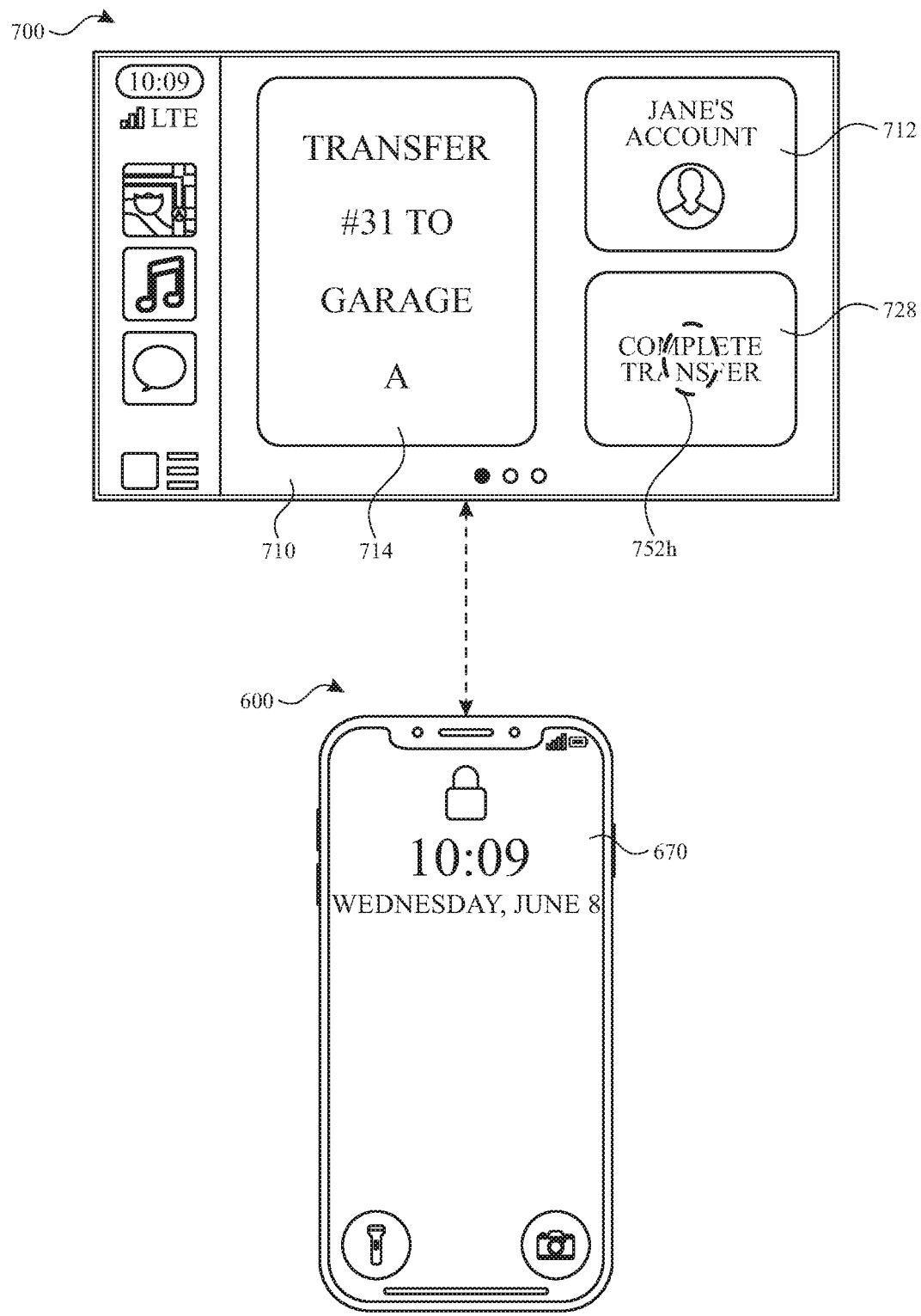

As illustrated in FIG. 7H, in response to receiving the indication that tap gesture 752g has been detected, device 600 causes automotive head unit 700 to replace check-in control 718 with confirmation control 728. At FIG. 7H, device 600 receives an indication from automotive head unit 700 that tap gesture 752h has been detected at a location on automotive head unit 700 that corresponds to confirmation control 728.

Figure 7I:
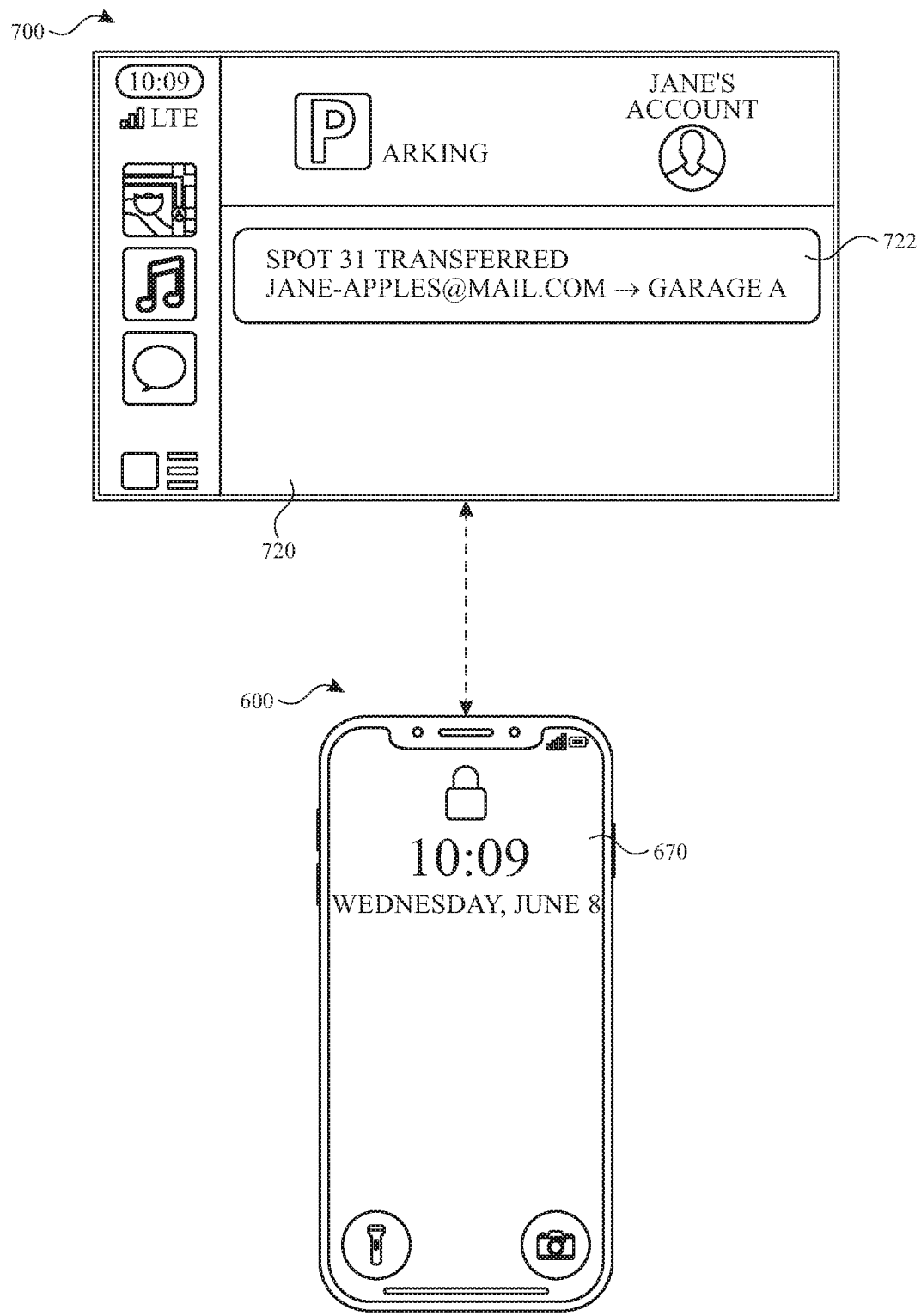

At FIG. 7I, in response to receiving the indication that tap gesture 752h has been detected, device 600 causes parking spot #31 to be transferred from Jane's account to Garage A's account. In some embodiments, the transfer occurs in response to tap gesture 752g on check-in control 718 without requiring a further confirmation input. At FIG. 7I, when device 600 causes parking spot #31 to be transferred from Jane's account to Garage A's account, device 600 (and not automotive head unit 700) communicates one or more external devices (e.g., a database, an account management server) that updates Jane's account information and Garage A's account information to perform the transfer. In some embodiments, information (e.g., Jane's e-mail address) corresponding to Jane's account is stored in a secure hardware component of device 600, and device 600 accesses the information corresponding to Jane's account in the secure hardware component. In some embodiments, device 600 sends the accessed information corresponding to Jane's account (e.g., or a token that corresponds to the accessed information) to one or more external devices as a part of performing the transfer.

Looking back at FIG. 6C-6D, device 600 caused parking spot #31 to be transferred after authenticating the user (e.g., via cameras 646a and 646b) via capturing biometric data in response detecting a confirmation gesture (e.g., double-click input 650c). However, in FIG. 7H, device 600 causes parking spot #31 to be transferred from Jane's account to Garage A's account without authenticating the user of device 600 and/or automotive head unit 700 after receiving the indication that tap gesture 752h was detected. In FIG. 7H, device 600 does not need to authenticate the user via capturing biometric data because automotive head unit 700 is trusted by device 600. When a user is operating a vehicle, it can be helpful to allow a user of a trusted display device to complete transactions without providing biometric data (or other authentication data) via device 600 for simplicity and safety reasons. In some embodiments, device 600 does not also need to authenticate the user via biometric data because device 600 previously authenticated the user when device 600 was unlocked in FIGS. 6A-6B.

As illustrated in FIG. 7I, in response to receiving the indication that tap gesture 752h has been detected, device 600 causes automotive head unit 700 to display transaction interface 720 that includes transaction information 722. Transaction interface 720 includes information concerning the transaction that was completed to transfer parking spot #31 from Jane's account to Garage A's account. Transaction information 722 is displayed using similar techniques to those described above in relation to transaction information 622 of FIG. 6E. Here, transaction information 722 and transaction information 622 are displayed using different layouts. In some embodiments, transaction information 722 and transaction information are displayed using the same layout.

Figure 7J:
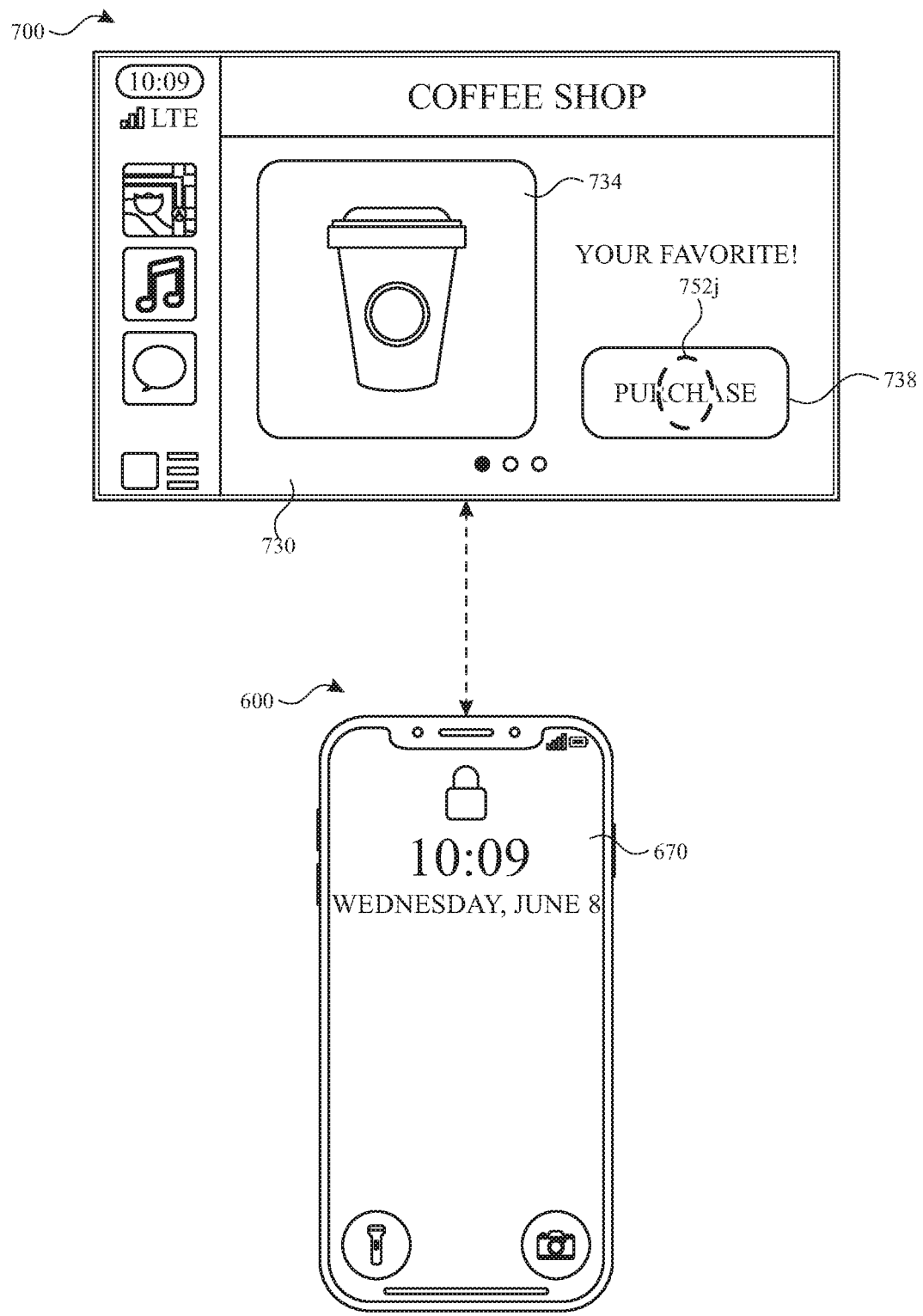
Figure 7K:
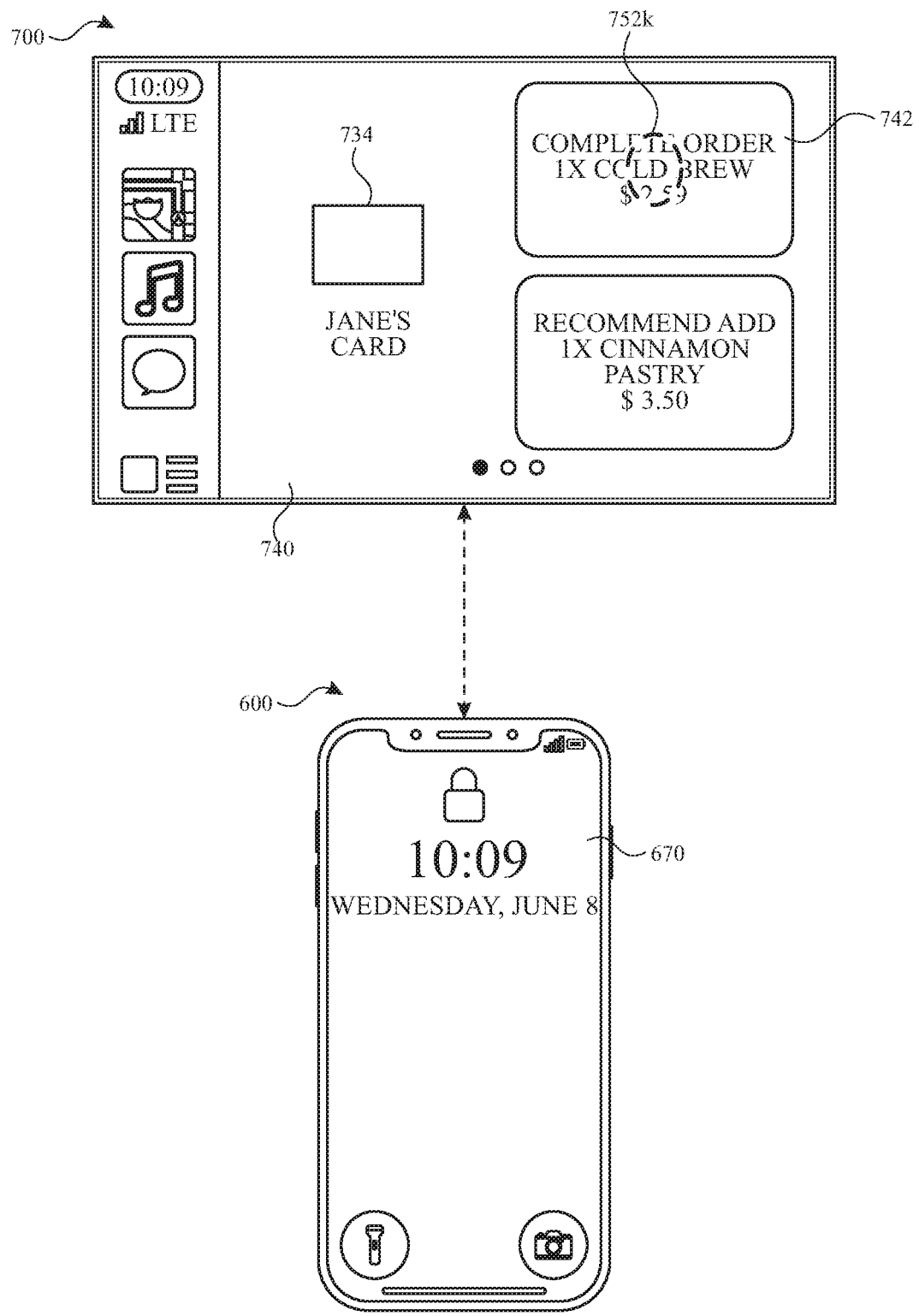
Figure 7L:
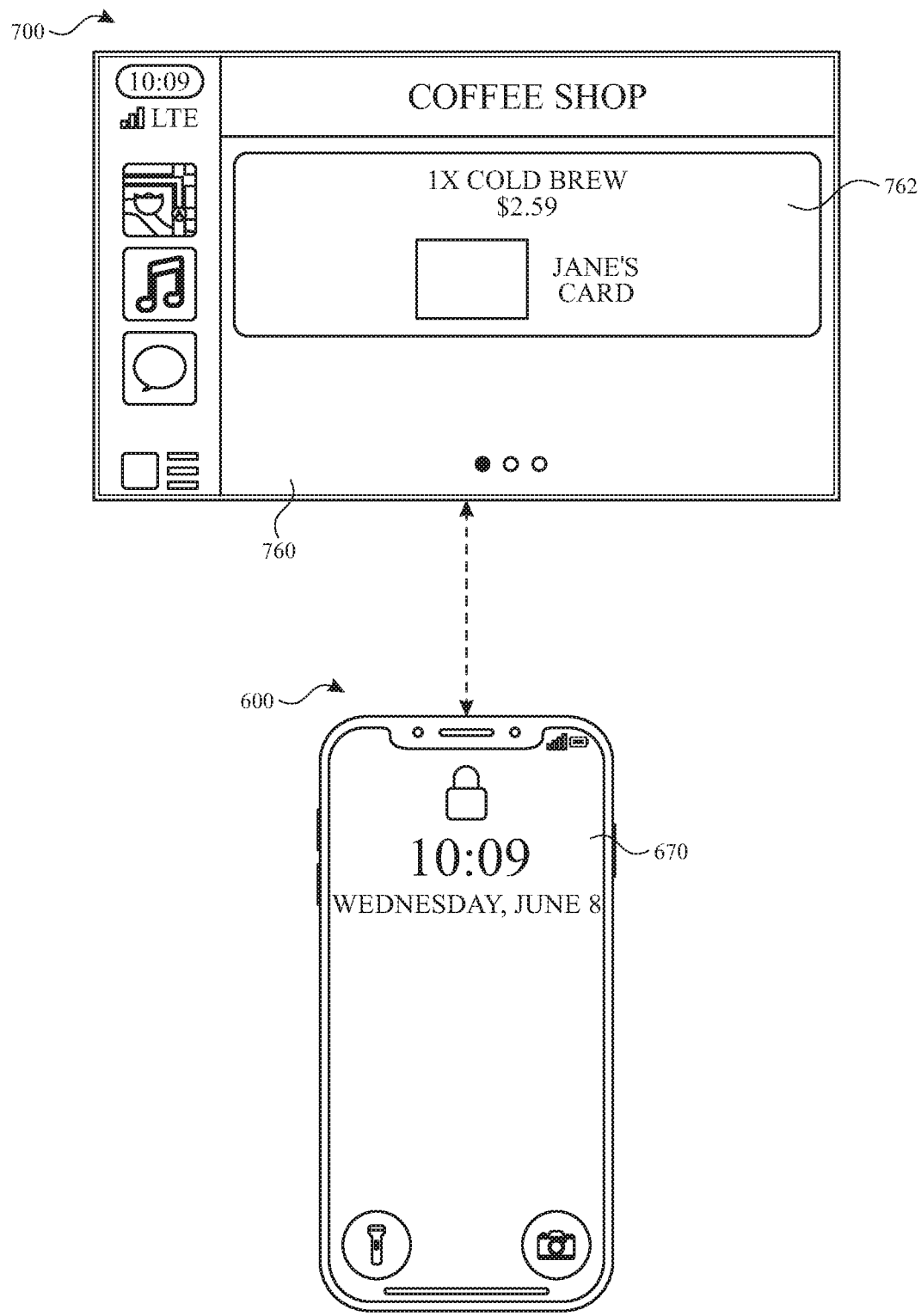

FIGS. 7J-7L illustrate exemplary user interfaces that are displayed in a scenario where another type of transaction (e.g., a payment transaction) using a different application (e.g., a coffee shop application) is attempted to be completed after always option 664a or once option 644b has been selected in FIG. 7C. Turning back to FIG. 7F (or FIG. 7D), device 600 receives an indication from automotive head unit 700 that tap gesture 752d2 has been detected at a location on automotive head unit 700 that corresponds to coffee shop application icon 704b.

As illustrated in FIG. 7J, in response to receiving the indication that tap gesture 752d2 has been detected, device 600 causes automotive head unit 700 to display user interface 730, which a user interface for the coffee shop application. User interface 730 includes order recommendation 734 along with purchase control 738. At FIG. 7J, device 600 causes automotive head unit 700 to display purchase control 738 because automotive head unit 700 is a trusted device (e.g., always option 664a or once option 644b was previously selected in FIG. 7C). In some embodiments, device 600 does not cause automotive head unit 700 to display purchase control 738 when automotive head unit 700 is not trusted by device 600. In some embodiments, automotive head unit 700 can display an instruction that indicates that device 600 must be used to purchase items from the coffee shop (e.g., a similar instruction to instruction 716, as discussed above with reference to FIG. 7E). At FIG. 7J, device 600 receives an indication from automotive head unit 700 that tap gesture 752j has been detected at a location on automotive head unit 700 that corresponds to confirmation control 728.

As illustrated in FIG. 7K, in response to receiving the indication that tap gesture 752j has been detected, device 600 causes automotive head unit 700 to display user interface 740. User interface 740 is a user interface for purchasing an order that is relevant to Jane's account. In FIG. 7J, Jane's account is associated with a favorite order that includes one cup of cold brew coffee that is priced at $2.59. As illustrated in FIG. 7J, Jane's account is also associated with card representation 734 ("Jane's Card"), which is a representation of a payment card that is linked to a bank account that is associated with Jane. As illustrated in FIG. 7J, user interface 740 also includes order confirmation control 742, which is similar to confirmation control 728 in FIG. 7H. At FIG. 7K, device 600 receives an indication from automotive head unit 700 that tap gesture 752k has been detected at a location on automotive head unit 700 that corresponds to confirmation control 728.

As illustrated in FIG. 7L, in response to receiving the indication that tap gesture 752k has been detected, device 600 causes $2.59 to be transferred from the bank account associated with Jane's card to the bank account associated with Garage A (and/or the parking application) without capturing biometric data and/or authenticating the user of automotive head unit 700 and/or device 600 (e.g., for similar reasons as discussed above in relation to FIG. 7I). At FIG. 7L, when device 600 causes money to be transferred from the bank account associated with Jane's card to the bank account associated with Garage A, device 600 (and not automotive head unit 700) communicates one or more external devices (e.g., a database, an account management server) that updates the balances of Jane's account and Garage A's account to reflect the completed transaction. In some embodiments, device 600 causes money to be transferred from Jane's account to Garage A's account using a secure hardware component (e.g., a hardware chip) that has stored information that is representative of the account number that is associated with Jane's card. In some embodiments, the secure hardware component does not store or have access to primary information (e.g., a primary account number) that is associated with Jane's card. In some embodiments, when device 600 is not configured to process transactions using Jane's card, device 600 cannot process the transaction, and device 600 does not display purchase control 638 in user interface 730, irrespective of whether automotive head unit 700 is trusted by device 600.

As illustrated in FIG. 7L, in response to receiving the indication that tap gesture 752k has been detected, device 600 causes automotive head unit 700 to display user interface 760 that includes transaction information 762. Transaction information 762 displays similar information to transaction information 722, as described above with respect to FIG. 7L. In addition, transaction information 762 of FIG. 7L is displayed using the same layout as transaction information 722 of FIG. 7L. As illustrated in FIG. 7L, transaction information 762 indicates that the $2.59 was transferred from an account associated with Jane's card, which is indicated by card representation 762.

Figure 7M:
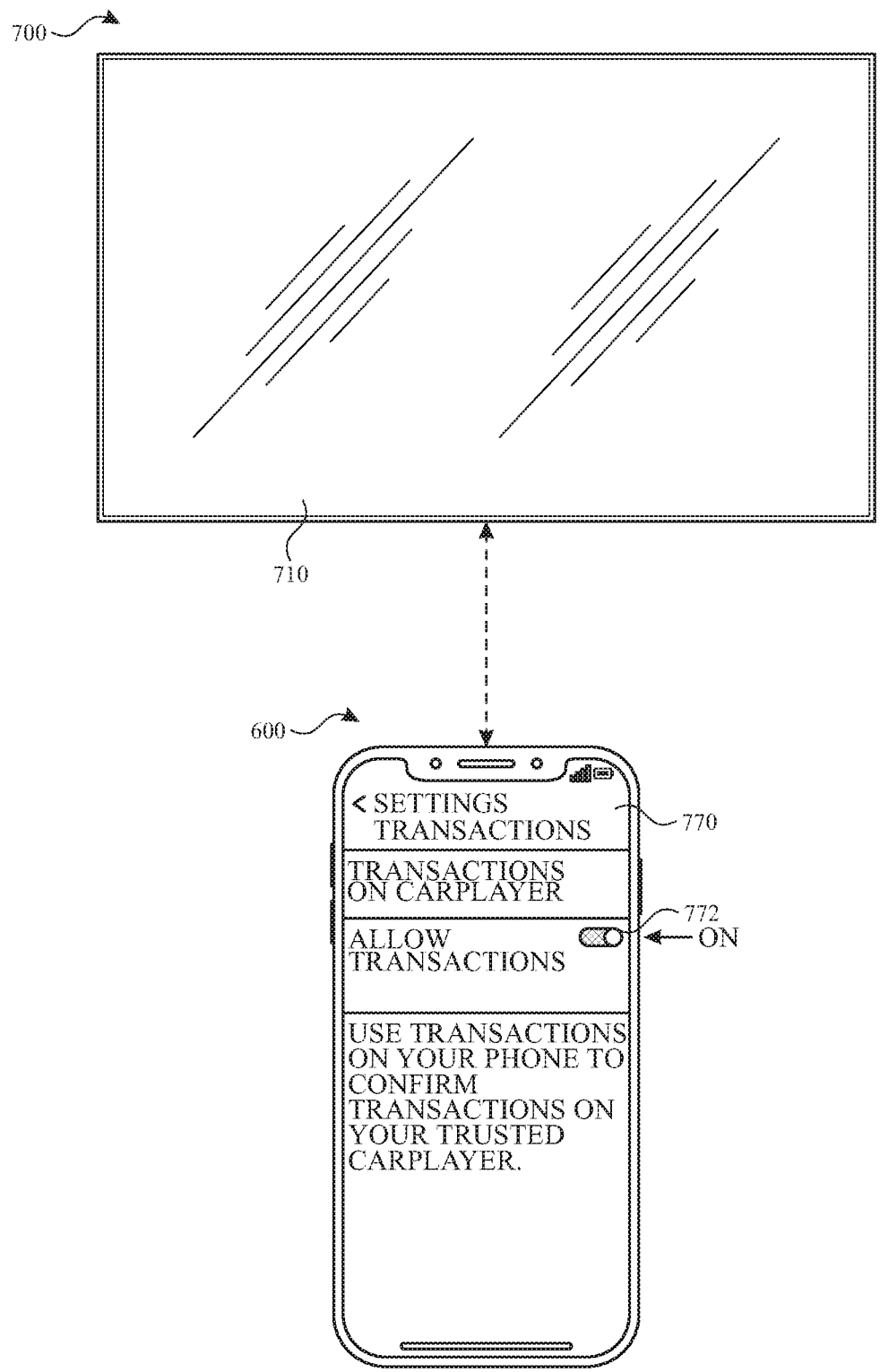

FIG. 7M illustrates device 600 displaying a settings user interface with setting 772. Setting 772 is enabled (e.g., "on") and is a setting for allowing transactions to be processed via gestures received at automotive head unit 700. Looking back at the examples discussed above in relation to FIGS. 7A-7M, device 600 was able to cause various transactions to be processed in response to detecting gestures received on automotive head unit 700, when automotive head unit 700 was trusted by device 600. Thus, in the examples discussed above in relation to FIGS. 7A-7M, setting 772 was on. In some embodiments, when setting 772 is off, device 600 is not able to cause various transactions to be processed in response to detecting gestures received on automotive head unit 700, irrespective of whether automotive head unit 700 is trusted by device 600. In some embodiments, one or more other settings similar to setting 772 exists. These settings can allow a user of device 600 to control whether device 600 is able to cause various transactions to be processed for a particular application. In some embodiments, device 600 is configured to allow transactions to be processed via gestures received at automotive head unit 700 for the parking spot application and not for the coffee shop application (e.g., via the one or more settings). Thus, in some these embodiments and irrespective of whether automotive head unit 700 is trusted by device 600, device 600 causes automotive head unit 700 to display a transaction control (e.g., check-control 718) when causing one or more user interfaces for the parking application (e.g., user interface 710 in FIG. 7G) to be displayed on automotive head unit 700, and device 600 does not cause automotive head unit 700 to display a transaction control (e.g., purchase control 738) when causing one or more user interfaces for the coffee shop application (e.g., user interface 710 in FIG. 7G) to be displayed on automotive head unit 700.

FIG. 8 is a flow diagram illustrating a method for performing a secure operation using a computer system in accordance with some embodiments. Method 800 is performed at a computer system (e.g., 100, 300, 500, 600). The computer system (e.g., 600) is in communication (e.g., wireless communication; wired communication) with an external automotive head unit (e.g., 700) (e.g., a unified hardware interface for a plurality of entertainment and information systems (e.g., sound; navigation) of an automobile (e.g., a stereo head unit; an infotainment system)) that includes one or more input components (e.g., a touch-sensitive surface (e.g., a touchscreen), a hardware button), and wherein the computer system is in communication with an external receiving device (e.g., a transaction management server; a payment terminal). Some operations in method 800 are, optionally, combined, the orders of some operations are, optionally, changed, and some operations are, optionally, omitted.

As described below, method 800 provides an intuitive way for performing a secure operation using a computer system. The method reduces the cognitive burden on a user for performing a secure operation using a computer system, thereby creating a more efficient human-machine interface. The method also enables a user to perform secure operations safer and more securely using a computer system. For battery-operated computing devices, enabling a user to perform operations using a computer system faster and more efficiently conserves power and increases the time between battery charges.

The computer system receives (802), from the external automotive head unit (e.g., 700), first data corresponding to an input (e.g., 752*g*, 752*h*, 752*j*, 752*k*) (e.g., selection of a payment selectable user interface object) received at the one or more input components of the external automotive head unit (e.g., 700) that corresponds to a request to perform a first transfer operation from a first account (e.g., Jane's Account indicated by 712, Jane's Card indicated by 734) (e.g., an account associated with the user of the computer system; a credit account; a debit account; a cash balance account) to a second account (e.g., Garage Account, Coffee Shop account) (e.g., an account associated with a merchant) using an application (e.g., a digital storefront application; a digital wallet application; an e-commerce application) on the computer system (e.g., 600) that is associated with the first account.

In response to receiving the first data (e.g., data associated with input 752*g*, 752*h*, 752*j*, or 752*k*), the computer system initiates (804) a process to perform (e.g., a process that can require one or more additional inputs (e.g., inputs at the computer system, to fully complete) the first transfer operation using the application on the computer system (e.g., a transaction (e.g., a payment transaction; a purchase). In some embodiments, performing the first operation in response to receiving the first data. In some embodiments, the first data includes one or more parameters or variables that affect the operation (e.g., an amount of a purchase; an item for purchase). As a part of performing the first transfer operation, the computer system transmits, to the external receiving device, second data that includes information that identifies the first account (e.g., an encrypted representation of the account (e.g., a device specific account number) stored on the computer system; a representation of a payment account (e.g., a credit, debit, and/or cash balance account)). In some embodiments, the second data includes information other than the account identifier (e.g., transaction parameters (e.g., a price; a quantity). Performing a transfer operation using an application on a computer system, based on an input on an automotive head unit provides the user with the ability to perform the transfer operation without having to directly interact with the computer system. Performing the operation without having to directly interact with the computer system can increase user safety while using the computer system and operating an automobile. Performing a transfer operation using an application on a computer system, based on an input on an automotive head unit, also provides the user with the option to perform the operation using inputs on the head unit. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, the application (e.g., application indicated by 604*a*, 704*a*, 604*b*, 704*b*) was configured to (e.g., and continues to be configured to) perform transfer operations from the first account prior to receiving the first data (e.g., the first account was previously associated with the application (e.g., the first account is on file with the application)). In some embodiments, a second application that has not previously been configured to perform transfer operations from an existing account (e.g., the first account) cannot be used in conjunction with the external automotive head unit to perform transfer operations (e.g., until the second application is associated with an existing account). Performing a transfer operation using an application on a computer system that was already configured to perform the operation using the first account reduces the risk of an erroneous operation (e.g., by reducing the risk of using the wrong account or errors in providing account information). Reducing the risk of errors in operating the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, a second application (e.g., application indicated by 604*a*, 704*a*, 604*b*, 704*b*), different from the first application (e.g., application indicated by 604*a*, 704*a*, 604*b*, 704*b*), is installed on the computer system (e.g., 600). In some embodiments, in accordance with (e.g., in accordance with a determination that) the second application (e.g., application indicated by 604*a*, 704*a*, 604*b*, 704*b*) being configured to perform transfer operations from a third account (e.g., Jane's Account as indicated by 712, Jane's card as indicated by 734) (e.g., an account that is different than the first account; that is the same as the first account), the second application is configured to perform a transfer operation in response to a request, received from the external automotive head unit (e.g., 700), to perform a transfer operation from the third account (e.g., Jane's Account, Jane's Card). In some embodiments, in accordance with (e.g., in accordance with a determination that) the second application (e.g., application indicated by 604*a*, 704*a*, 604*b*, 704*b*) not being configured to perform transfer operations from a third account (e.g., not being configured (e.g., pre-configured) to perform transfer operations from any existing accounts). In some embodiments, the second application is not configured to perform a transfer operation in response to a request (e.g., 752*g*, 752*h*, 752*j*, 752*k*), received from the external automotive head unit (e.g., 700), to perform a transfer operation from the third account (e.g., Jane's Account as indicated by 712, Jane's card as indicated by 734). In some embodiments, only installed applications that are already configured to perform transfer operations from one or more existing accounts can perform transfer operations based on inputs received at the external automotive head unit. Performing a transfer operation using applications on a computer system, based on whether a given application is already configured to perform the operation using an account reduces the risk of an erroneous operation (e.g., by reducing the risk of using the wrong account or errors in providing account information). Reducing the risk of errors in operating the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, the second application is configured to perform transfer operations from the third account. In some embodiments, the computer system receives (e.g., before receiving the first data; after receiving the first data), from the external automotive head unit (e.g., 700) (e.g., in some embodiments, from an external automotive head unit that is different from the external automotive head unit), third data corresponding to an input (e.g., 752*g*, 752*h*, 752*j*, 752*k*) (e.g., selection of a payment selectable user interface object) received at the one or more input components of the external automotive head unit (e.g., 700) that corresponds to a request to perform a second transfer operation from the third account (e.g., Jane's Account as indicated by 712, Jane's card as indicated by 734) (e.g., an account associated with the user of the computer system; a credit account; a debit account; a cash balance account) to a fourth account (e.g., Garage A's Account; Coffee Shop's Account) (e.g., an account associated with a merchant; an account that is the same as the second account; an account that is different from the second account) using the second application (e.g., application indicated by 604*a*, 704*a*, 604*b*, 704*b*). In some embodiments, in response to receiving the third data, the computer system initiates a process to perform (e.g., a process that can require one or more additional inputs (e.g., inputs at the computer system, to fully complete) (and, in some embodiments, performing the first operation in response to receiving the first data) the second transfer operation using the second application (e.g., application indicated by 604*a*, 704*a*, 604*b*, 704*b*) (e.g., a transaction (e.g., a payment transaction; a purchase)). In some embodiments, the first data includes one or more parameters or variables that affect the operation (e.g., an amount of a purchase; an item for purchase. In some embodiments, as a part of performing the second transfer operation, the computer system transmits, to the external receiving device, fourth data that includes information that identifies the third account (e.g., Jane's Account as indicated by 712, Jane's card as indicated by 734) (e.g., an encrypted representation of the account (e.g., a device specific account number) stored on the computer system; a representation of a payment account (e.g., a credit, debit, and/or cash balance account)). In some embodiments, the second data includes information other than the account identifier (e.g., transaction parameters (e.g., a price; a quantity). Performing a second transfer operation using a second application on a computer system, based on an input on an automotive head unit provides the user with the ability to perform the second transfer operation without having to directly interact with the computer system. Performing the operation without having to directly interact with the computer system can increase user safety while using the computer system and operating an automobile. Performing a transfer operation using an application on a computer system, based on an input on an automotive head unit, also provides the user with the option to perform the operation using inputs on the head unit. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, the computer system (e.g., 600) is in communication with (e.g., includes) a display generation component (e.g., a display (e.g., an integrated, touchscreen display)), wherein the display generation component is in a locked state (e.g., 760) (e.g., a state in which one or functions of the display (e.g., display functions; input functions), which are available in an unlocked state, are disabled/unavailable) while the computer system (e.g., 600) receives the first data. Performing a transfer operation using an application on a computer system, based on an input on an automotive head unit, while the computer system is in a locked state also provides the user with the option to perform the operation using inputs on the head unit without having to separately unlock the computer system, which can reduce the risk of unintentional inputs at the computer system; doing so also enhances security of the system by allowing the computer system to remain in a locked state more often (e.g., while still being useable). Providing additional control options and improving security enhances the operability of the computer system and makes the user-device interface more efficient (e.g., by helping the user to provide proper inputs and reducing user mistakes when operating/interacting with the device) and secure which, additionally, reduces power usage and improves battery life of the device by enabling the user to use the computer system more quickly, efficiently, and securely.

In some embodiments, the external automotive head unit (e.g., 700) has been (e.g., prior to receiving the first data) authorized (e.g., the external automotive head unit is a trusted unit; authorized via input from a user) to request performance of transfer operations from the first account (e.g., Jane's Account as indicated by 712, Jane's card as indicated by 734) (e.g., and from other accounts accessible from and/or stored on the computer system). In some embodiments, external automotive head units that are not authorized (e.g., trusted) cannot request performance of transfer operations from accounts accessible and/or stored on the computer system. Performing a transfer operation using an application on a computer system, based on an input on an automotive head unit, only if that unit is authorized, reduces the risk of unauthorized operations (e.g., particularly if the user of the computer system is not in control of inputs provided at the head unit). Reducing the risk of unauthorized operations and improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, prior to detecting the first data (e.g., data associated with input 752*g*, 752*h*, 752*j*, or 752*k*), the computer system receives a first set of one or more inputs (e.g., 750*c*1, 750*c*2) (e.g., inputs at the external automotive head unit and/or the computer system). In some embodiments, in response to the first set of one or more inputs (e.g., 750*a*, 750*b* 750*c*1, 7502), the computer system authorizes (e.g., authorizing before being in communication) connection of the external automotive head unit (e.g., 700) to the computer system (e.g., 600) while the computer system is in a locked state (e.g., 760) (e.g., a state in which one or more functions of the computer system, which are available while in an unlocked state, are unavailable)); and authorizes the external automotive head unit (e.g., 700) to request performance of transfer operations from the first account (e.g., and from other accounts accessible from and/or stored on the computer system). Authorizing the external automotive head unit to request performance of transfer operations based on prior user input provides the user with additional control options and reduces the need for authorization inputs on a per-operation basis. Providing additional control options and performing operations without requiring inputs at certain times enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently. Performing transfer operations with an authorized (e.g., trusted) external automotive head unit also increases security by reducing the risk of unauthorized requests for transfer operations. Reducing the risk of unauthorized operations and improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, while the computer system is in communication with (e.g., while connected to) the external automotive unit (e.g., 700) and while the computer system (e.g., 600) is in locked state (e.g., 760) (e.g., a state in which one or more functions of the computer system, which are available while in an unlocked state, are unavailable), the computer system receives a second set of one or more inputs (e.g., 750*a*). In some embodiments, in response to the second set of one or more inputs (e.g., 750*a*), the computer system: transitions the computer system (e.g., 600) to an unlocked state (e.g., 602) (e.g., a state in which one or more functions of the computer system, which were unavailable while in the locked state, are available); and authorizes the external automotive head unit (e.g., 700) to request performance of transfer operations from the first account (e.g., and from other accounts accessible from and/or stored on the computer system). In some embodiments, authorizing occurs concurrently as part of (e.g., is a consequence of) transitioning the computer system to the unlocked state. Authorizing the external automotive head unit to request performance of transfer operations based on a user input that also unlocks the computer system reduces the number of inputs required to perform a set of operations and also reduces the risk of unintentional operation of the computer system, as unlocking the computer system correlates to intentional use of the system. Reducing the number of inputs required to a perform a set of operations and reducing the risk of unintentional operation input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Authorizing the external automotive head unit to request performance of transfer operations based on a user input that also unlocks the computer system improves security by providing the user with an option to link authorization of the unit with another authorization function. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, prior to receiving the first data (e.g., data associated with input 752*g*, 752*h*, 752*j*, or 752*k*), the computer system transmits, to the automotive head unit, fifth data that includes one or more user interface elements (e.g., 718, 738) to be displayed by the automotive head unit. In some embodiments, the one or more user interface elements include one or more elements associated with the application (e.g., an identifier of the application) and/or associated with the first account (e.g., an identifier of the first account). Transmitting data that includes one or more user interface elements to be displayed by the automotive head unit provides the user with visual feedback concerning the computer system and its connection to the head unit. Providing improved visual feedback to the user enhances the operability of the computer system and makes the user-device interface more efficient (e.g., by helping the user to provide proper inputs and reducing user mistakes when operating/interacting with the device) which, additionally, reduces power usage and improves battery life of the computer system by enabling the user to use the computer system more quickly and efficiently.

In some embodiments, the computer system (e.g., 600) is a smartphone (e.g., a mobile computing device configured to make and receive telephone calls over a cellular network)) that includes a hardware secure element (e.g., a chip that stores information representative of an account (e.g., account-related information, such as a device-specific account number (e.g., that is different than the account number) provided by an issuer of an account) that is not directly accessible to the operating system or installed applications of the computer system). In some embodiments, the secure element does not store or have access to the primary account number. In some embodiments, the secure element provides, as part of a transfer operation, an encrypted version of the device specific account number (e.g., a version unique to a given transaction) that is decrypted by the issuer of the account in order to identify the account). In some embodiments, the information that identifies the first account is stored in the hardware secure element.

In some embodiments, while the computer system (e.g., 600) is in communication (806) with a second external automotive head unit (e.g., 700) that includes one or more input components and a second external receiving device, where the second external automotive head unit (e.g., 700) is different from the external automotive head unit (e.g., 700), the computer system receives (808), from the second external automotive head unit (e.g., 700), sixth data corresponding to an input (e.g., 752*g*, 752*h*, 752*j*, 752*k*) received at the one or more input components of the second external automotive head unit that corresponds to a request to perform a third transfer operation from the first account to a fifth account (e.g., an account associated with a vendor) using the application (e.g., a digital storefront application; a digital wallet application; an e-commerce application; an application that is different from the first or second applications; an application that is the same as the first and/or the second applications). In some embodiments, while the computer system (e.g., 600) is in communication with (806) a second external automotive head unit (e.g., 700) that includes one or more input components and a second external receiving device, the computer system, in response to receiving the sixth data, initiates (810) a process to perform (e.g., a process that can require one or more additional inputs (e.g., inputs at the computer system, to fully complete) the third transfer operation using the application on the computer system (e.g., 600). In some embodiments, as a part of performing the third transfer operation, the computer system transmits, to the second external receiving device, seventh data that includes information that identifies the first account. (e.g., an encrypted representation of the account (e.g., a device specific account number) stored on the computer system; a representation of a payment account (e.g., a credit, debit, and/or cash balance account). In some embodiments, the first operation is performed in response to receiving the first data. In some embodiments, the second data includes information other than the account identifier (e.g., transaction parameters (e.g., a price; a quantity). Providing different head units with the ability to request transfer operations at the computer system provides the user with additional options for operating the computer system. Providing additional control options and performing operations without requiring inputs at certain times enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

Note that details of the processes described above with respect to method 800 (e.g., FIG. 8) are also applicable in an analogous manner to the methods described below. For example, method 800 optionally includes one or more of the characteristics of the various methods described below with reference to method 900. For example, method 800 can be used to initiate a process to perform the first transfer operation (e.g., 804) when the external input device satisfies a set of authorization criteria and provides an option to initiate the secure transaction (e.g., in 906). For brevity, these details are not repeated below.

FIG. 9 is a flow diagram illustrating a method for providing an option to initiate a secure operation using a computer system in accordance with some embodiments. Method 900 is performed at a computer system (e.g., 100, 300, 500, 600). Some operations in method 900 are, optionally, combined, the orders of some operations are, optionally, changed, and some operations are, optionally, omitted.

As described below, method 900 provides an intuitive way for providing an option to initiate a secure operation using a computer system. The method reduces the cognitive burden on a user for providing an option to initiate a secure operation using a computer system, thereby creating a more efficient human-machine interface. The method also enables a user to perform secure operations safer and more securely using a computer system. For battery-operated computing devices, enabling a user to providing an option to initiate a secure operation using a computer system faster, and more efficiently conserves power and increases the time between battery charges.

While the computer system (e.g., 600) is connected to an external input device (e.g., 700) (e.g., an automotive head unit (e.g., a unified hardware interface for a plurality of entertainment and information systems (e.g., sound; navigation) of an automobile (e.g., a stereo head unit; an infotainment system))), the computer system receives (902) a first request (e.g., 752d1, 752d2) (e.g., selection of option or a variable) from the external input device to interact with a first portion of a user interface (e.g., 710, 730) (e.g., a an interface of digital storefront application; a digital wallet application; an e-commerce application; an interface displayed at the external input device (e.g., that is generated, at least in part, based on data from the computer system)) that is associated with a secure transaction (e.g., a transfer of resources (e.g., credits; funds) from a first account (e.g., an account associated with a user of the computer system) to a second account (e.g., an account associated with a merchant)) that, if authorized from the computer system (e.g., 600), would require separate authorization (e.g., 646a, 646b, 638) from the user (e.g., a transaction that requires additional authentication when performed on the computer system via one or more inputs received via one or more input devices of the computer system such as entry of a passcode or biometric authentication via fingerprint, facial, iris or other biometric authentication).

In response to (904) receiving the first request (e.g., 752d1, 752d2) and in accordance with a determination that the external input device (e.g., 700) satisfies a set of authorization criteria (e.g., a set of criteria that is satisfied when the external input device has been authorized by a previous user input, when the external input device is a device of a first type, and/or when the external input device is not a device of a second type), the computer system provides (906) an option (e.g., 718) (e.g., a selectable user interface object; a prompt (e.g., a visual or audio prompt) to use one or more input devices (e.g., a touch-sensitive surface; a microphone) of the external input device), via the external input device (e.g., 700), to initiate a secure transaction without requiring the separate authorization from the user.

In response to (904) receiving the first request (e.g., 752d1, 752d2) and in accordance with a determination that the external input device (e.g., 700) does not satisfy the set of authorization criteria, the computer system forgoes (912) providing the option (e.g., 716 in FIG. 7E) to initiate a secure transaction without requiring the separate authorization from the user. In some embodiments, as a part of forgoing providing the option to initiate a secure transaction without requiring the separate authorization from the user, the computer system provides a second option to initiate the secure transaction that requires separate authorization from the user at the external input device and/or the computer system. Providing an option to initiate a secure transaction without requiring separate authorization from the user in response to a request at an external input device provides the user with the option to perform the secure transaction without requiring the separate authorization and without having to directly interact with the computer system. Providing an option to perform the operation without having to directly interact with the computer system and reducing the number of required inputs can increase the ease of use of the computer; doing so also provides the user with the option to perform the operation using inputs on the external input device. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently. Providing an option to initiate a secure transaction if the external input device satisfies a set of authorization criteria increases security by not providing the option when the external input device does not satisfy the criteria. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, the external input device (e.g., 700) is an external automotive head unit (e.g., a unified hardware interface for a plurality of entertainment and information systems (e.g., sound; navigation) of an automobile (e.g., a stereo head unit; an infotainment system)). In some embodiments, the computer system (e.g., 600) is a smartphone (e.g., a mobile computing device configured to make and receive telephone calls over a cellular network)) that includes a hardware secure element (e.g., a chip that stores information representative of an account (e.g., account-related information, such as a device-specific account number (e.g., that is different than the account number) provided by an issuer of an account) that is not directly accessible to the operating system or installed applications of the computer system) for use in the secure transaction. In some embodiments, the secure element does not store or have access to the primary account number. In some embodiments, the secure element provides, as part of a transfer operation, an encrypted version of the device specific account number (e.g., a version unique to a given transaction) that is decrypted by the issuer of the account in order to identify the account.

In some embodiments, the computer system (e.g., 600) includes one or more external device communication interfaces (e.g., a communication system for transferring data between the computer system and one or more external devices; a wired communication bus; a wireless communication bus; a data bus). In some embodiments, the computer system detects, via the one or more external device communication interfaces, connection (e.g., 708) of the computer system to the external input device. In some embodiments, the first request (e.g., 752d1, 752d2) is received after detecting connection of the computer system to the external input device.

In some embodiments, the computer system (e.g., 600) is in communication with one or more hardware input devices (e.g., touch-sensitive display of 600) (e.g., a touch-sensitive surface (e.g., a touchscreen); a microphone; a biometric reader (e.g., a fingerprint reader; an optical and/or depth sensor for detecting facial features)). In some embodiments, the secure transaction, when authorized from the computer system (e.g., 600) (e.g., rather than the external input device), requires authorization from the user provided via the one or more hardware input devices (e.g., authorization to perform the secure transaction using information from a hardware secure element (e.g., a chip that stores account information that is not directly accessible to the operating system or installed applications of the computer system) that stores information (e.g., account information; information that identifies an account) for use in the secure transaction). In some embodiments, the computer receives a request at the computer system to perform the secure transaction. In some embodiments, after receiving the first request and in accordance with a determination that authorization has been provided (e.g., provided before receiving the first request; provided after receiving the first request), via the one or more hardware input devices, the computer system performs the secure transaction. Requiring authorization to perform the secure transaction improves security by reducing the risk of unauthorized requests. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, the one or more hardware input devices includes a biometric reader (e.g., 646a, 646b) (e.g., a fingerprint reader; an optical and/or depth sensor for detecting facial features)) and the authorization from the user provided via the one or more hardware input devices is a biometric authorization (e.g., indicated by 628, 630) (e.g., an authorized fingerprint scan or an authorized face scan) received via the biometric reader (e.g., 646a, 646b) (e.g., authorization to perform the secure transaction using information from a hardware secure element (e.g., a chip that stores account information that is not directly accessible to the operating system or installed applications of the computer system) that stores information (e.g., account information; information that identifies an account) for use in the secure transaction). Requiring authorization via a biometric reader improves security by reducing the risk of unauthorized requests. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, after providing the option (e.g., 718) to initiate a secure transaction without requiring the separate authorization from the user, receiving (908) a request (e.g., 752g, 752h) from the external input device (e.g., 700) to proceed with the secure transaction (e.g., an input; selection of a payment selectable user interface object displayed at a display of the external input device; a voice command received at the external input device). In some embodiments, as a part of providing the option, the computer system transmits, to the external input device, data that includes one or more user interface elements to be displayed by the external input device). In some embodiments, in response to receiving the request from the external input device (e.g., 700) to proceed with the secure transaction, the computer system performs (910) the secure transaction including securely transmitting to an external receiving device (e.g., a transaction management server; a payment terminal) first data that includes information that identifies a first account (e.g., "Jane's Account," as indicated by 612, 712; "Jane's Card" as indicated by 734) (e.g., an encrypted representation of the account (e.g., a device specific account number) stored on the computer system; a representation of a payment account (e.g., a credit, debit, and/or cash balance account)) for use in the secure transaction. In some embodiments, the second data includes information other than the account identifier (e.g., transaction parameters (e.g., a price; a quantity). Performing the secure transaction based on a request from the external input device provides the user with the option to perform the operation using inputs at the external input device. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, the computer system (e.g., 600) is in communication with (e.g., includes) a display generation component (e.g., a display (e.g., an integrated, touchscreen display)). In some embodiments, performing the secure transaction (e.g., including securely transmitting to the external receiving device the first data that includes information that identifies the first account) occurs while the display generation component is in a locked state (e.g., 670) (e.g., a state in which one or functions of the display (e.g., display functions; input functions), which are available in an unlocked state, are disabled/unavailable). Performing the secure transaction while the display generation component in communication with the computer system is in a locked state provides the user with the option to perform the transaction without having to interact (e.g., view or provide inputs directed to the component) with the display generation component. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently. Performing the secure transaction while the display generation component in communication with the computer system is in a locked state also increases security by allowing the computer system to remain in the locked state, while still permitting interactions via the external input device. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, the secure transaction is performed using a first application (e.g., application that corresponds to 604a, 604b) on the computer system (e.g., 600). In some embodiments, the user interface (e.g., 720, 760) is an interface displayed at the external input device (e.g., 700). In some embodiments, the user interface (e.g., 720, 760) is arranged according to a first interface layout template (e.g., a scheme for arranging the graphical elements and/or contents of the interface) and includes (e.g., 722, 762) information provided by the first application (e.g., application that corresponds to 604a, 604b) (e.g., an identifier (e.g., textual and/or graphical) of the first application; a parameter that affects performance of the secure transaction (e.g., an amount of credit or currency being transferred); a service or goods being purchased); an identifier of an account to be used within the secure transaction). In some embodiments, the computer system receives a second request (e.g., 752d1, 752d2) from the external input device (e.g., 700) to interact with a first portion of a second user interface (e.g., 720, 760) (e.g., an interface that is the same as the user interface; an interface that is different from the user interface) that is displayed at the external input device (e.g., 700) and associated with a second secure transaction performed using a second application (e.g., application that corresponds to 604a, 604b) on the computer system (e.g., 600) that, if authorized from the computer system (e.g., 600), would require separate authorization from the user. In some embodiments, the second application (e.g., application that corresponds to 604a, 604b) is different from the first application. In some embodiments, the second user interface (e.g., 720, 760) is arranged according to the first interface layout template and includes information (e.g., 722, 762) (e.g., an identifier (e.g., textual and/or graphical) of the second application; a parameter that affects performance of the secure transaction (e.g., an amount of credit or currency being transferred); a service or goods being purchased); an identifier of an account to be used within the second secure transaction) provided by the second application (e.g., application that corresponds to 604a, 604b). Arranging interfaces corresponding to different applications for performing different secure transactions according to the same interface layout provides the user with improved visual feedback that consistently informs the user about aspects of the secure transactions. Providing improved visual feedback to the user enhances the operability of the computer system and makes the user-device interface more efficient (e.g., by helping the user to provide proper inputs and reducing user mistakes when operating/interacting with the device) which, additionally, reduces power usage and improves battery life of the computer system by enabling the user to use the computer system more quickly and efficiently.

In some embodiments, the set of authorization criteria is satisfied when: the computer system, prior to receiving the first request (e.g., 752d1, 752d2) (e.g., and while not detecting movement of an automobile connected to the external input device), received a first set of one or more inputs (e.g., 750a) (e.g., selection of an option in a peripheral management interface; a set of inputs received at the external input device; a set of inputs received at the computer system). In some embodiments, in response to the first set of one or more inputs (e.g., 750a), the computer system authorized (e.g., authorizing before being in communication with the external input device) connection of the external input device (e.g., 700) to the computer system (e.g., 600) while the computer system is in a locked state (e.g., 670) (e.g., a state in which one or more functions of the computer system, which are available while in an unlocked state, are unavailable)). Authorizing connection of the external input device to the computer system while the computer system is in a locked state provides the user with additional control options and reduces the need for authorization inputs at the time the secure transaction is requested. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently. Satisfying the authorization criteria based on a previous input that also authorized connection of the external input device to the computer system while in a locked state increases security by linking authorization features to reduce the risk of unintentional authorization. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, the external input device (e.g., 700) satisfies the set of authorization criteria based on a status (e.g., a status that establishes a duration (e.g., permanent (e.g., until revoked), temporary (e.g., for a transient duration (e.g., 1 day, 1 week) or for a preset number of connection events (e.g., 1 connection event; 5 connection events)) for which the external input device will satisfy the set of authorization criteria) is established (e.g., set) based on a second set of one or more inputs (e.g., 750*b*, 750*c*1, 750*c*2) (e.g., selection of a second option in a peripheral management interface; a set of inputs received at the external input device; a set of inputs received at the computer system) that is received after having received the first set of one or more inputs (e.g., 750*a*). Establishing a status of the external input device that affects satisfaction of the authorization criteria provides the user with additional control options for precisely controlling the relationship between the computer system and the external input device. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently. Satisfying the authorization criteria based on a previous input increases security by providing the user with an opportunity to provide authorization outside the context of performing the particular secure transaction, which can reduce the risk of unintended authorization. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, the external input device (e.g., 700) satisfies the set of authorization criteria based on the status being a long-term (e.g., indefinite until revoked) authorization status. In some embodiments, the first set of one or more inputs (e.g., 750*a*, 750*b*, 752*c*1) was received while the computer system (e.g., 600) is in a connection session (e.g., session that starts with connection of the computer system to the external input device and sends when that connection is discontinued) with the external input device (e.g., 700) that is also the connection session during which the first request (e.g., 752*d*1, 752*d*2) was received or while the computer system (e.g., 600) was in a preceding connection session with the external input device (e.g., 700) that is different from the connection session during which the first request (e.g., 752*d*1, 752*d*2) was received.

In some embodiments, the external input device (e.g., 700) satisfies the set of authorization criteria based on the status being a short-term (e.g., temporary or for a transient duration (e.g., 1 day, 1 week) or for a preset number of connection events (e.g., 1 connection event; 5 connection events); expiring without requiring further user input) authorization status. In some embodiments, the first set of one or more inputs (e.g., 750*a*, 750*b*, 750*c*2) was received while the computer system is in a connection session (e.g., session that starts with connection of the computer system to the external input device and sends when that connection is discontinued) with the external input device (e.g., 700) that is also the connection session during which the first request (e.g., 752*d*1, 752*d*2) was received. In some embodiments, the set of one or more inputs was not received (e.g., cannot be received) while the computer system was in a preceding connection session with the external input device that is different from the connection session during which the first request was received, when the status is a temporary authorization status.

In some embodiments, the external input device (e.g., 700) satisfies the set of authorization criteria based on an input (e.g., 750*a*, 750*b*, 750*c*1, 750*c*2) (e.g., selection of an option in a peripheral management interface), received prior to receiving the first request (e.g., prior to connecting to the external input device), the computer system authorizes (e.g., pre-authorizing) the external input device (e.g., 700) to provide requests to initiate one or more secure transactions that, if authorized from the computer system (e.g., 600), would require separate authorization from the user. In some embodiments, the input authorizing (e.g., pre-authorizing) the external input device to provide requests to initiate one or more secure transactions that, if authorized from the computer system, would require separate authorization from the user is different from an input authorizing the external input device to connect to the computer system while the computer system is in a locked state (e.g., a state in which one or more functions of the computer system, which are available while in an unlocked state, are unavailable). Authorizing the external input device based on a prior input allows the user to better control the relationship between the computer system and the external input device. Providing additional control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently. Satisfying the authorization criteria based on a previous and explicit input authorizing secure transactions, reduces the risk of unintended authorization and increases security. Improving security of the computer system enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more securely, quickly, and efficiently.

In some embodiments, the external input device (e.g., 700) satisfies the set of authorization criteria based on an input (e.g., 750*a*) (e.g., acceptance of a prompt to provide authorization), received while connected to the external input device (e.g., 700) (e.g., while connected in the same connection session during which the first request is received), the computer system authorizes the external input device (e.g., 700) to provide requests to initiate one or more secure transactions that, if authorized from the computer system (e.g., 600), would require separate authorization from the user. Authorizing the external input device based on an input received while connected to the external input device allows the user to better control the relationship between the computer system and the external input device and also reduces the risk of unintentionally authorizing the wrong device. Providing additional control options and reducing the risk of error enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, the external input device (e.g., 700) satisfies the set of authorization criteria based on the external input device (e.g., 700) being identified as being a first type of device (e.g., a type of device that is pre-authorized (e.g., a device from a specific manufacturer; a type of device having specific hardware (e.g., secure hardware); a type of device having specific software (e.g., secure software)). In some embodiments, external input devices of a second type (e.g., not of the first type) do not satisfy the set of authorization criteria. Authorizing the external input device based on the device being a device of a first type reduces the risk that devices without the necessary characteristics are authorized, thereby increasing security and also reduces the need for explicit inputs to authorize devices of the first type. Increasing security and reducing the number of inputs required to perform an operation enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

In some embodiments, the external input device (e.g., 700) (e.g., an automotive head unit (e.g., a unified hardware interface for a plurality of entertainment and information systems (e.g., sound; navigation) of an automobile (e.g., a stereo head unit; an infotainment system))) satisfies the set of authorization criteria based on the external input device being connected to a vehicle (e.g., an automobile; a motorcycle) identified as having authorized authentication hardware (e.g., an authenticated identity chip). Authorizing the external input device based on the device being connected to a vehicle identified as having authorized authentication hardware increases security and also reduces the need for explicit inputs to authorize devices connected to such vehicles. Increasing security and reducing the number of inputs required to perform an operation enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the computer system more quickly and efficiently.

Note that details of the processes described above with respect to method 900 (e.g., FIG. 9) are also applicable in an analogous manner to the methods described below. For example, method 900 optionally includes one or more of the characteristics of the various methods described above with reference to method 800. For example, method 800 can be used to initiate a process to perform the first transfer operation (e.g., 804) when the external input device satisfies a set of authorization criteria and provides an option to initiate the secure transaction (e.g., in 906). For brevity, these details are not repeated below.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management and security of operations (e.g., transactions) being performed at various devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide authorization for an electronic device to perform secure operations (e.g., transactions) based on the personal information that is provided. Accordingly, use of such personal information data enables a user to have calculated control and/or increased security with regards to the secure operations that are performed via the electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of performing secure operations (e.g., payment transactions), the present technology can be configured to allow users to select to "opt in" or "opt out" of participation in the collection of personal information data during registration for services or anytime thereafter. In another example, users can select to provide other information (e.g., such as a password) to perform one or more secure operations using the electronic device. In yet another example, users can select to limit the length of time the gathered data (e.g., biometric data) is maintained or entirely prohibit the authorization of operations based on the gathered data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, secure operations can be performed based on non-personal information data or a bare minimum amount of personal information, such as the content being requested by the device associated with a user, other non-personal information available to authorization systems, or publicly available information.

What is claimed is:

1. A computer system, comprising:
   one or more processors; and
   memory storing one or more programs configured to be executed by the one or more processors, the one or more programs including instructions for:
      while the computer system is connected to an external input device, receiving a first request from the external input device to interact with a first portion of a user interface that is associated with a secure transaction that, if authorized from the computer system, would require separate authorization from the user; and
      in response to receiving the first request:
         in accordance with a determination that the external input device satisfies a set of authorization criteria, providing an option, via the external input device, to initiate a secure transaction without requiring the separate authorization from the user; and
         in accordance with a determination that the external input device does not satisfy the set of authorization criteria, forgoing providing the option to initiate a secure transaction without requiring the separate authorization from the user.

2. The computer system of claim 1, wherein the external input device is an external automotive head unit.

3. The computer system of claim 1, wherein the computer system is a smartphone that includes a hardware secure element for use in the secure transaction.

4. The computer system of claim 1, wherein the computer system includes one or more external device communication interfaces, the one or more programs further including instructions for:
   detecting, via the one or more external device communication interfaces, connection of the computer system to the external input device;
   wherein the first request is received after detecting connection of the computer system to the external input device.

5. The computer system of claim 1, wherein:
   the computer system is in communication with one or more hardware input devices; and
   the secure transaction, when authorized from the computer system, requires authorization from the user provided via the one or more hardware input devices.

6. The computer system of claim 5, wherein the one or more hardware input devices includes a biometric reader and the authorization from the user provided via the one or more hardware input devices is a biometric authorization received via the biometric reader.

7. The computer system of claim 1, the one or more programs further including instructions for:
   after providing the option to initiate a secure transaction without requiring the separate authorization from the user, receiving a request from the external input device to proceed with the secure transaction; and
   in response to receiving the request from the external input device to proceed with the secure transaction, performing the secure transaction including securely transmitting to an external receiving device first data that includes information that identifies a first account for use in the secure transaction.

8. The computer system of claim 7, wherein:
   the computer system is in communication with a display generation component; and
   performing the secure transaction occurs while the display generation component is in a locked state.

9. The computer system of claim 1, wherein:
   the secure transaction is performed using a first application on the computer system;
   the user interface is an interface displayed at the external input device;
   the user interface is arranged according to a first interface layout template and includes information provided by the first application; and the one or more programs further include instructions for:
receiving a second request from the external input device to interact with a first portion of a second user interface that is displayed at the external input device and associated with a second secure transaction performed using a second application on the computer system that, if authorized from the computer system, would require separate authorization from the user, wherein:
the second application is different from the first application; and
the second user interface is arranged according the first interface layout template and includes information provided by the second application.

10. The computer system of claim 1, wherein the set of authorization criteria is satisfied when:
the computer system, prior to receiving the first request, received a first set of one or more inputs; and
in response to the first set of one or more inputs:
authorized connection of the external input device to the computer system while the computer system is in a locked state.

11. The computer system of claim 10, wherein the external input device satisfies the set of authorization criteria based on a status that is established based on a second set of one or more inputs that is received after having received the first set of one or more inputs.

12. The computer system of claim 11, wherein:
the external input device satisfies the set of authorization criteria based on the status being a long-term authorization status; and
the first set of one or more inputs was received:
while the computer system is in a connection session with the external input device that is also the connection session during which the first request was received; or
while the computer system was in a preceding connection session with the external input device that is different from the connection session during which the first request was received.

13. The computer system of claim 11, wherein:
the external input device satisfies the set of authorization criteria based on the status being a short-term authorization status; and
the first set of one or more inputs was received:
while the computer system is in a connection session with the external input device that is also the connection session during which the first request was received.

14. The computer system of claim 1, wherein the external input device satisfies the set of authorization criteria based on an input, received prior to receiving the first request, authorizing the external input device to provide requests to initiate one or more secure transactions that, if authorized from the computer system, would require separate authorization from the user.

15. The computer system of claim 1, wherein the external input device satisfies the set of authorization criteria based on an input, received while connected to the external input device, authorizing the external input device to provide requests to initiate one or more secure transactions that, if authorized from the computer system, would require separate authorization from the user.

16. The computer system of claim 1, wherein the external input device satisfies the set of authorization criteria based on the external input device being identified as being a first type of device.

17. The computer system of claim 1, wherein the external input device satisfies the set of authorization criteria based on the external input device being connected to a vehicle identified as having authorized authentication hardware.

18. A non-transitory computer-readable storage medium storing one or more programs configured to be executed by one or more processors of a computer system, the one or more programs including instructions for:
while the computer system is connected to an external input device, receiving a first request from the external input device to interact with a first portion of a user interface that is associated with a secure transaction that, if authorized from the computer system, would require separate authorization from the user; and
in response to receiving the first request:
in accordance with a determination that the external input device satisfies a set of authorization criteria, providing an option, via the external input device, to initiate a secure transaction without requiring the separate authorization from the user; and
in accordance with a determination that the external input device does not satisfy the set of authorization criteria, forgoing providing the option to initiate a secure transaction without requiring the separate authorization from the user.

19. The non-transitory computer-readable storage medium of claim 18, wherein the external input device is an external automotive head unit.

20. The non-transitory computer-readable storage medium of claim 18, wherein the computer system is a smartphone that includes a hardware secure element for use in the secure transaction.

21. The non-transitory computer-readable storage medium of claim 18, wherein the computer system includes one or more external device communication interfaces, the one or more programs further including instructions for:
detecting, via the one or more external device communication interfaces, connection of the computer system to the external input device;
wherein the first request is received after detecting connection of the computer system to the external input device.

22. The non-transitory computer-readable storage medium of claim 18, wherein:
the computer system is in communication with one or more hardware input devices; and
the secure transaction, when authorized from the computer system, requires authorization from the user provided via the one or more hardware input devices.

23. The non-transitory computer-readable storage medium of claim 22, wherein the one or more hardware input devices includes a biometric reader and the authorization from the user provided via the one or more hardware input devices is a biometric authorization received via the biometric reader.

24. The non-transitory computer-readable storage medium of claim 18, the one or more programs further including instructions for:
after providing the option to initiate a secure transaction without requiring the separate authorization from the user, receiving a request from the external input device to proceed with the secure transaction; and
in response to receiving the request from the external input device to proceed with the secure transaction, performing the secure transaction including securely transmitting to an external receiving device first data that includes information that identifies a first account for use in the secure transaction.

25. The non-transitory computer-readable storage medium of claim 24, wherein:
the computer system is in communication with a display generation component; and
performing the secure transaction occurs while the display generation component is in a locked state.

26. The non-transitory computer-readable storage medium of claim 18, wherein:
the secure transaction is performed using a first application on the computer system;
the user interface is an interface displayed at the external input device;
the user interface is arranged according to a first interface layout template and includes information provided by the first application; and
the one or more programs further include instructions for:
receiving a second request from the external input device to interact with a first portion of a second user interface that is displayed at the external input device and associated with a second secure transaction performed using a second application on the computer system that, if authorized from the computer system, would require separate authorization from the user, wherein:
the second application is different from the first application; and
the second user interface is arranged according to the first interface layout template and includes information provided by the second application.

27. The non-transitory computer-readable storage medium of claim 18, wherein the set of authorization criteria is satisfied when:
the computer system, prior to receiving the first request, received a first set of one or more inputs; and
in response to the first set of one or more inputs:
authorized connection of the external input device to the computer system while the computer system is in a locked state.

28. The non-transitory computer-readable storage medium of claim 27, wherein the external input device satisfies the set of authorization criteria based on a status that is established based on a second set of one or more inputs that is received after having received the first set of one or more inputs.

29. The non-transitory computer-readable storage medium of claim 28, wherein:
the external input device satisfies the set of authorization criteria based on the status being a long-term authorization status; and
the first set of one or more inputs was received:
while the computer system is in a connection session with the external input device that is also the connection session during which the first request was received; or
while the computer system was in a preceding connection session with the external input device that is different from the connection session during which the first request was received.

30. The non-transitory computer-readable storage medium of claim 28, wherein:
the external input device satisfies the set of authorization criteria based on the status being a short-term authorization status; and
the first set of one or more inputs was received:
while the computer system is in a connection session with the external input device that is also the connection session during which the first request was received.

31. The non-transitory computer-readable storage medium of claim 18, wherein the external input device satisfies the set of authorization criteria based on an input, received prior to receiving the first request, authorizing the external input device to provide requests to initiate one or more secure transactions that, if authorized from the computer system, would require separate authorization from the user.

32. The non-transitory computer-readable storage medium of claim 18, wherein the external input device satisfies the set of authorization criteria based on an input, received while connected to the external input device, authorizing the external input device to provide requests to initiate one or more secure transactions that, if authorized from the computer system, would require separate authorization from the user.

33. The non-transitory computer-readable storage medium of claim 18, wherein the external input device satisfies the set of authorization criteria based on the external input device being identified as being a first type of device.

34. The non-transitory computer-readable storage medium of claim 18, wherein the external input device satisfies the set of authorization criteria based on the external input device being connected to a vehicle identified as having authorized authentication hardware.

35. A method comprising:
at a computer system:
while the computer system is connected to an external input device, receiving a first request from the external input device to interact with a first portion of a user interface that is associated with a secure transaction that, if authorized from the computer system, would require separate authorization from the user; and
in response to receiving the first request:
in accordance with a determination that the external input device satisfies a set of authorization criteria, providing an option, via the external input device, to initiate a secure transaction without requiring the separate authorization from the user; and
in accordance with a determination that the external input device does not satisfy the set of authorization criteria, forgoing providing the option to initiate a secure transaction without requiring the separate authorization from the user.

36. The method of claim 35, wherein the external input device is an external automotive head unit.

37. The method of claim 35, wherein the computer system is a smartphone that includes a hardware secure element for use in the secure transaction.

38. The method of claim 35, wherein the computer system includes one or more external device communication interfaces, further comprising:
detecting, via the one or more external device communication interfaces, connection of the computer system to the external input device;
wherein the first request is received after detecting connection of the computer system to the external input device.

39. The method of claim 35, wherein:
the computer system is in communication with one or more hardware input devices; and
the secure transaction, when authorized from the computer system, requires authorization from the user provided via the one or more hardware input devices.

40. The method of claim 39, wherein the one or more hardware input devices includes a biometric reader and the authorization from the user provided via the one or more hardware input devices is a biometric authorization received via the biometric reader.

41. The method of claim 35, further comprising:
after providing the option to initiate a secure transaction without requiring the separate authorization from the user, receiving a request from the external input device to proceed with the secure transaction; and
in response to receiving the request from the external input device to proceed with the secure transaction, performing the secure transaction including securely transmitting to an external receiving device first data that includes information that identifies a first account for use in the secure transaction.

42. The method of claim 41, wherein:
the computer system is in communication with a display generation component; and
performing the secure transaction occurs while the display generation component is in a locked state.

43. The method of claim 35, wherein:
the secure transaction is performed using a first application on the computer system;
the user interface is an interface displayed at the external input device;
the user interface is arranged according to a first interface layout template and includes information provided by the first application; and
the method further comprising:
receiving a second request from the external input device to interact with a first portion of a second user interface that is displayed at the external input device and associated with a second secure transaction performed using a second application on the computer system that, if authorized from the computer system, would require separate authorization from the user, wherein:
the second application is different from the first application; and
the second user interface is arranged according the first interface layout template and includes information provided by the second application.

44. The method of claim 35, wherein the set of authorization criteria is satisfied when:
the computer system, prior to receiving the first request, received a first set of one or more inputs; and
in response to the first set of one or more inputs:
authorized connection of the external input device to the computer system while the computer system is in a locked state.

45. The method of claim 44, wherein the external input device satisfies the set of authorization criteria based on a status that is established based on a second set of one or more inputs that is received after having received the first set of one or more inputs.

46. The method of claim 45, wherein:
the external input device satisfies the set of authorization criteria based on the status being a long-term authorization status; and
the first set of one or more inputs was received:
while the computer system is in a connection session with the external input device that is also the connection session during which the first request was received; or
while the computer system was in a preceding connection session with the external input device that is different from the connection session during which the first request was received.

47. The method of claim 45, wherein:
the external input device satisfies the set of authorization criteria based on the status being a short-term authorization status; and
the first set of one or more inputs was received:
while the computer system is in a connection session with the external input device that is also the connection session during which the first request was received.

48. The method of claim 35, wherein the external input device satisfies the set of authorization criteria based on an input, received prior to receiving the first request, authorizing the external input device to provide requests to initiate one or more secure transactions that, if authorized from the computer system, would require separate authorization from the user.

49. The method of claim 35, wherein the external input device satisfies the set of authorization criteria based on an input, received while connected to the external input device, authorizing the external input device to provide requests to initiate one or more secure transactions that, if authorized from the computer system, would require separate authorization from the user.

50. The method of claim 35, wherein the external input device satisfies the set of authorization criteria based on the external input device being identified as being a first type of device.

51. The method of claim 35, wherein the external input device satisfies the set of authorization criteria based on the external input device being connected to a vehicle identified as having authorized authentication hardware.

* * * * *